Aug. 23, 1938.   R. v REPPERT   2,127,530
TYPEWRITING MACHINE
Filed June 30, 1933   24 Sheets-Sheet 2

INVENTOR
Richard v Reppert.
BY John Waldheim
ATTORNEY

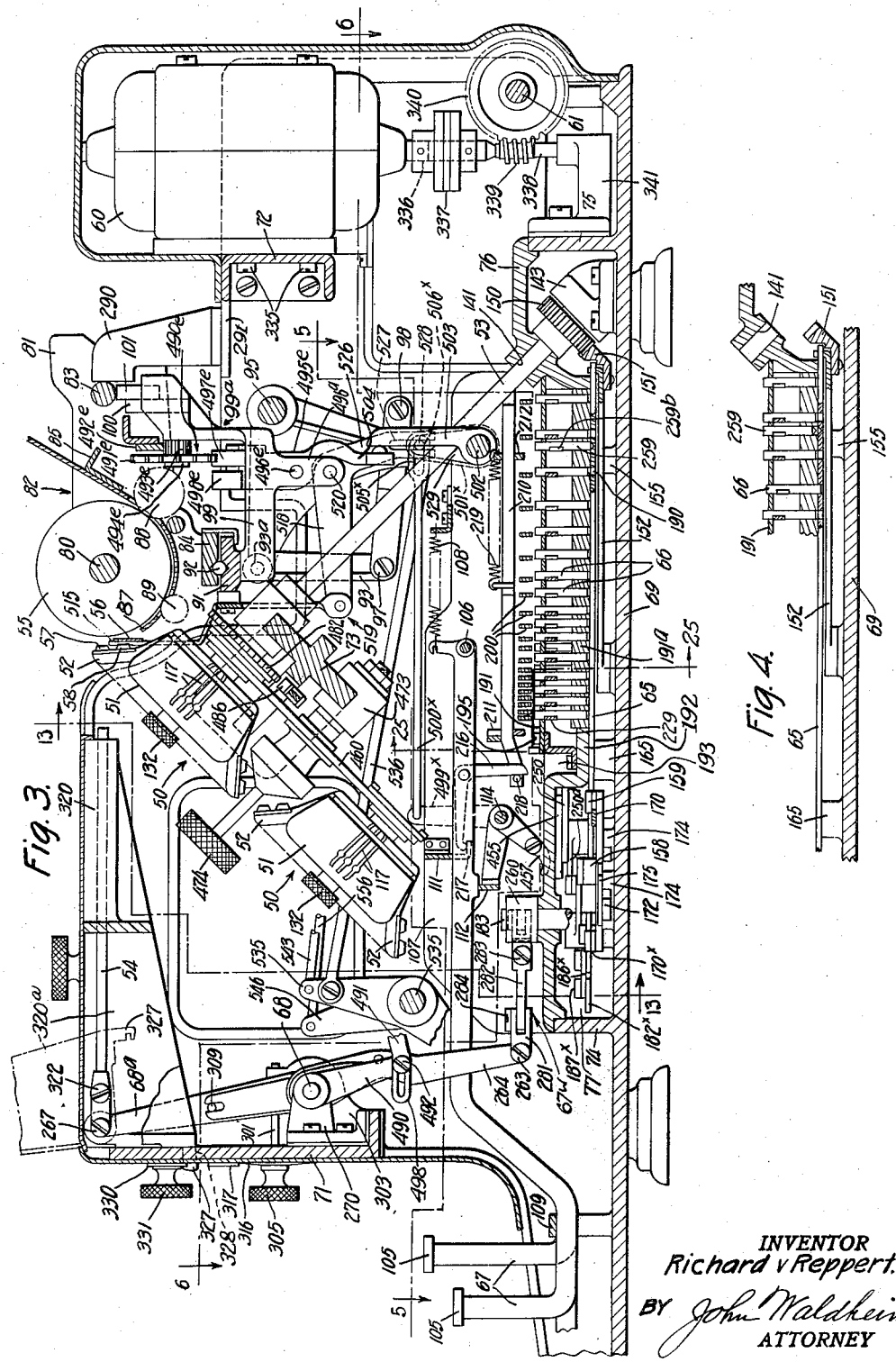

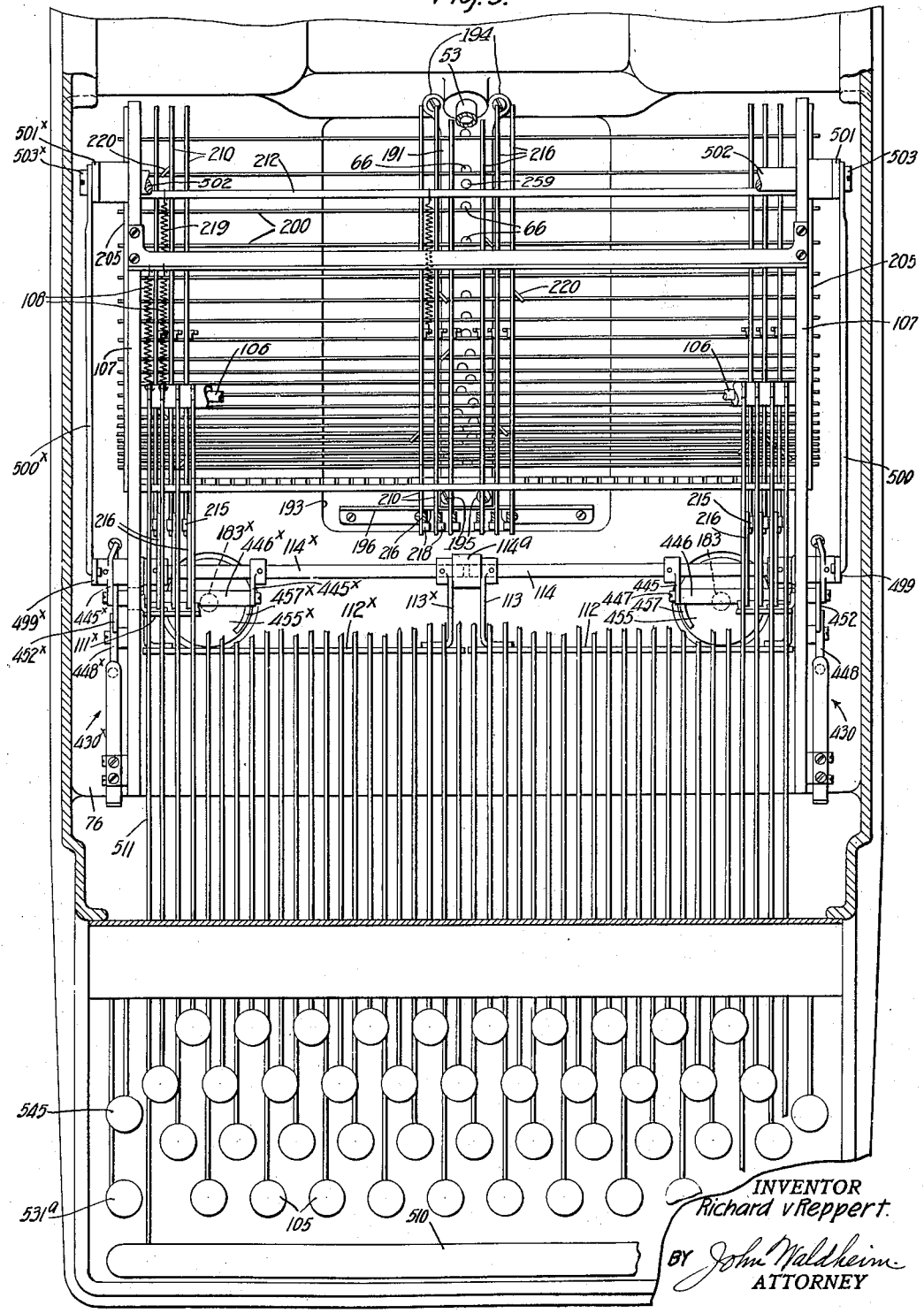

Aug. 23, 1938.   R. v REPPERT   2,127,530
TYPEWRITING MACHINE
Filed June 30, 1933   24 Sheets-Sheet 5

INVENTOR
Richard v Reppert.
BY John Waldheim
ATTORNEY

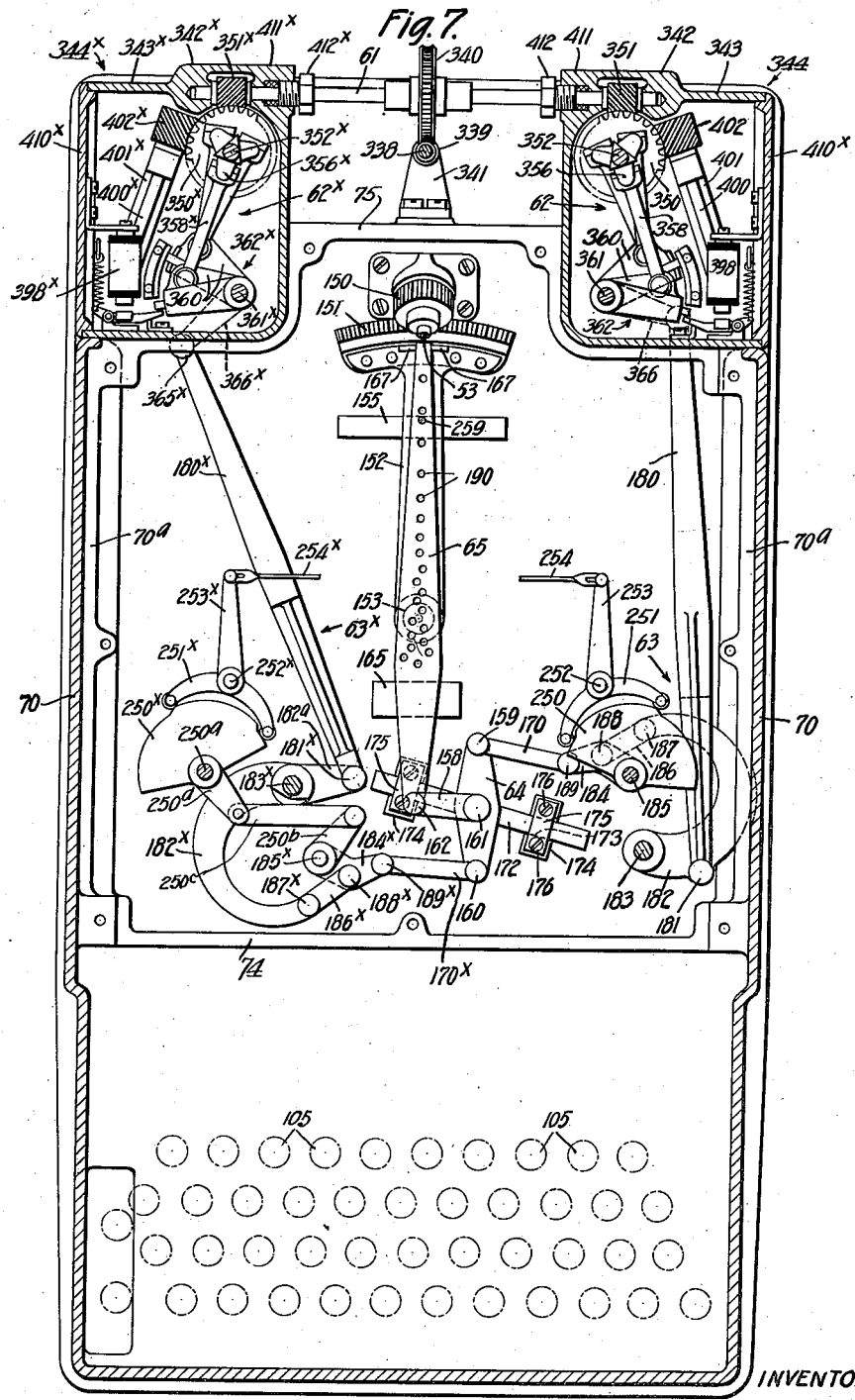

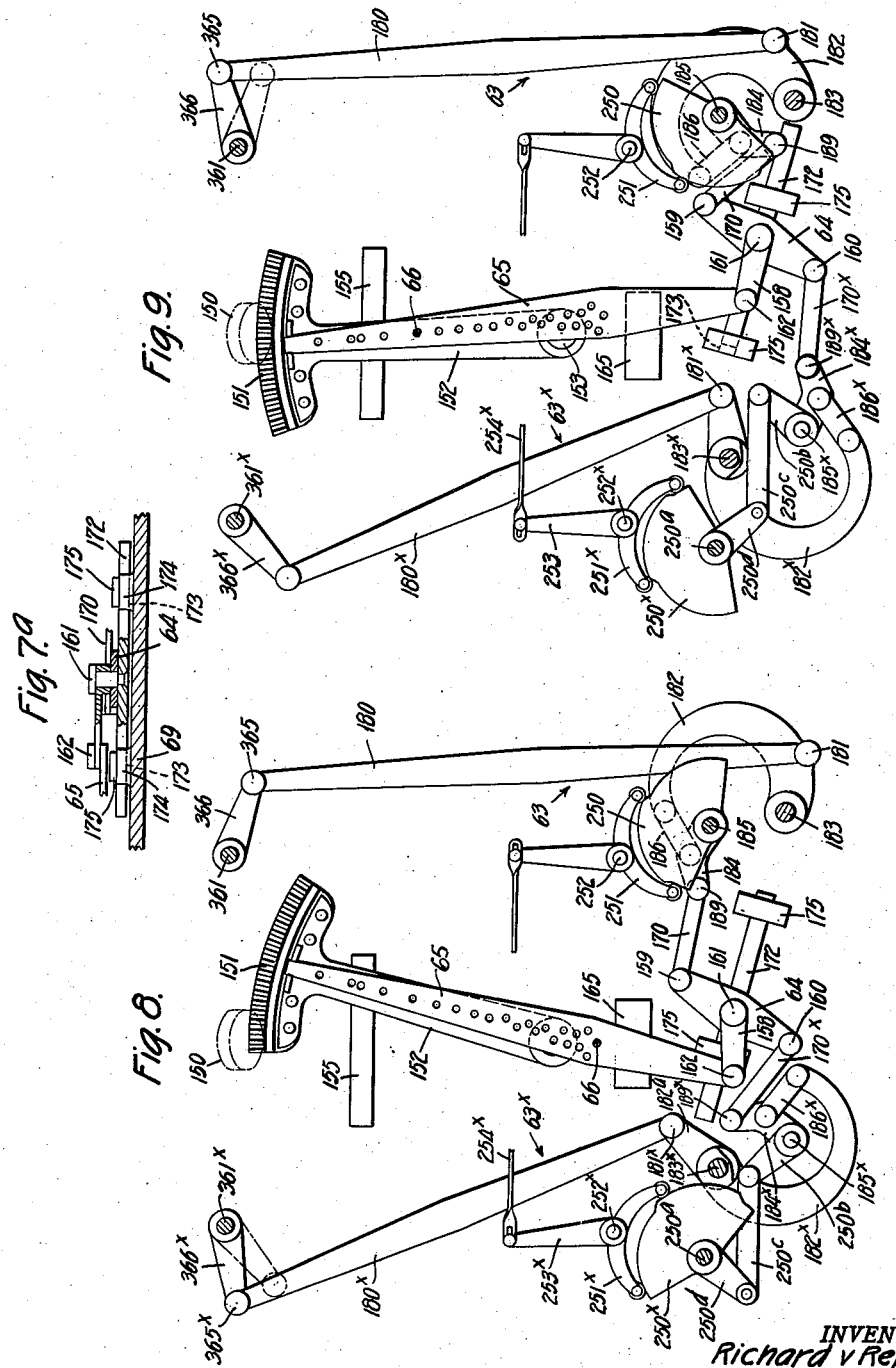

Aug. 23, 1938.    R. v REPPERT    2,127,530
TYPEWRITING MACHINE
Filed June 30, 1933    24 Sheets-Sheet 8
Fig. 10.
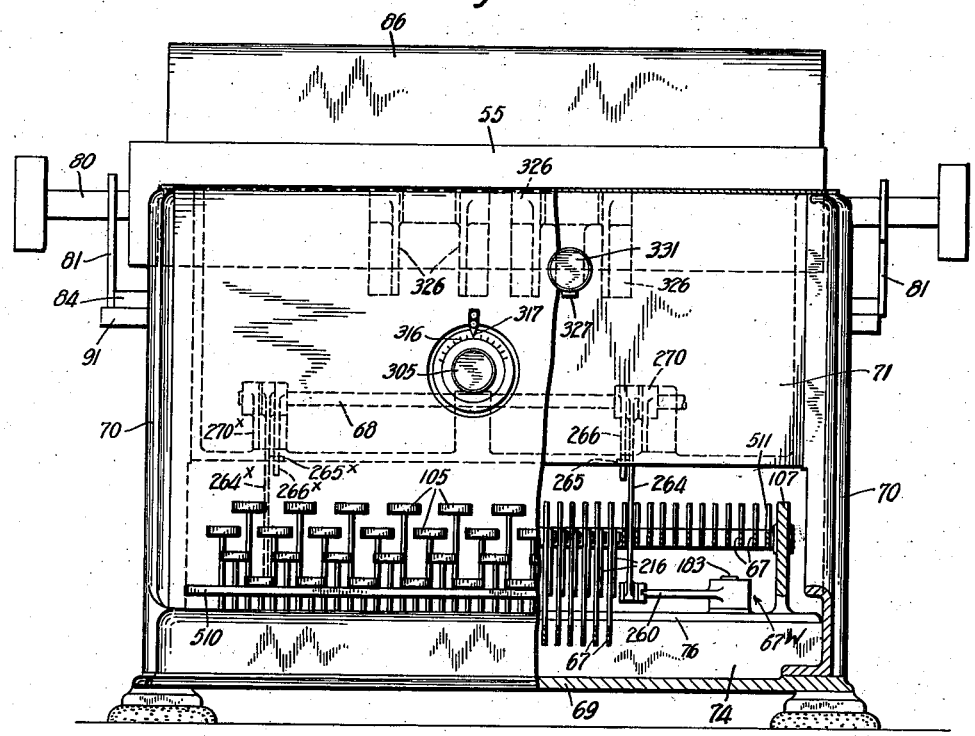
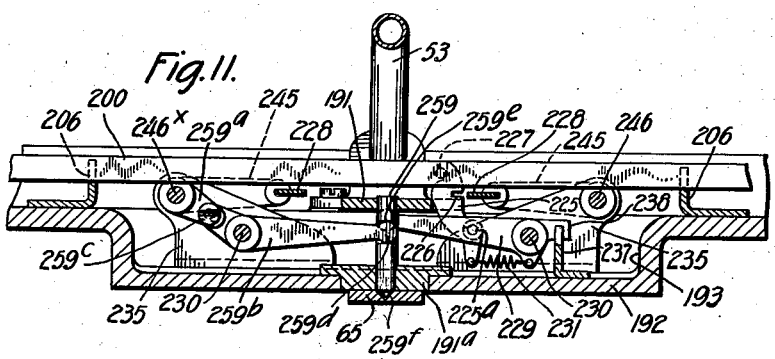
Fig. 11.
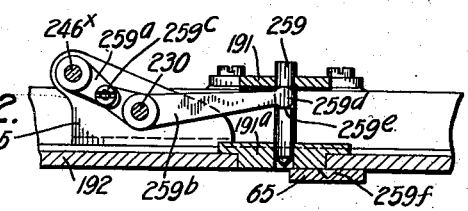
Fig. 12.
INVENTOR
Richard v Reppert
BY
John Waldheim
ATTORNEY Aug. 23, 1938.  R. v REPPERT  2,127,530
TYPEWRITING MACHINE
Filed June 30, 1933  24 Sheets-Sheet 9
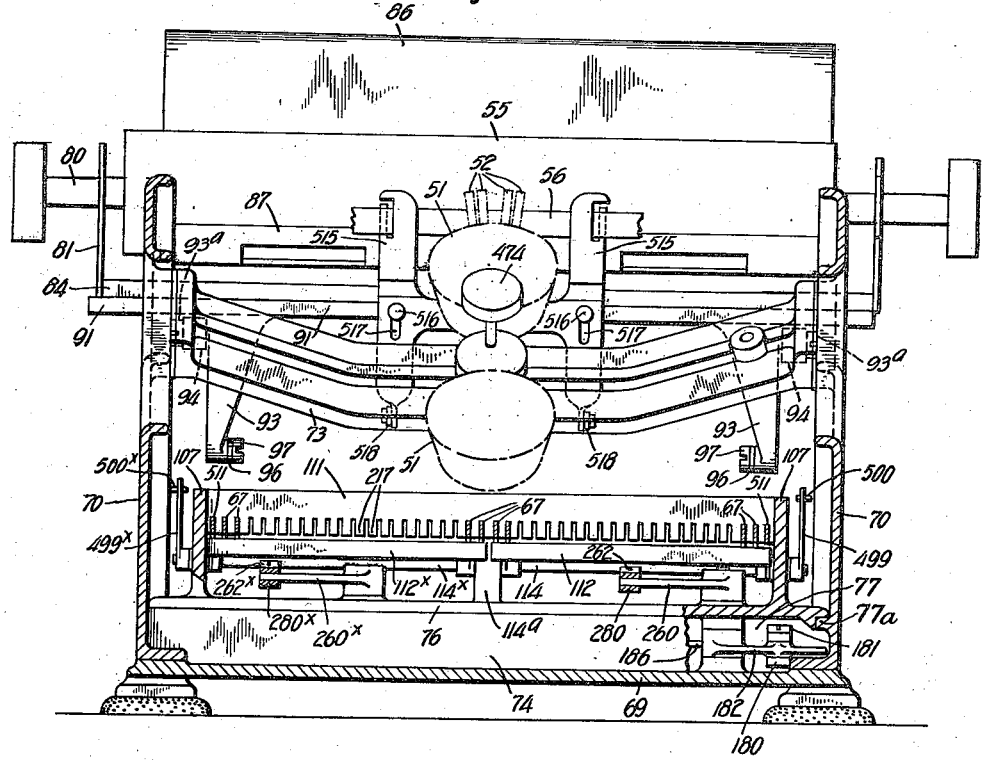
Fig. 13.
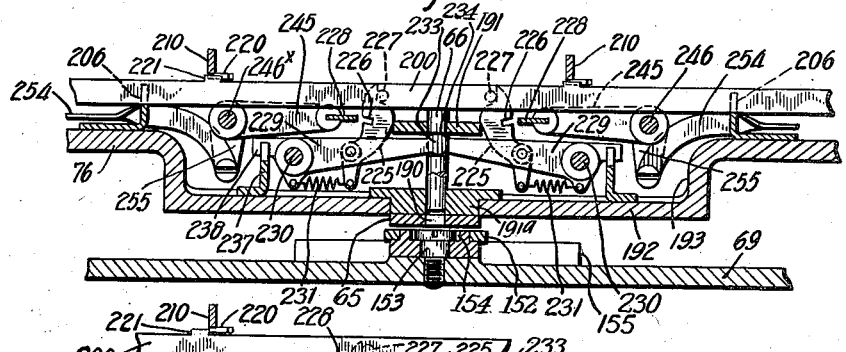
Fig. 14.
Fig. 15.
INVENTOR
Richard v Reppert.
BY John Waldheim
ATTORNEY Aug. 23, 1938.  R. v REPPERT  2,127,530
TYPEWRITING MACHINE
Filed June 30, 1933  24 Sheets—Sheet 10

INVENTOR
Richard v Reppert.
BY John Waldheim
ATTORNEY

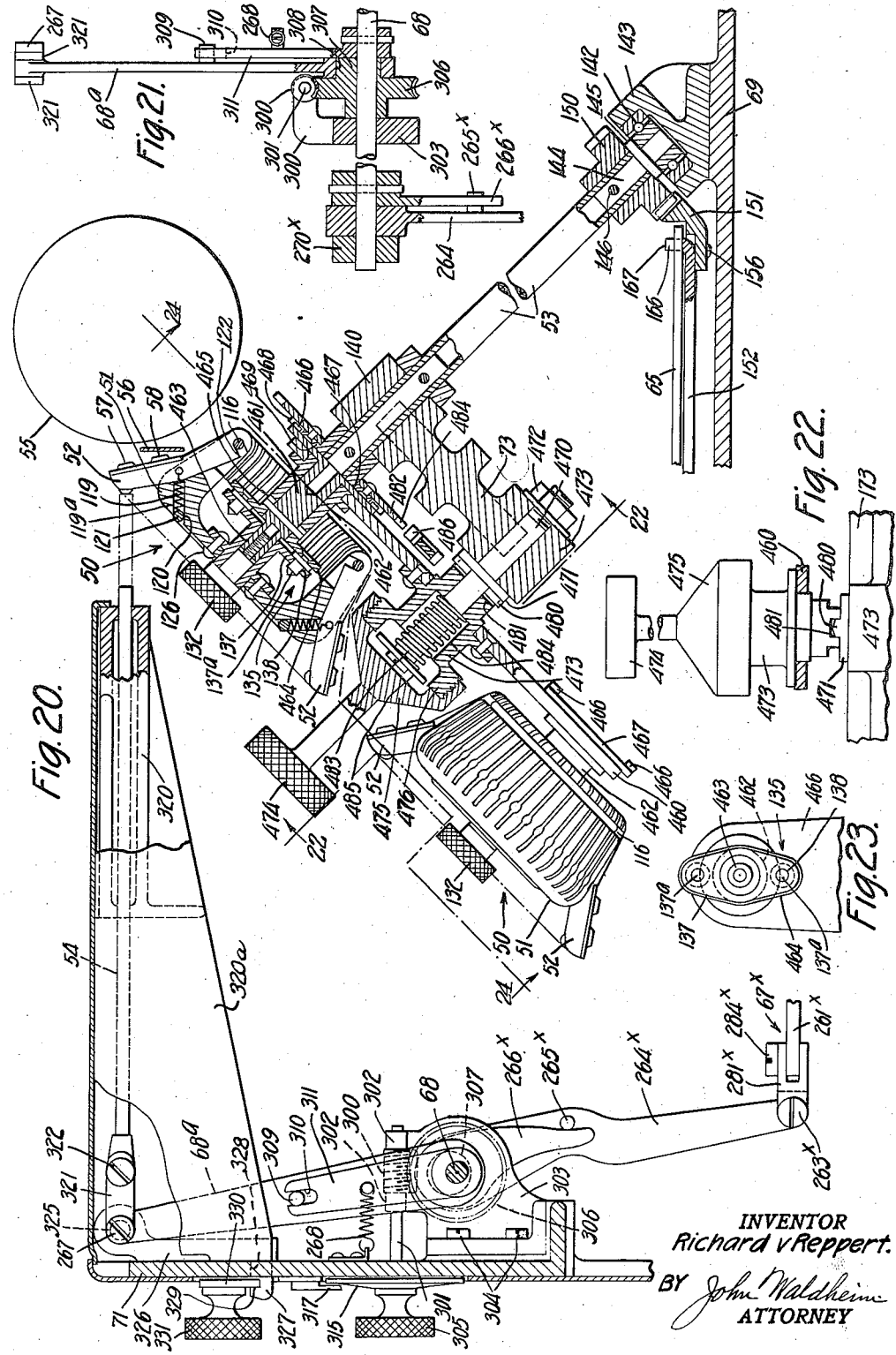

INVENTOR
Richard v Reppert.
BY John Waldheim
ATTORNEY

Aug. 23, 1938.   R. v REPPERT   2,127,530
TYPEWRITING MACHINE
Filed June 30, 1933   24 Sheets-Sheet 13
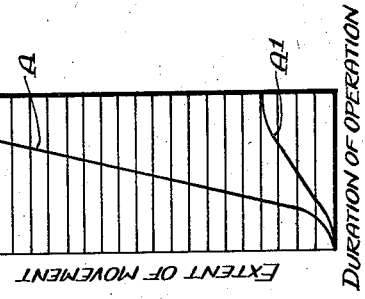
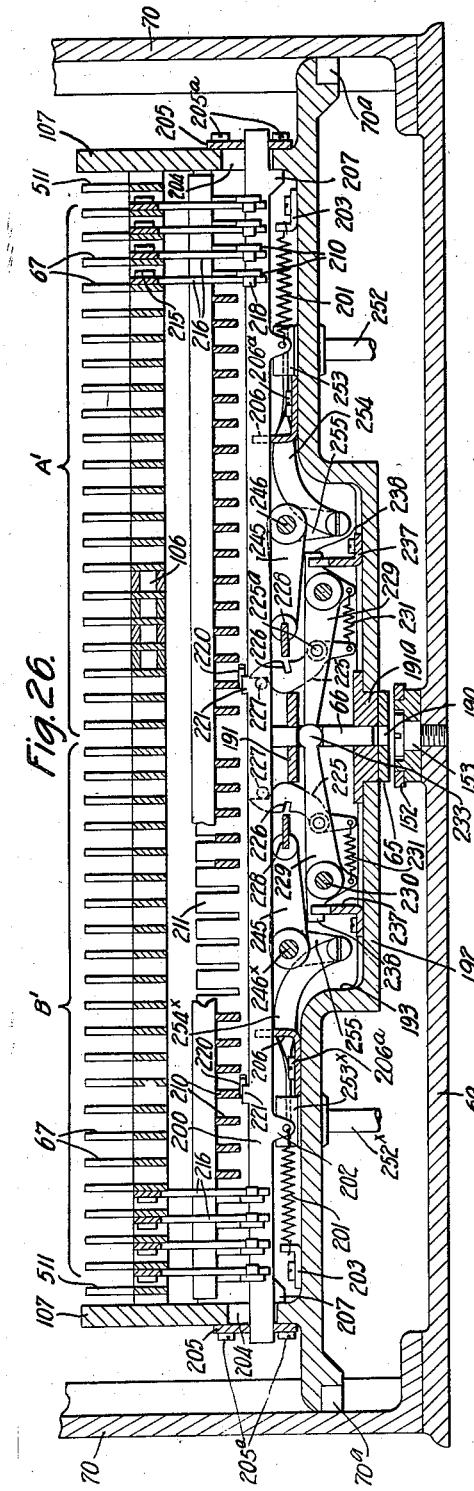
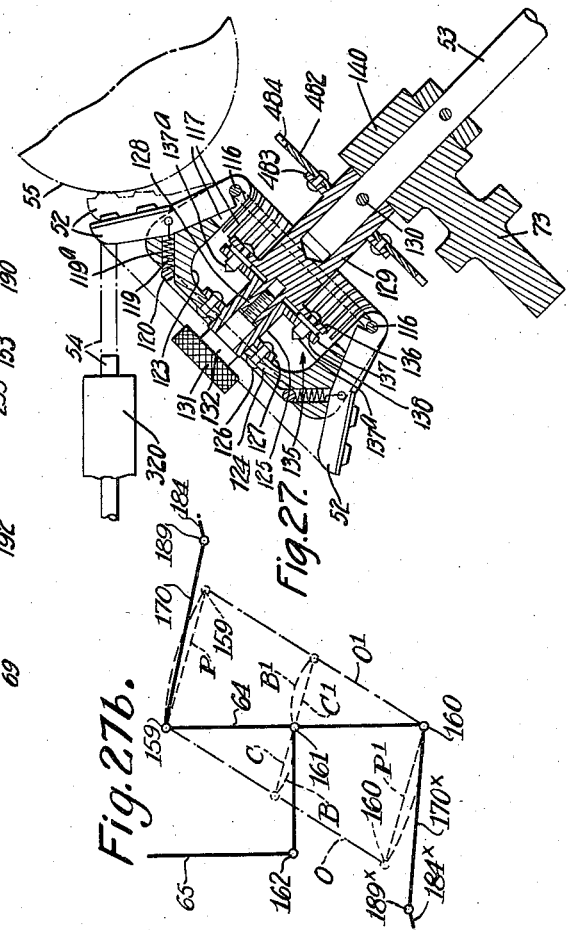
INVENTOR
Richard v Reppert.
BY John Waldheim
ATTORNEY Aug. 23, 1938.    R. v REPPERT    2,127,530
TYPEWRITING MACHINE
Filed June 30, 1933    24 Sheets-Sheet 14
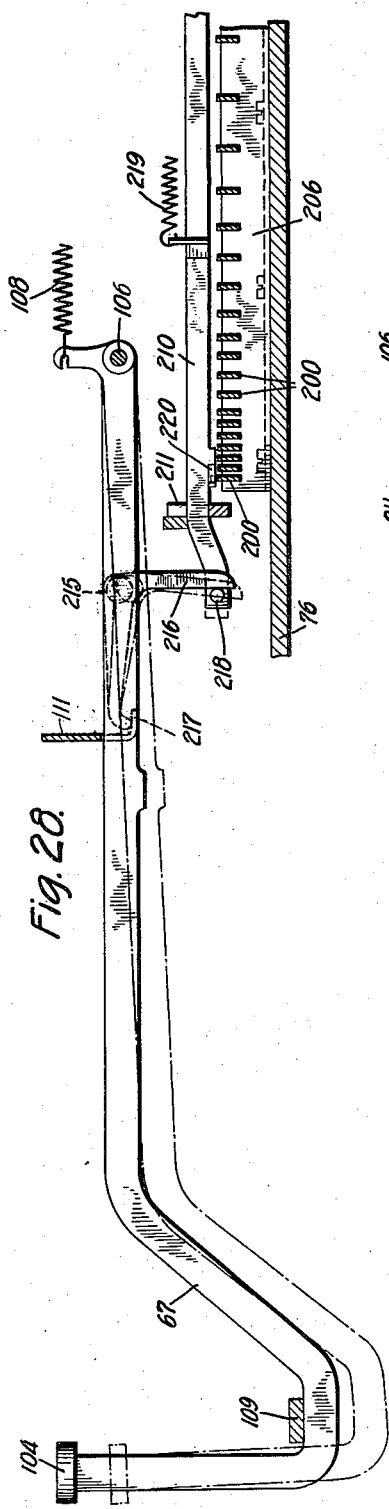
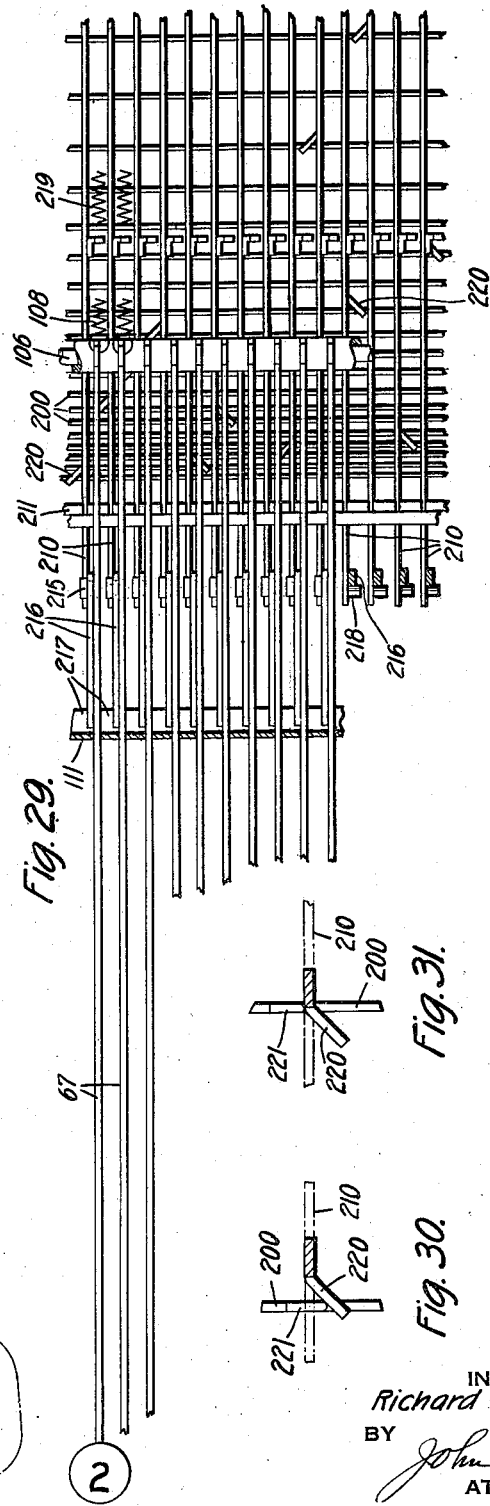
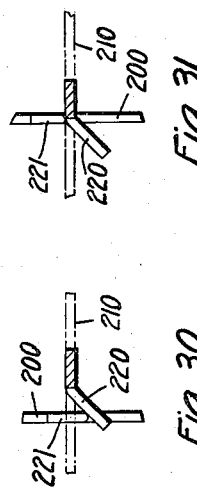
INVENTOR
Richard v Reppert.
BY
John Waldheim
ATTORNEY Aug. 23, 1938.  R. v REPPERT  2,127,530
TYPEWRITING MACHINE
Filed June 30, 1933   24 Sheets-Sheet 15

INVENTOR
Richard v Reppert
BY John Waldheim
ATTORNEY

Aug. 23, 1938.    R. v REPPERT    2,127,530
TYPEWRITING MACHINE
Filed June 30, 1933    24 Sheets-Sheet 16

INVENTOR
Richard v Reppert.
BY
John Waldheim
ATTORNEY

Aug. 23, 1938.   R. v REPPERT   2,127,530
TYPEWRITING MACHINE
Filed June 30, 1933   24 Sheets-Sheet 17
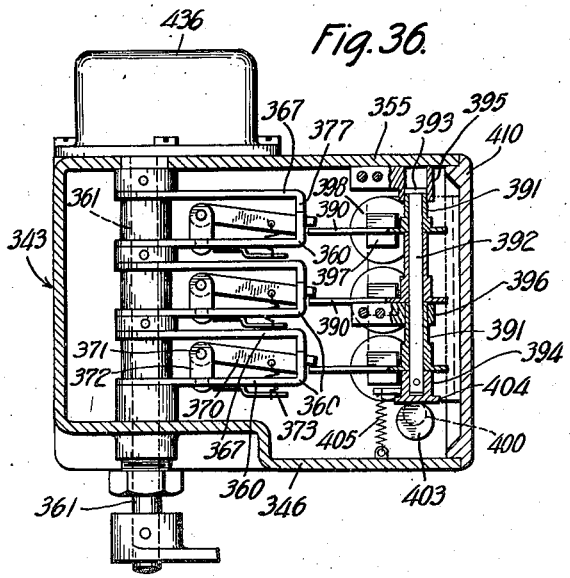
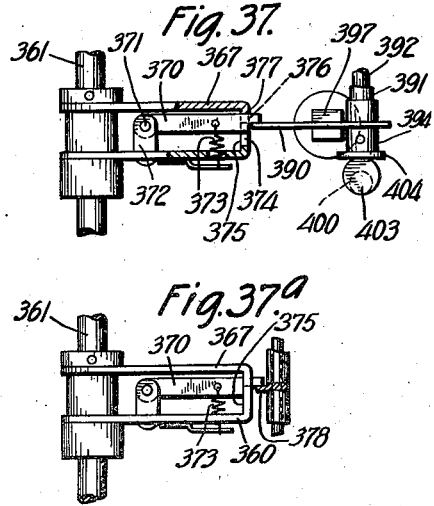
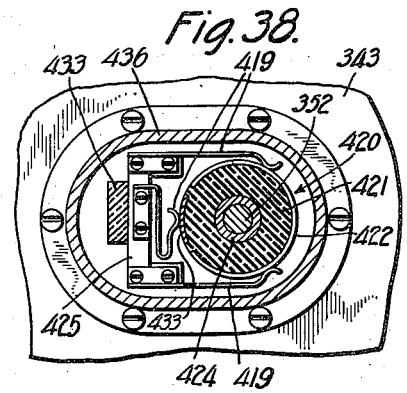
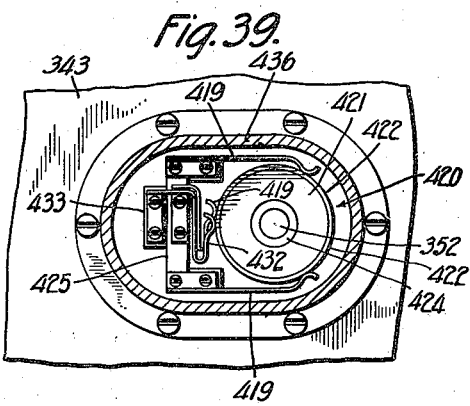
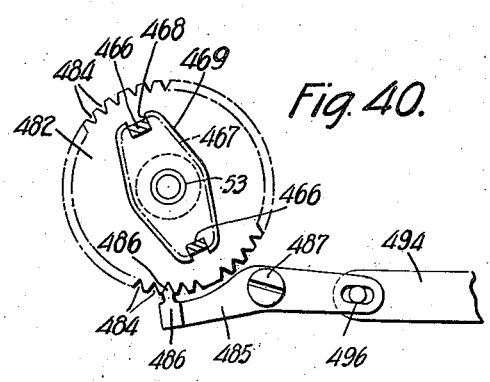
INVENTOR
Richard v Reppert.
BY John Waldheim
ATTORNEY Aug. 23, 1938.  R. v REPPERT  2,127,530
TYPEWRITING MACHINE
Filed June 30, 1933  24 Sheets-Sheet 18

INVENTOR
Richard v Reppert
BY
John Waldheim
ATTORNEY

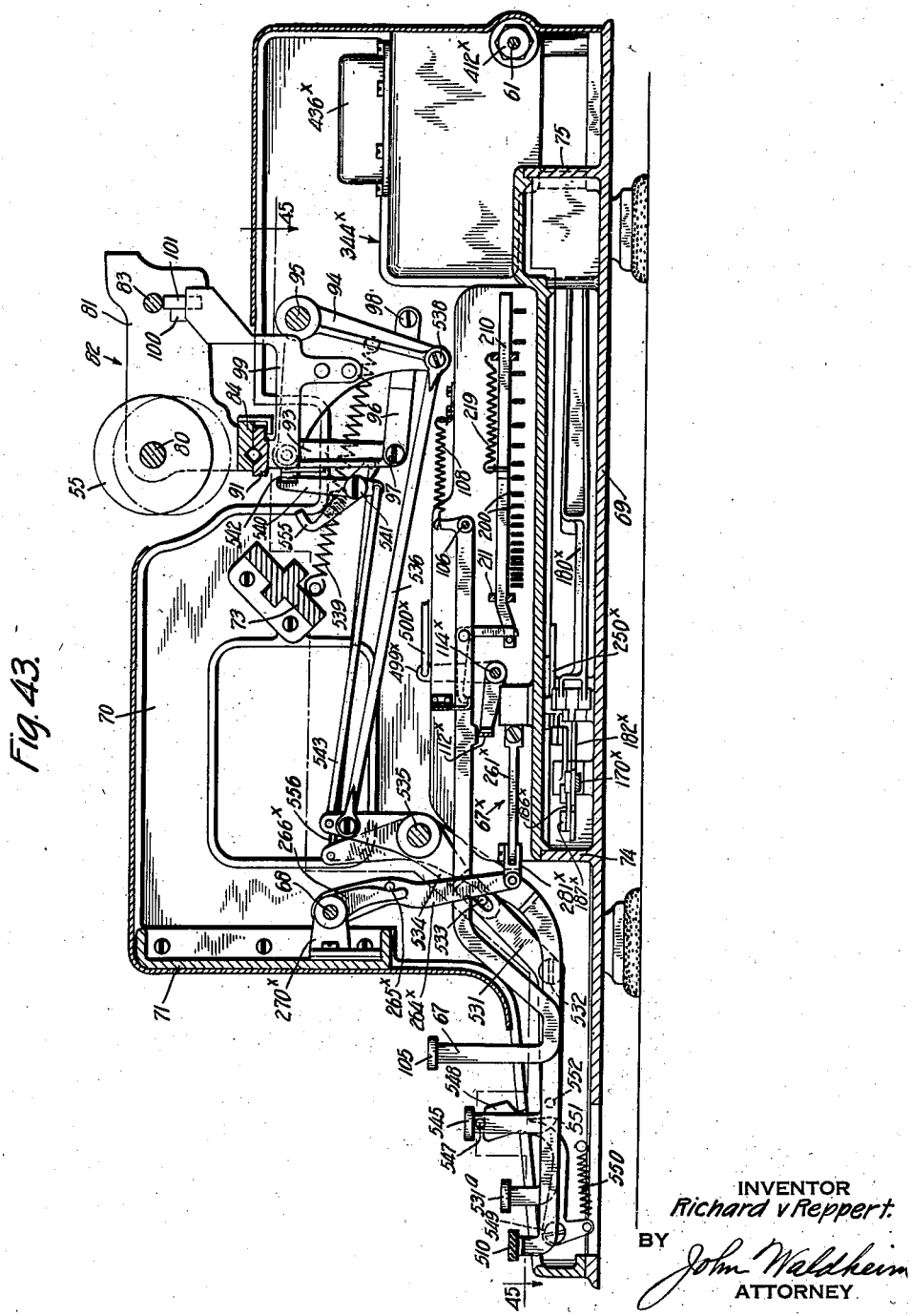

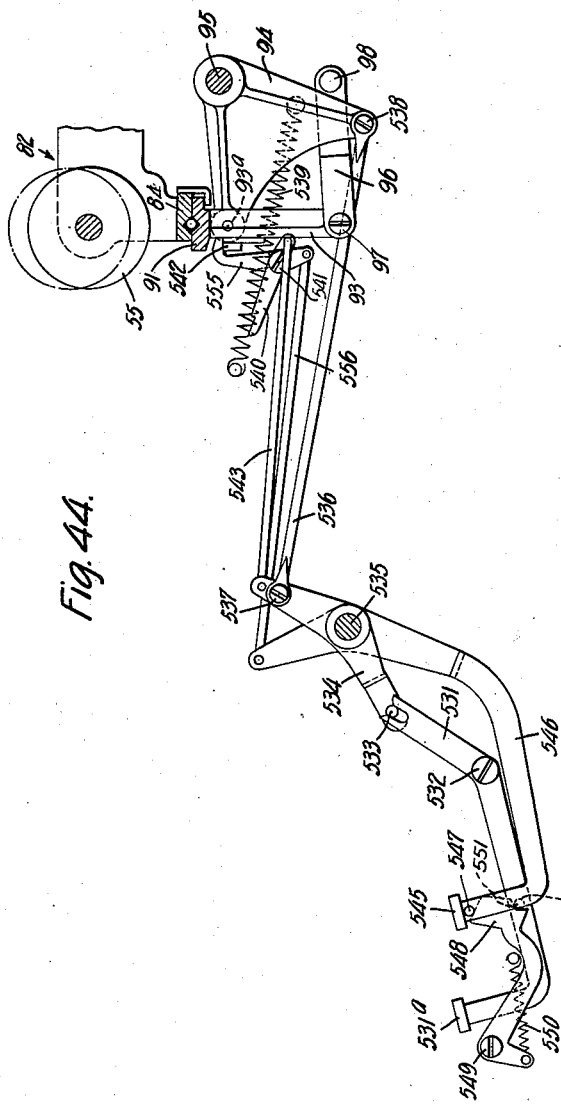
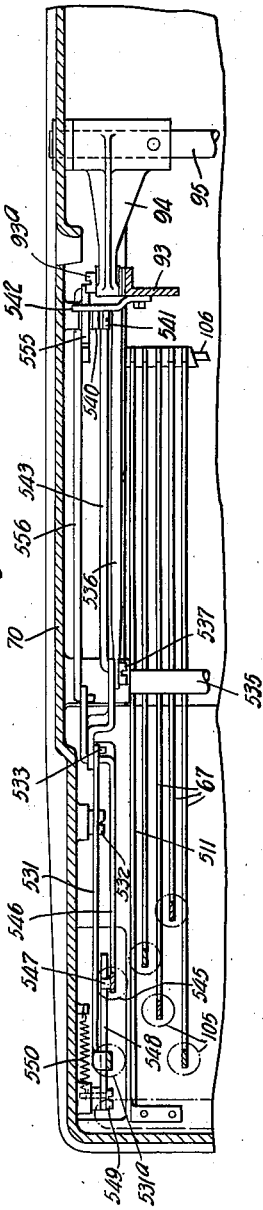

Aug. 23, 1938.   R. v REPPERT   2,127,530
TYPEWRITING MACHINE
Filed June 30, 1933   24 Sheets-Sheet 21

INVENTOR
Richard v Reppert.
BY
John Waldheim
ATTORNEY

INVENTOR
Richard v Reppert.
BY
ATTORNEY

Aug. 23, 1938.    R. V REPPERT    2,127,530
TYPEWRITING MACHINE
Filed June 30, 1933    24 Sheets-Sheet 23

INVENTOR
Richard V Reppert.
BY
John Waldheim
ATTORNEY

Patented Aug. 23, 1938

2,127,530

UNITED STATES PATENT OFFICE 2,127,530

TYPEWRITING MACHINE

Richard v Reppert, Teaneck, N. J., assignor to Burnell Laboratory Company, Incorporated, Locust Valley, N. Y., a corporation of Delaware Application June 30, 1933, Serial No. 678,407

182 Claims. (Cl. 197—16)

This invention relates to typewriting machines and it is in the nature of improvements which may be used with the machine shown and described in the application of Walter J. Hausman, Ser No. 524,116, filed March 20, 1931, and which includes a type carrier rotatable through various angular distances to position any one of a series of short type bars thereon on alignment with the printing point and a type bar actuator, which actuator is caused to function to swing the selected type bar to print against a work sheet on the platen.

Heretofore it has been necessary, in machines provided with a type carrier having a set of types which are located side-by-side and are divided into two groups at opposite sides of the printing point, to arrange the types on the carrier in an order corresponding with the arrangement of the key levers having the same characters. In other words, since the key lever representing the letter "A" is located a considerable distance from the middle of the machine and almost at the lefthand end of the key board it has been necessary, because of the construction of former machines, to locate the type "A" near one end of the set of types on the type carrier. Thus characters such as "A", "S", "E", "O", "L" and "P" which are located near the outer ends of the type set and which are more frequently used than some of the characters at the middle of the type set have required greater angular movements of the type carrier. Consequently it has required more work to render effective the types which are most frequently used, which limited the speed of operation of the machine.

An object of the invention is to perform the typing with a minimum of work and to expedite the operation of the machine. To this end provision is made of means operable by the key levers to effect the selecting of the types and which permits those types which are most used to be located in the middle of the set of types or in other words at the inner ends of both groups of type bars irrespective of the location of their corresponding key levers in the key board. For example in this invention the letter A of the types is located near the middle of the entire type set of the type carrier, while the corresponding key lever "A" is located close to the lefthand side of the key board.

Another feature of the invention relates to novel means to rotate the type carrier in opposite directions from a normal position to locate any one of the types thereon at the printing point.

In carrying out this feature of the invention the key levers are divided into two groups one group for each group of types. Two continually running driving devices are provided one associated with each group of key levers, and these devices are driven by a single power shaft. There are further provided two driving devices connected to the opposite ends of an intermediate lever, which intermediate lever forms part of the type carrier actuating means and which lever, upon the actuation of said linkages, one at a time, rotates the type carrier from normal in one of two opposite directions and returns it to normal after printing. The linkages are normally at rest and a connection of either one may be effected, with the associated driving device, by an associated clutch the operation of which clutch is effected by means operable by any one of the key levers of the associated group. Each driving device is also effective to return its associated linkage and the type carrier to normal where the active clutch is automatically rendered ineffective to thus effect a disconnection of the linkage from the driving device.

Another feature of the invention relates to means for noiselessly arresting the type carrier in the various positions to which it may be rotated.

A further feature of the invention relates to fulcrum varying means which may cooperate with the actuating lever or fulcrum bar to vary the throw of the actuating means for the type carrier so as to selectively position the type carrier in any one of its angular positions to locate the selected type, corresponding to the character of the active key lever, at the printing point. The fulcrum varying means includes settable fulcrum devices or elements.

A further feature of the invention relates to means operable by the key levers to select any one of the fulcrum pins, and means operable by the key levers to subsequently actuate the selected fulcrum device to set it or in other words render it effective by suitable power means.

A further feature of the invention relates to means to lock the type carrier to prevent accidental displacement thereof and the connected actuating means from normal position.

Another feature of the invention relates to means operable by the key levers and associated with the fulcrum varying means to render the type carrier locking means ineffective upon each actuation of any one of the key levers.

Another feature of the invention relates to means for imparting, to the linkages of the type carrier actuating means, harmonic motion to gradually overcome the inertia of rest and motion of the type carrier.

Another feature of the invention relates to means to lock the key levers to prevent the actuation of any one of them until the fulcrum bar of the type carrier actuating mechanism has returned to normal.

Another feature of the invention relates to a power driven type bar actuator which cooperates with the selected type bar to cause it to print against the platen and which actuator is operable by either one of the driving devices through the medium of the associated linkage connected with the actuating mechanism of the type carrier.

Still another feature of the invention relates to novel means to effect an adjustment of the type bar actuator to compensate for the various thickness of the work sheets or pack of work sheets which may be inserted around the platen.

A further feature of the invention relates to the construction of the type bar carrier and its detachability from a drive shaft of the actuating mechanism.

Still another feature of the invention relates to the angular arrangement of the type bar carrier with respect to the platen and the type bar actuator.

Another feature of the invention relates to means whereby any one of a plurality of type bar carriers, each having a different style of types, may be connected with the type carrier actuating mechanism, and means whereby the shiftable support may be locked in any one of its positions.

Another feature of the invention relates to means to permit the type bar actuating means to be moved to an abnormal position to give access to the type bar carrier for replacement by another.

Other features of the invention relate to the clutch mechanism and means for controlling its operation.

One of the features of the clutch is that it includes one or more selecting devices and an equal number of connecting elements operable thereby for effecting the connection of the associated linkage with its driving device, each selecting device being electrically operated after a circuit has been partly established by a switch operable by any one of the key levers of the associated group.

Another feature of the invention relates to means for retaining the clutch connection until the active type carrier actuating linkage has been returned to normal irrespective of whether or not the switch is held closed by one of the key levers.

Another feature of the invention relates to means whereby the clutch may be rendered ineffective automatically, upon the return of the active linkage to normal, while a key lever is still in its depressed position. To this end there is provided a circuit breaker which is operable by the active linkage to open the switch so that the latter is effective when the linkage is returned to normal.

Further features of the invention relate to case shifting means, ribbon vibrating means and escapement actuating mechanism.

Other features and advantages will hereinafter appear.

In the drawings which form part of the specification:

Fig. 3 is a vertical longitudinal section of a major portion of the machine;

Fig. 4 is a detail view showing one of the fulcrum pins set in the lever of the type carrier actuating mechanism and the locking device or pin in its ineffective position;

Fig. 5 is a sectional top plan view of the machine, a portion thereof being broken away, the section being taken on the line 5—5 of Fig. 3 and showing the two groups of key levers, the fulcrum selecting means and other associated devices;

Fig. 7 is a sectional top plan view of the machine, showing the type carrier actuating mechanism and the two sets of operating linkages therefor in normal position;

Figure 16:
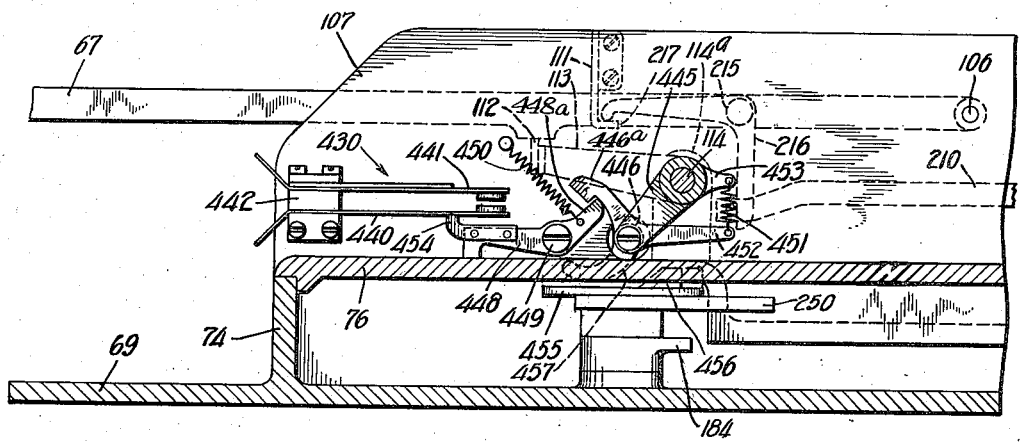
Figure 17:
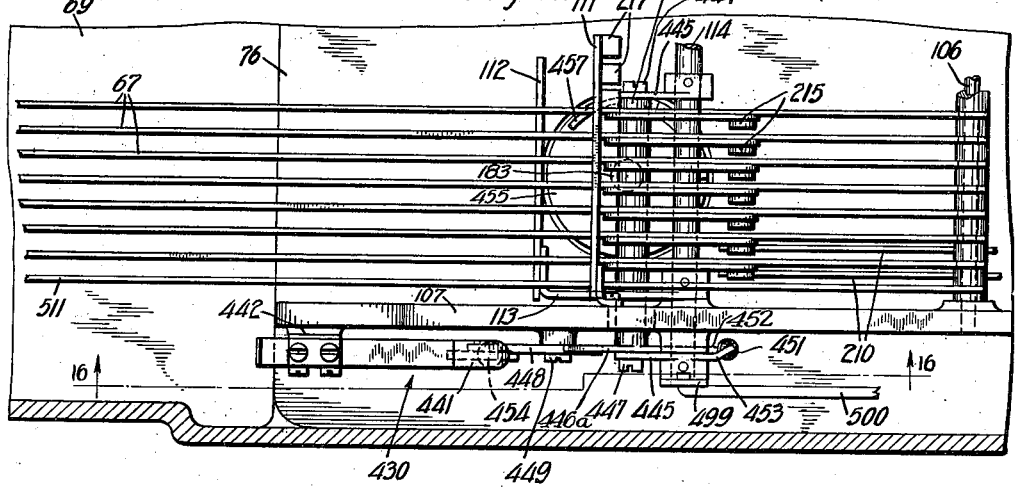
Figure 18:
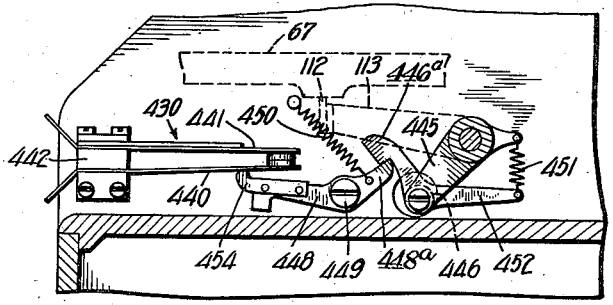
Figure 19:
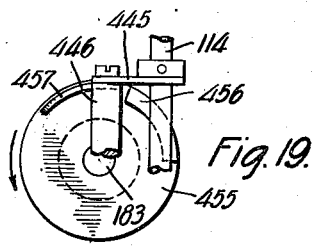
Figure 24:
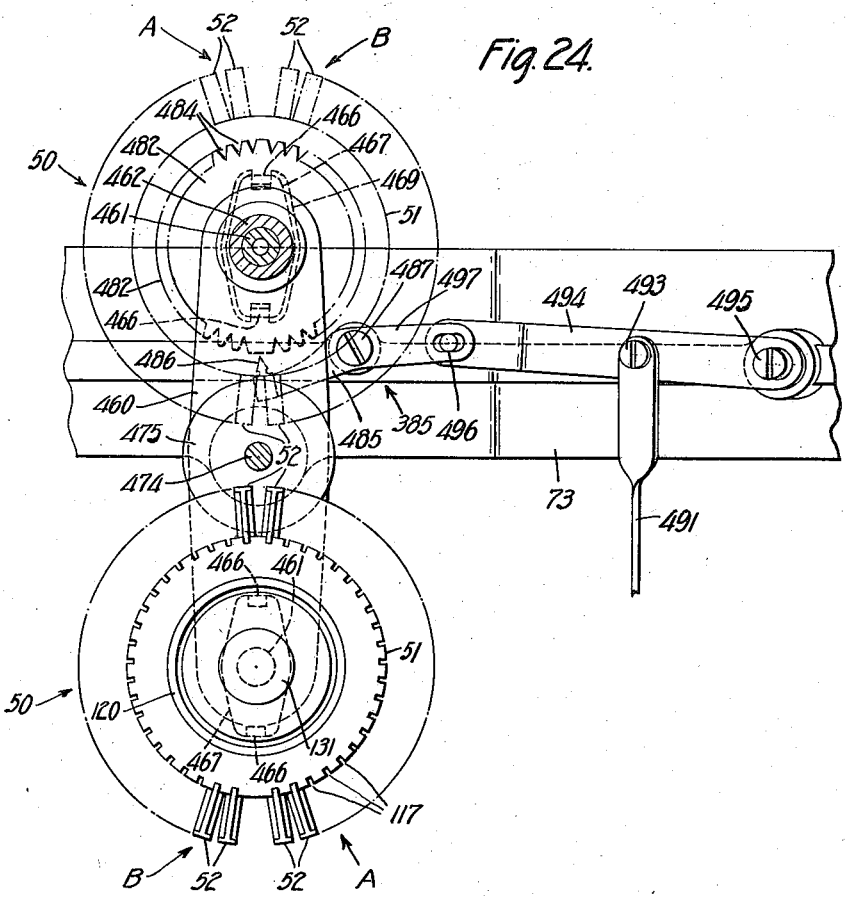
Figure 25:
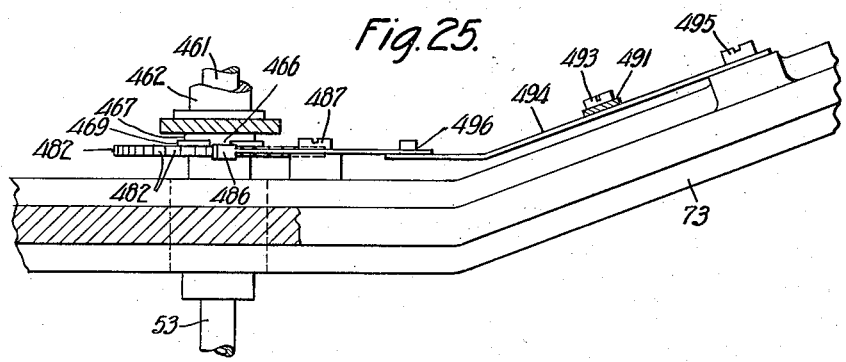
Figure 32:
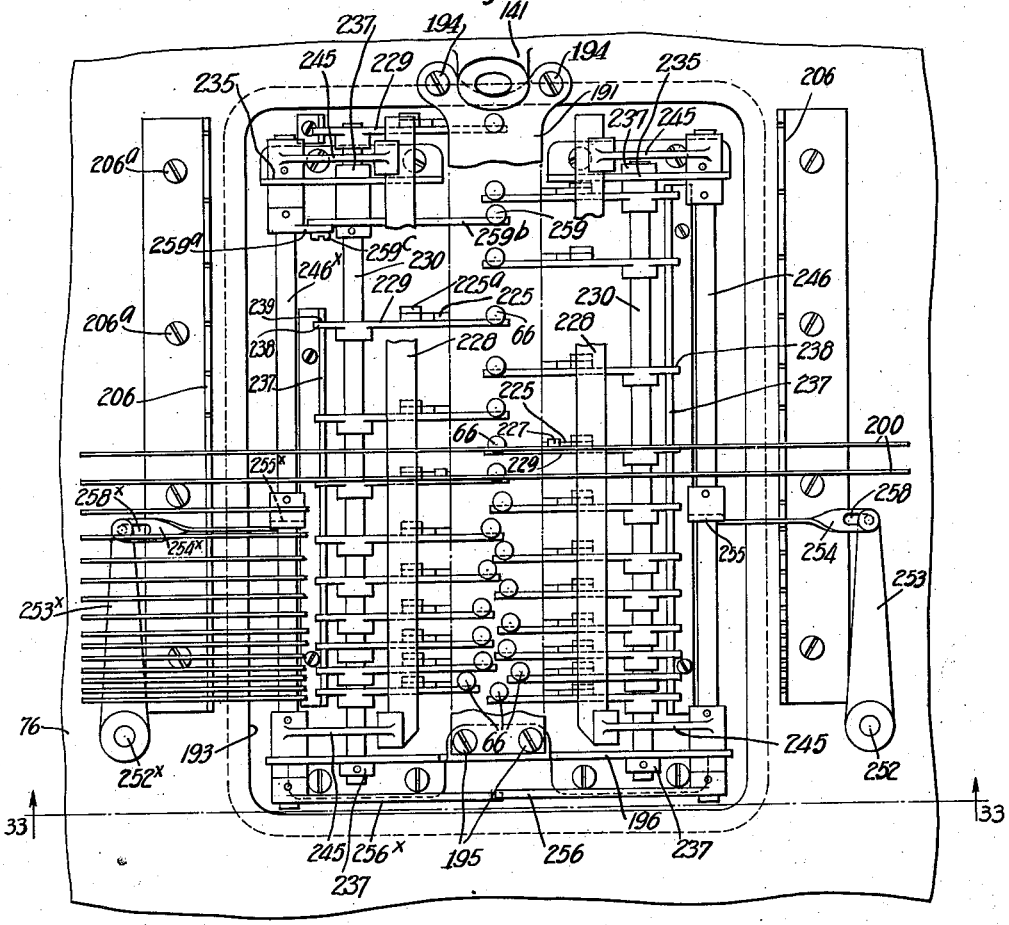
Figure 33:
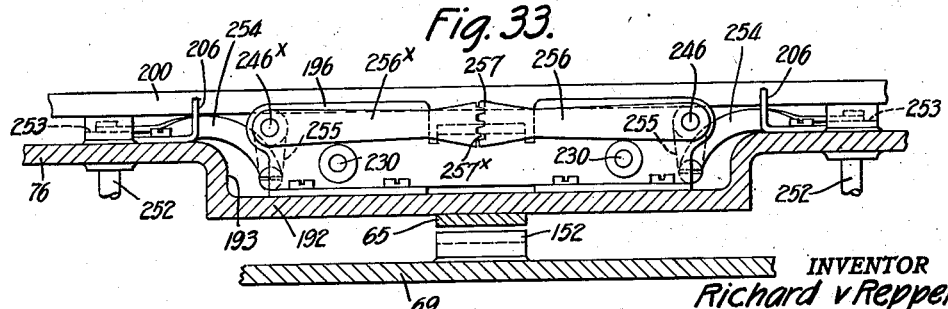
Figure 34:
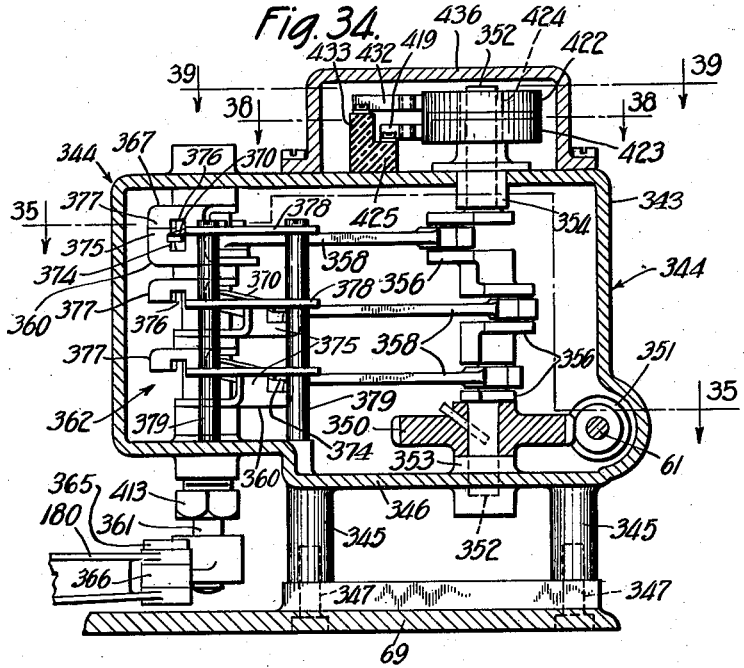
Figure 35:
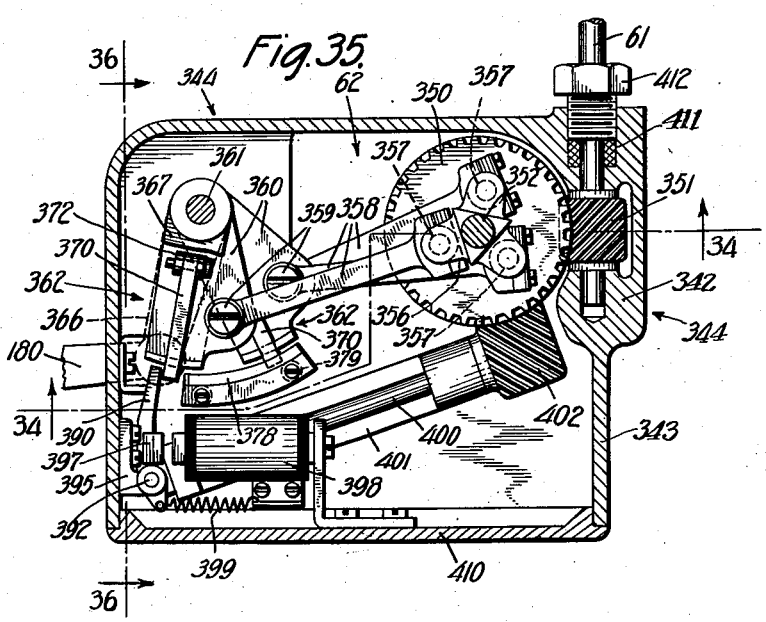
Figure 41:
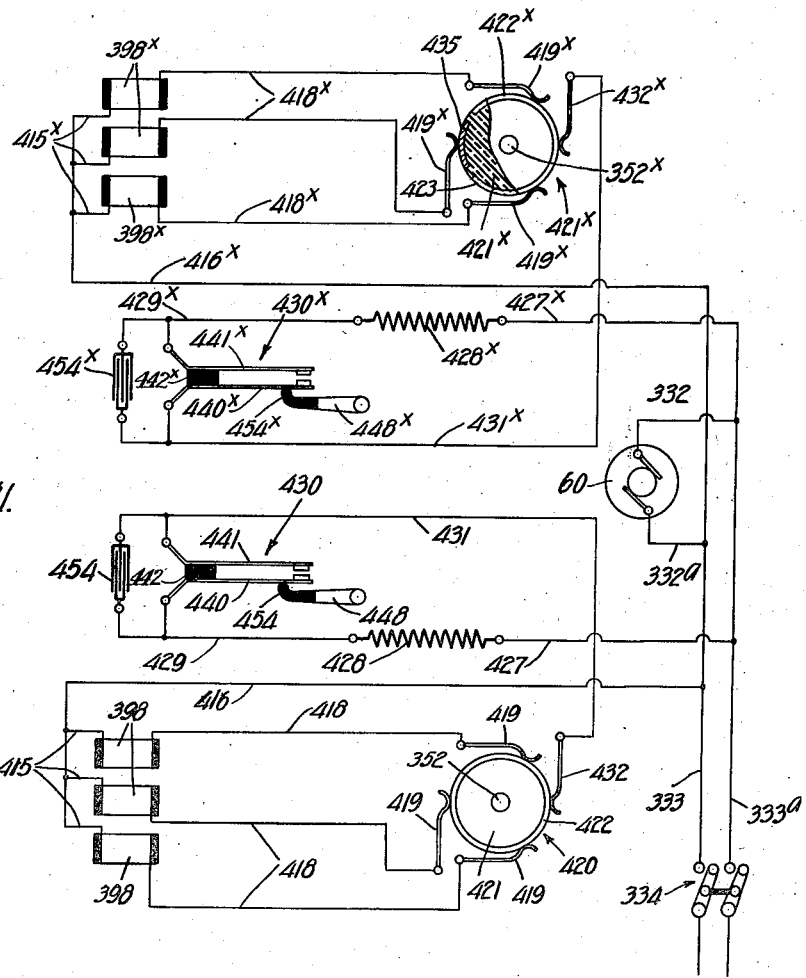
Figure 42:
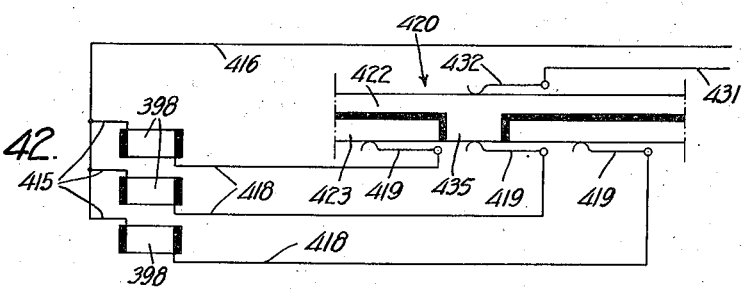
Figure 46:
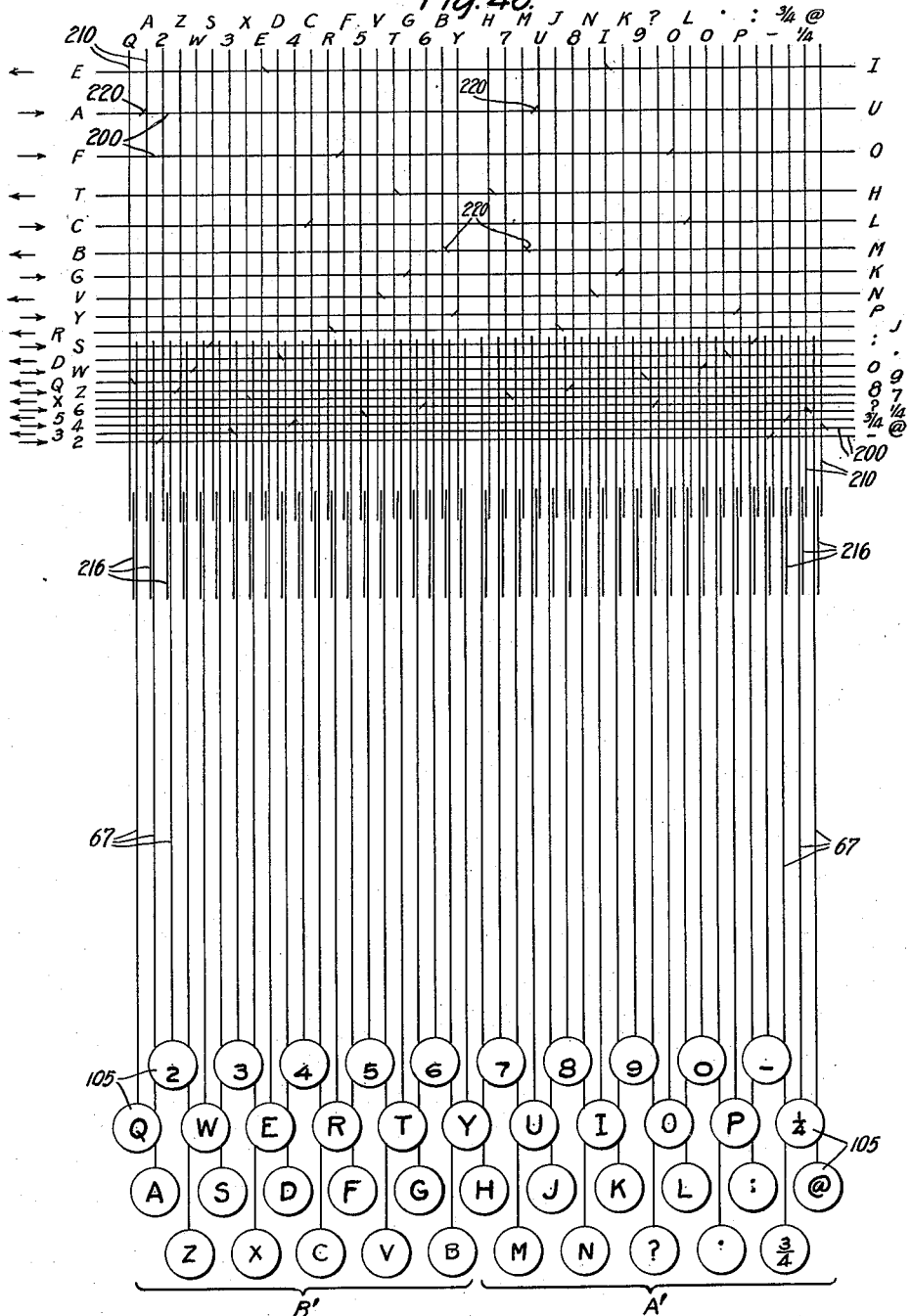
Figure 49:
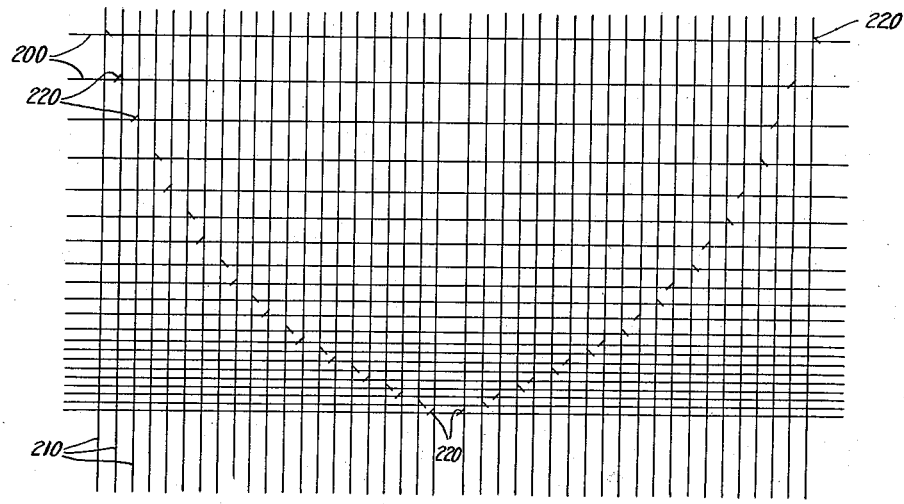
Figure 50:
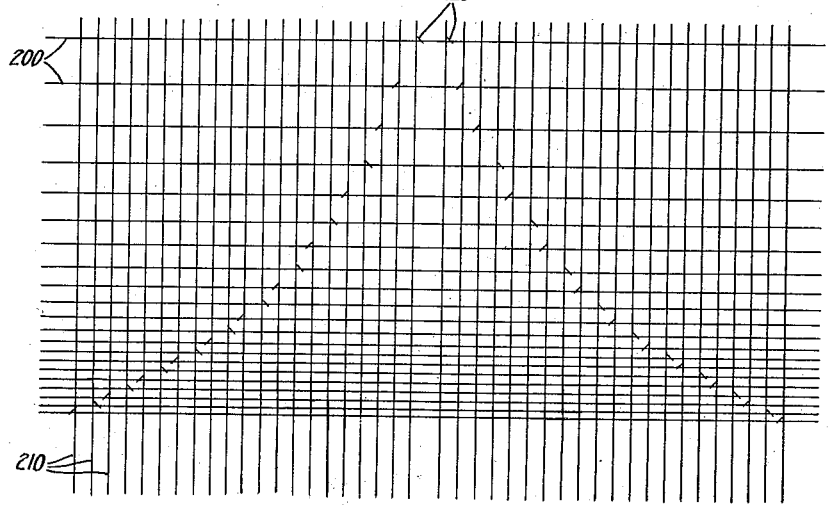
Figure 51:
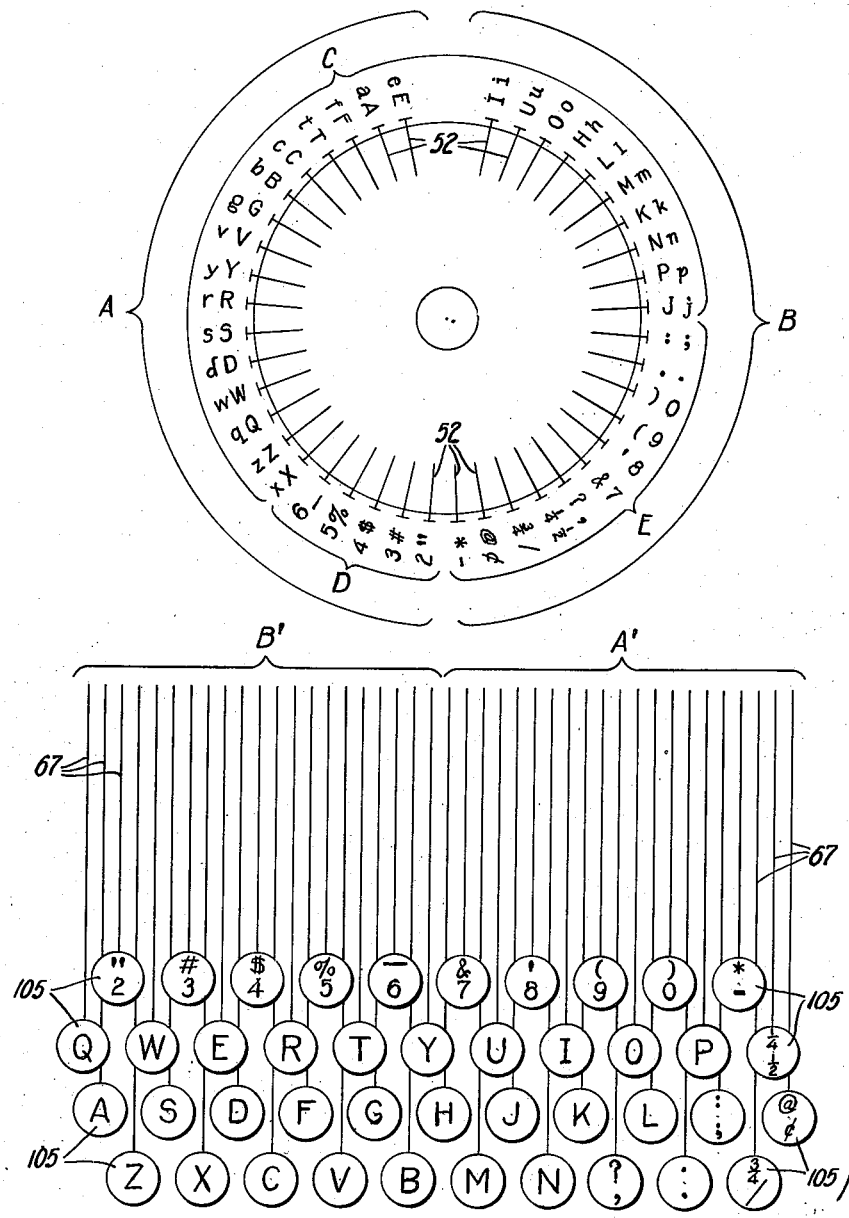

Fig. 7ᵃ is a detail front view, partly in section, of the intermediate lever and its support, and of the actuating mechanism for the type bar carrier;

Fig. 8 is a skeleton top plan view showing some of the parts illustrated in Fig. 7 and the linkage at the righthand side of the machine actuated by its associated driving device to effect the actuation of the type bar carrier;

Fig. 9 is a view similar to Fig. 8 showing the linkage at the lefthand side of the machine actuated;

Fig. 10 is a front elevation of the machine partly in section;

Fig. 11 is a detail front view, in section, showing the locking pin for the fulcrum lever in its effective position and the actuating means therefor;

Fig. 12 is a view similar to Fig. 11 showing the locking pin in its ineffective position and the fulcrum lever actuated;

Fig. 13 is a vertical, transverse section of the machine taken substantially on line 13—13 of Fig. 3;

Fig. 14 is a fragmentary, vertical, transverse section of the fulcrum pin setting means and showing one of the interponents connected with the power actuated universal bar by the key operated selecting means;

Fig. 15 is a view similar to Fig. 14 but showing the selected fulcrum pin set into engagement with the fulcrum bar;

Fig. 16 is a sectional side view, taken on the line 16—16 of Fig. 17, of a portion of the machine, and shows the switch associated with the group of key levers at the righthand side of the machine, the means for closing the switch manually by any one of the group of key levers, and the means for automatically opening the switch;

Fig. 17 is a top plan view of the parts shown in Fig. 16;

Fig. 18 is a view similar to Fig. 16 showing the switch closed by the operation of one of the key levers;

Fig. 19 is a detail top plan view of a cam and some of the mechanism operated thereby to automatically open the switch of Fig. 18 so that the active linkage may be disconnected from the power means upon the return of said linkage to normal;

Fig. 20 is a vertical section of a portion of the machine showing a plurality of type bar carriers, a single actuating mechanism with which any one of the type bar carriers may be connected, a type actuating mechanism including a pressure element, means whereby the pressure element may be adjusted to compensate for the thickness of the work sheet or pack to work sheets on the platen, and a bracket to support the type bar actuating element so that it may be moved thereby to an abnormal position so as to permit replacement of the type bar carrier;

Fig. 21 is a detail front view of the pressure adjusting means for the type bar actuator;

Fig. 22 is a detail sectional view taken on the line 22—22 of Fig. 20 and showing the means for shifting the support for the type bar carriers and the locking means therefor;

Fig. 23 is a detail sectional view showing the coupling between the type bar carrier and the drive shaft of the actuating mechanism;

Fig. 24 is a fragmentary sectional view taken on the line 24—24 of Fig. 20;

Fig. 25 is a bottom plan view of Fig. 24;

Fig. 26 is a front vertical section taken on, for the greater part, the line 25—25 of Fig. 3 showing the fulcrum pin selecting means and the actuating means therefor;

Fig. 27 is a detail sectional view showing a single type bar carrier and its connection with the drive shaft;

Fig. 27a is a graph or time-distance diagram of the resultant motion produced by the linkages which actuate the fulcrum lever;

Fig. 27b is a diagrammatic view of part of the means which actuates the fulcrum lever;

Fig. 28 is a skeleton view showing a key lever and the associated fulcrum pin selecting means;

Fig. 29 is a top plan view of Fig. 28;

Fig. 30 is a detail top plan view of one of the key operated slides and the associated transverse bar of the fulcrum pin selecting means in normal position;

Fig. 31 is a view similar to Fig. 30 but shows the parts operated;

Fig. 32 is a top plan view of a portion of the machine showing the pins of the fulcrum varying means, the selecting means and the setting means therefor;

Fig. 33 is a front view in section on the line 33—33 of Fig. 32;

Fig. 34 is a vertical section of the driving device at the righthand side of the machine and the associated clutch, the section being taken substantially on the line 34—34 of Fig. 35;

Fig. 35 is a sectional top plan view taken on the line 35—35 of Fig. 34;

Fig. 36 is a sectional front view taken on the line 36—36 of Fig. 35;

Fig. 37 is a detail view showing a pair of clutch elements, and an associated connecting member in its effective position;

Fig. 37a is a view similar to Fig. 37 showing how the clutch connecting or coupling member is held in its effective position while the clutch elements are in operation;

Fig. 38 is a sectional top plan view taken on the line 38—38 of Fig. 34 and shows the commutator switch on the crank shaft of one of the driving devices;

Fig. 39 is a sectional view, similar to Fig. 38, taken on the line 39—39 of Fig. 34;

Fig. 40 is a sectional view, taken just beneath the type carrying table in Fig. 20, showing the indexing means, associated with the driving shaft connected to the type bar carrier in its operated position;

Fig. 41 is a diagram of the electric circuit;

Fig. 42 is a diagrammatic view showing one of the commutator switches developed and the associated electric circuit;

Fig. 43 is a sectional side view of the machine showing the case shifting mechanism;

Fig. 44 is a skeleton side view showing the platen shifted down to its upper case position;

Fig. 45 is a sectional top plan view, of a portion of the machine, taken on the line 45—45 of Fig. 43 and showing the case shift mechanism;

Fig. 46 is a diagrammatic, top plan view illustrating the arrangement of the key levers, slide bars operated thereby and particularly the arrangement of connections between the slide bars and the transverse selecting bars of the fulcrum varying means;

Figs. 47 to 50 inclusive show other possible arrangements of the connections between the slide bars and the selecting bars of the fulcrum varying means; and Fig. 51 is a diagrammatic view showing the grouping of the types with relation to each other and their arrangement with respect to the key levers.

Similar reference characters represent similar parts throughout the specification.

*General description*

A general description will first be given followed by a more detailed description of the construction and operation of the machine. The machine includes one or more type units 50, Figs. 3, 20 and 24, comprising a body part 51 on which are mounted two groups A and B of short or midget type bars 52. The body part or carrier 51 is attached to a shaft 53 which may be rotated in opposite directions from a normal position to accordingly rotate the type carrier to thus locate any one of the type bars of either group at the printing point. A type bar actuator 54, which is in alignment with the printing point, is also operable to actuate the selected type bar against a platen 55 to print through a ribbon 56 and against a work sheet on said platen, each type bar being provided with a lower case type 57 and an upper case type 58.

A continually running motor prime mover 60 drives a horizontal shaft 61 extending transversely of the machine at the rear and in the lower part thereof. Connected to the shaft 61 are two continually running driving devices 62 and 62$^x$, Fig. 7, said driving devices being associated with actuating linkages 63 and 63$^x$ respectively connected at their forward ends, to the opposite ends of an intermediate lever 64. Said lever 64 is operable in opposite directions from a normal position in Fig. 7 to either of the positions shown in Figs. 8 and 9 to accordingly operate a lever or fulcrum bar 65 connected to rotate the shaft 53, said fulcrum bar receiving always the same extent of motion from either of the linkages 63 and 63$^x$ and being operable about any one of a set of fulcrum pins 66, Figs. 8 and 9, which are selectively settable, as hereinafter described, by means under the control of the key levers 67. The key levers 67 are also divided into two groups A' and B', Fig. 46, said key levers representing characters corresponding to those of the types on the type bars 52 of the groups A and B respectively.

The linkages 63 and 63$^x$ are normally disconnected from their continually running driving devices 62 and 62$^x$ and the groups A' and B' of key levers are associated with the righthand linkage and the lefthand linkage respectively so that upon the depression of any one of the key levers a connection is effected of the associated linkage 63 or 63$^x$ with its driving device 62 or 62$^x$ and thus the type bar carrier is actuated to position the selected type bar at the printing point.

Figure 6:
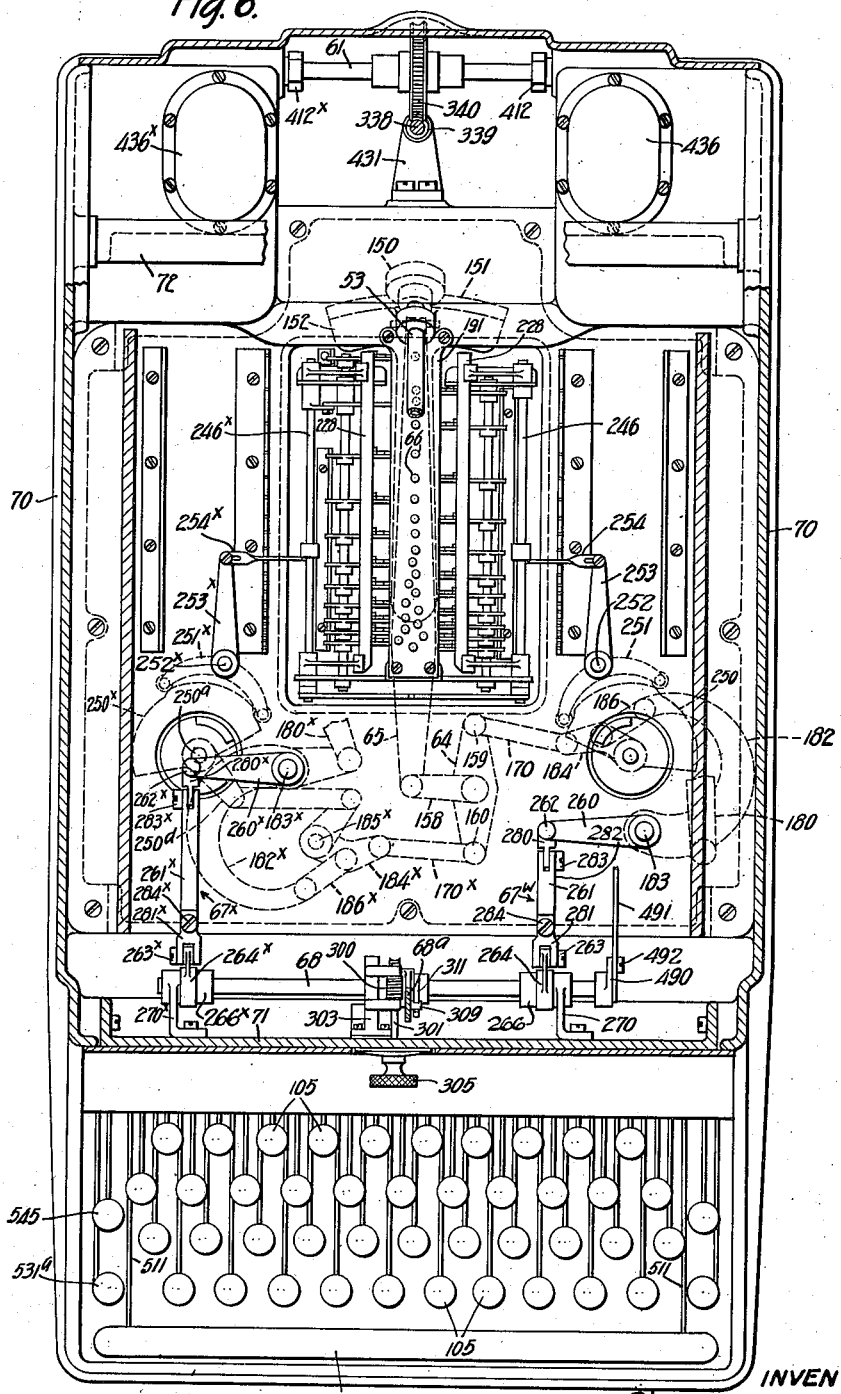
Fig. 6 is a sectional top plan view of the machine, taken substantially on the line 6—6 of Fig. 3, showing the two devices at the opposite sides of the machine for actuating the fulcrum pins and the devices for actuating the type bar actuator.

The linkages 63 and 63ˣ have connected thereto, Figs. 3 and 6, linkages 67ʷ and 67ˣ respectively to actuate a rock shaft 68, the latter having an upwardly extending arm 68ᵃ thereon which is connected to and operates the type bar actuating plunger 54. Thus whenever either one of the linkages 63 or 63ˣ is actuated to position the selected type bar at the printing point the type bar actuating element or plunger 54 is also actuated through one of the linkages 67ʷ and 67ˣ to effect the printing against a work sheet, not shown, on the platen.

Following is more detailed description of the construction and operation of the machine.

Frame

The machine includes a main frame having a base plate 69, Figs. 3 and 13, to which are secured, in any suitable manner, two side plates 70, the latter being secured to each other by a front plate 71 and bars or bridges 72 and 73. Rising from the base plate 70 is a short wall 74 near the front of the machine, and a short wall 75 near the back of the machine, said walls extending from one to the other of the side plates 71. Supported on the walls 74 and 75 and on lugs 70ᵃ, Figs. 7 and 13, of the side plates 70 is a top plate 76 to form with said walls and the side plates 71 a chamber 77 to contain the fulcrum bar 65 and the linkages 63 to protect them against dust and other objectionable matter such as erasings, and which chamber may contain a suitable lubricant for the actuating devices therein.

Carriage

Figure 1:
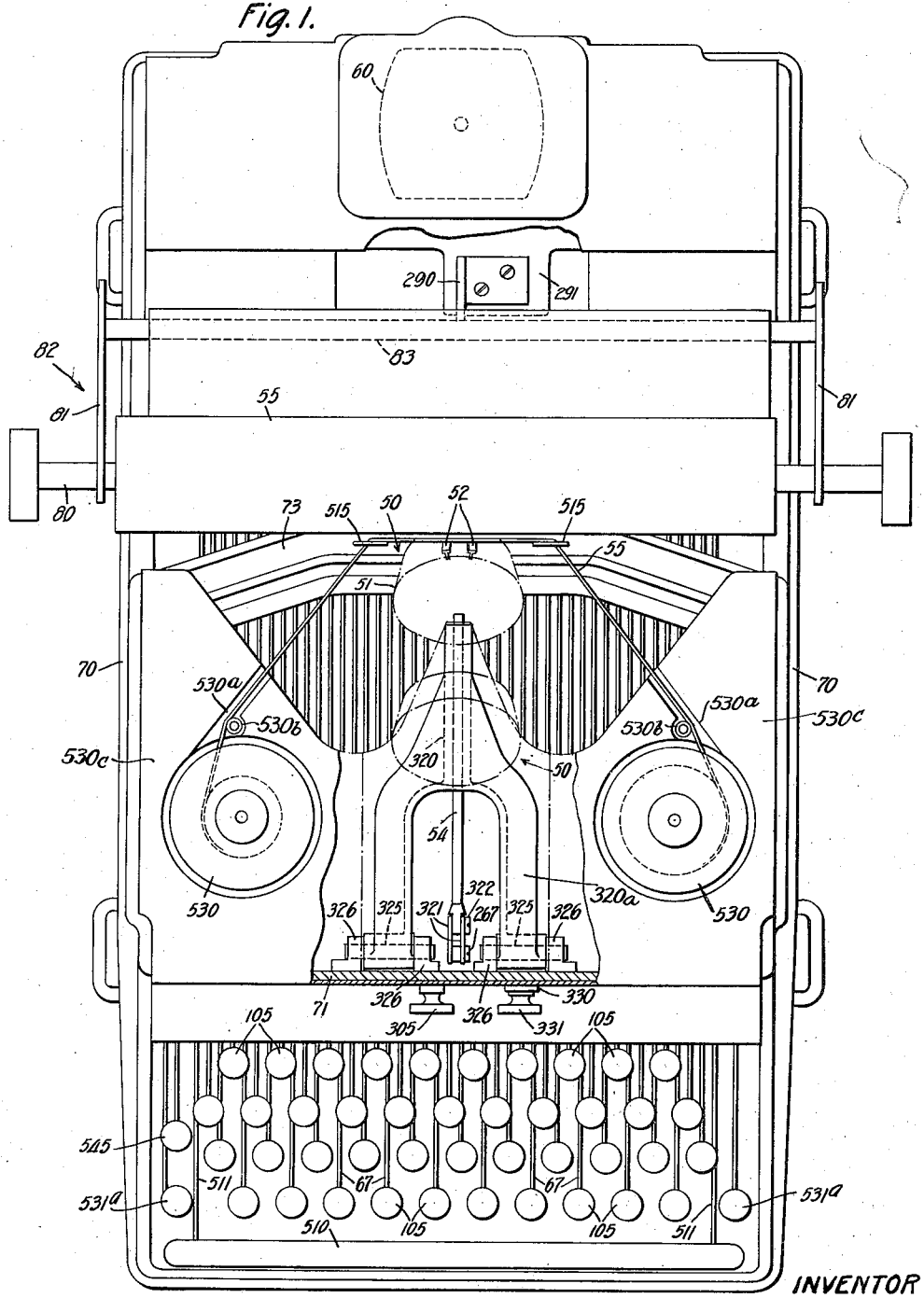
Fig. 1 is a top plan view of the machine.
Figure 2:
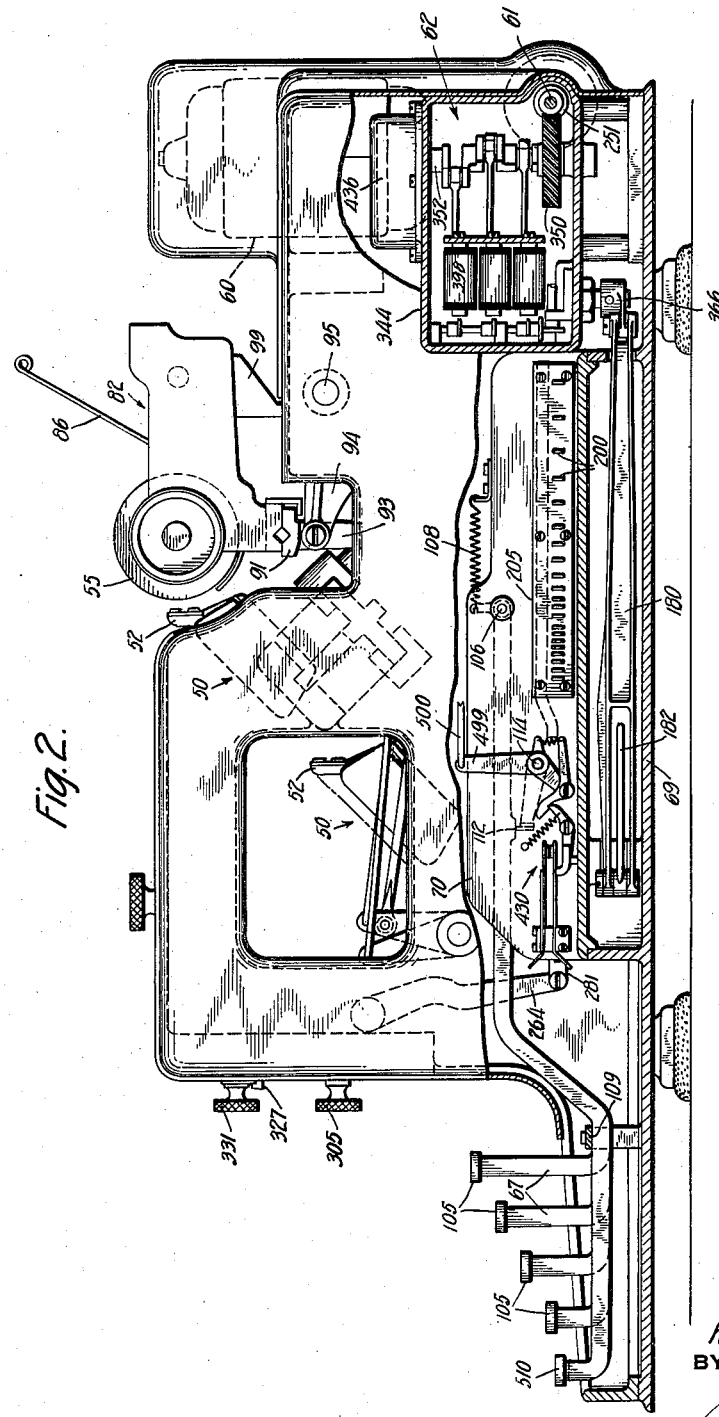
Fig. 2 is a side elevation of the machine, partly in section.

The platen 55, Figs. 1 and 3, is supported by a shaft 80 mounted to rotate in end plates 81 of a carriage 82, said end plates 81 being connected to each other by guide bars 83 and 84 and an angle bar 85. The work sheet, not shown, may be inserted around the platen from the rear thereof over a paper table 86 having an apron 87 to guide the work sheet to the printing line. Feed rollers 88 and 89 may be supported on the carriage in any well known manner to assist in feeding the work sheet around the platen.

Platen shift frame

A platen shift frame 90, Figs. 3, 43 and 44, is is provided which includes a rail 91 upon which the carriage is supported to travel back and forth transversely of the machine through the medium of anti-friction balls or rollers 92 under the bar 84 of the carriage. The carriage may be urged in a letter space direction by a spring drum, not shown. Arms 93 extend downwardly from the rail 91, one at each end thereof, and are pivotally connected, at 93ᵃ, to bell cranks 94 secured to a rock shaft 95, supported in the side plates 70. The bell cranks 94 and the rock shaft 95 form a frame which may be actuated, by means and in a manner hereinafter described, to shift the platen. Guide links 96 are connected at their forward ends by pivot studs 97 to the lower ends of the arms 93, the rear ends of the guide links being pivoted on the side plates 70 of the main frame by studs 98.

Secured to the rail 91, near the middle thereof, is a bracket 99ᵃ, Figs. 3 and 43, including two rearwardly extending arms 99 joined by a cross bar 100, the latter having rotatably supported thereon a roller 101 engaged by the bar 83 to assist in guiding the carriage.

Key levers

There are forty-two key levers 67, Figs. 3, 5 and 46, one for each type bar 52 on the type carrier 50. These key levers are provided at their forward ends with character keys 105 arranged in four banks in the key board. All of the key levers are supported at their rear ends by a fulcrum rod 106, Fig. 3, supported in two walls 107, Fig. 13, extending upwardly from the top plate 76, about which rod the key levers may be actuated individually against the action of return springs 108 which hold the key levers in their normal position against a fixed bar 109 extending over the key levers near the forward ends thereof. The key levers may be guided in slots 110 of a comb plate 111 secured at opposite ends to the walls 107.

As previously stated the key levers are arranged in two groups A' and B' one for each of the groups A and B of type bars respectively and the reason for dividing the key levers into two groups is to effect the actuation of the type carrier in opposite directions by means hereinafter described under the control of each group of key levers. Said groups of key levers have associated therewith universal bars 112 and 112ˣ, Fig. 5, each extending transversely under the key levers of its associated group so that it may be actuated by any one of the key levers in the group to perform various functions, hereinafter described, such as feeding the carriage, vibrating the ribbon and effecting the actuation of the type carrier 50 and the type bar actuator 54. The universal bar 112 has two rearwardly extending arms 113 by which it is secured to a rock shaft 114, the latter being supported at its outer end in the walls 107, and at its inner end by a bracket 114ᵃ.

Type carrier

The body part 51 of the type carrier is shaped like the frustum of a cone and is provided at its narrow or lower end with an annular groove 115, Figs. 20 and 27, in which there is located a fulcrum ring or wire 116 upon which all of the type bars are pivotally supported so that they may be actuated about the fulcrum wire to print against the platen.

The type bars 52 lie in radial slots 117 and they are held against the floors 118 of their slots by return springs 119, each spring being connected at one end to its type bar and at its other end to a wire ring 120 located in a groove 121 formed in the upper end of the body part 51, said springs 119 extending through holes or apertures 119ᵃ which extend substantially at right angles to the type bars 52. Each type bar is provided with a slot 122 to permit any one of the type bars to be readily detached from the fulcrum wire 116 for replacement or substituion by one having a different character to suit the class of work; for example, sometimes it is desired to have a % character instead of the ¾ character. It will be understood that in assembling, the springs, after being hooked on to the wire 121, are inserted into the holes 119ᵃ and the wire ring 121 is then seated in the groove 120. Each type bar after it is connected to its spring may then be slipped over the fulcrum ring 116 into its normal position on the type carrier.

The type carrier 50 is constructed so that it may be operated with a minimum of effort. To this end the body part 51 is made as light as possible and may be composed of light weight material such as aluminum, bakelite or other material, and it is provided with a major aperture 123, Fig. 27, extending into it from its lower end to further reduce its weight. The type bars are cumbent, or in other words, they lie down against the body part so as to concentrate the mass of the type bar carrier as close as possible to the center thereof to further facilitate its operation.

In one form of the invention the type bar carrier 50 may be attached to the drive shaft 53 of the actuating mechanism as shown in Fig. 27, the upper end of the body part 51 having a thin web 124 to which is secured a sleeve 125 in any convenient manner as for example by rivets 126 extending through a flange 127 on said sleeve and the web. The sleeve 125 fits over a reduced end or stub shaft 128 of a sleeve 129 which, in this form of the invention, is secured to the upper end of the drive shaft 53 by a pin 130 so as to rotate with said shaft. A thumb screw 131 extends into the sleeve 125 and is threaded into the upper shaft 128, said screw being provided with a head 132 engaging the upper end sleeve 125 to hold the type carrier on the shaft axially thereof.

The type carrier 50 is connected to the sleeve 129, to rotate therewith, by means of a coupling 135 which includes a flange 136 on the member 129 of the shaft 53 and a flange 137 on the sleeve 125 of the type carrier, one of said flanges having one or more pins 137a extending into one or more holes 138 of the other flange, the pins 134 being herein shown secured to the flange 136.

Thus it will be understood that by means of the screw 131 and the coupling 135 the type carrier is detachably connected to the drive shaft 53 to facilitate replacement by another type carrier which may have a different style of types. Provision is made, as hereinafter described, to move the type bar actuator 54 to an abnormal position so as not to interfere with the removal of the type bar carrier from the drive shaft 53.

*Arrangement of types relative to platen and type bar actuator*

It will be noticed by an inspection of Figs. 3 and 20 that the type bar carrier 50 is angularly disposed with reference to the platen and the type bar actuator. One advantage of this arrangement, as previously stated, is that the type bars may lie as close as possible to the axis of the type bar carrier so that it may be rotated with a minimum of effort. Another advantage of this arrangement is that the free ends of the type bars project beyond the body part 51 so as to extend between the actuator 54 and the platen while in alignment with the printing point. A still further advantage of this arrangement of the type bar carrier is that by it an extremely simple connection, shaft 53, can be used between the type carrier which is located in the upper part of the machine and the actuating mechanism for said shaft, which actuating mechanism is located in the lower part of the machine.

*Actuating mechanism for type bar carrier*

The type bar carrier actuating mechanism includes the drive shaft 53, which may be tubular as in Fig. 20, and the upper end of which is rotatably supported in a boss 140 on the angularly disposed bridge 73 of the machine frame. The lower end of the shaft extends through an aperture 141 in the top plate 76, see Fig. 3 also, and is guided by a ball bearing 142 held in a bracket 143 secured to the base plate 69, the shaft making connection with said bearing by a short shaft member 144 having a flange 145 resting against the ball bearing, the portion above the flange of said shaft member extending into the lower end of the shaft 53 and being secured thereto by a pin 146, the portion of the shaft member 144 below the flange 145 extending into the ball bearing.

To the lower end of the drive shaft 53 is secured a pinion 150 engaged by a gear sector or rack 151 having an arm 152 by which it is pivotally supported to swing about a stud 153 on the base plate 69, Figs. 3 and 8, to rotate the shaft 53 through the medium of the rack 151 and pinion 150, said stud having a head which is located in a counter bore 154, Fig. 14, in the forward end of said lever so that the top of said head is flush with the upper face of the arm 152. The rear end of the arm 152 rests on a table or ridge 155, Figs. 3 and 7, formed on the base plate 69 over which the arm may be actuated. The pinion 150 and rack 151 may be composed of Durtex or any other suitable material which is light in weight and which is also practically noiseless in its operation, the rack 151 being secured to the arm 152 by rivets 156.

The forward end of the fulcrum bar or lever 65 is connected, by a link 158, Fig. 7, with the intermediate lever 64, so that it may be actuated in opposite directions from its normal position by the linkages 63 and 63x which, it will be remembered, are connected to the opposite ends of the intermediate lever 64, pivot studs 159 and 160 being provided for this purpose, the linkages 63 and 63x being connectible with the driving devices 62 and 62x upon the actuation of the key levers. The link 158 is pivotally connected to the levers 64 and 65 by pivot studs 161 and 162 respectively. The forward end of the fulcrum bar 66 rests upon a table or ridge 165 formed on the base plate 69 upon which it oscillates back and forth while in operation. The rear end of the lever 65 is connected with the rack arm 152 by engaging in a slot 166 formed between two upwardly extending fingers 167 on said rack arm and said lever rests on the floor of said slot which is slightly above the upper face of the arm 152 and at the same level as the upper face of the table 165, so that the lever 65 moves freely and unobstructed over the arm 152. It will be understood that the rear end of the lever 65 travels in differently curved paths, struck about the fulcrum pins 66, and that this is one reason for pivotally supporting the gear sector 151 independently of the actuating lever 65 so that said rack may move always in the same path to properly engage the pinion 150.

*Intermediate actuating lever, support and guide therefor*

The intermediate lever 64 has pivotally connected thereto by the studs 159 and 160 links 170 and 170x respectively, of the righthand linkage 63 and the lefthand linkage 63x, each stud serving as a fulcrum of the lever 64 while said lever is being operated by the linkage connected to the opposite end, the linkage at rest being effective, in a manner hereinafter more clearly described, to hold the end of the intermediate lever to which it is connected, against accidental displacement.

The intermediate lever 64 is floatingly supported by a guide bar or slide 172, Figs. 7 and 7a, which is arranged to move back and forth in slots 173, Fig. 9, of bosses 174 on the base plate 69, straps 175 being secured to the top faces of said bosses by screws 176 to hold the slide 172 in the slots.

If an arc B is drawn leftwardly in Fig. 27b around the point of connection 159, at one end of the lever 64 as a center, and through the point of connection 161, and a similar arc $B^1$ is drawn rightwardly around the point of connection 160, and these arcs are extended to the operated positions O and $O^1$ of the lever 64, it will be found that the chords C and $C^1$ of the arcs B and $B^1$ between the normal position of the lever and the extreme positions thereof lie on the same straight line and that this line is parallel to the short sides P and $P^1$ of a parallelogram, formed by sides O, P, $O^1$, $P^1$, of which the two points of connection 159 and 160 in their normal positions and in their operated positions determine the corners. The slide 172 is, Figs. 7 and 7ª, positioned to move in the direction determined by the chords C and $C^1$, so as to leave the studs 159 and 160, while they serve as fulcrums for the lever 64, practically undisturbed.

Actuating linkages 63 and $63^x$

The actuating linkage 63 at the right side of the machine has a connecting rod 180, Fig. 7, which is normally disconnected from its driving device 62. Upon the connection of said rod 180, which is effected by the actuation of any one of the key levers of the associated group, in a manner hereinafter described, said connecting rod is caused to make one reciprocation or in other words a rearward movement followed by a forward movement to restore it to normal. The forward end of the connecting rod 180 is connected by a stud 181 to a goosenecked lever 182 secured to a vertical rock shaft 183.

As the connecting rod 180 moves rearwardly the lever 182 swings in a counter-clockwise direction, Fig. 7, to actuate an arm 184 in a counter-clockwise direction, said arm being secured to a vertical rock shaft 185, connection between the lever 182 and arm 184 being had by means of a link 186 attached to the lever 182 by a pivot stud 187 and to the arm 184 by a pivot stud 188. The arm 184 has connected to its free end the link 170 by means of a stud 189, and as said arm 184 moves in a counter-clockwise direction it draws the link 170 leftwardly in the machine to actuate the intermediate or floating lever 64 in a clockwise direction, about the stud 160, to the position in Fig. 9 thus swinging the actuating lever 65 in a counter-clockwise direction, about the selected fulcrum pin 66, to rotate the drive shaft 53 and the type carrier in a clockwise direction, through the medium of the rack 151 and pinion 150, and thus locate the selected type bar of the group A at the printing point. The actuator 50 then operates the selected type bar to print against the platen.

The linkage $64^x$ at the lefthand side of the machine is composed of parts similar to those of the linkage 63, with one exception, and these similar parts have been given the same reference numeral with the superscript x; the exception being that the lever $182^x$ is provided with an arm $182^a$ to which the link $180^x$ is connected.

Toggles of actuating linkages

To gradually overcome the inertia of rest of the type carrier to facilitate the operation of the machine the linkages 63 and $63^x$ are provided with toggles which are composed of the parts 170, 184 and $170^x$, $184^x$ and are alike in construction and operation. Normally these toggles are in their extended posittions or in other words the points of connection 159 and 189 of one toggle are on a straight line extending through the axis of the shaft 185; in other words the toggle is on dead center while the points 160 and $189^x$ of the other toggle are similarly disposed with reference to the axis of the shaft $185^x$.

Thus it will be understood that by this arrangement either toggle while being actuated from its normal position imparts an extremely slow motion, during its initial movement, to the type carrier through the medium of the actuating mechanism including the fulcrum bar or lever 65. This movement is, however, accelerated as the operation of the toggle continues, through a considerable extent, and the motion of the type carrier is then decelerated, by means other than the toggles 170, 184 and $170^x$, $184^x$, and now to be described, as it approaches the selected position to which it is being rotated.

To decelerate the motion of the type carrier and thus gradually overcome the action of its kinetic energy the linkages 63 and $63^x$ include other toggles composed of the parts 182, 186 and $182^x$, $186^x$ respectively. It will be seen that as the lever 182 approaches its extreme operated position the points 187, 188 come to a dead center or in other words to a line extending through the centers of the pivots 187 and 188 and through the axis of the shaft 183, Fig. 9, where there is no motion imparted to the type carrier 50. It will be understood that the operation of the toggle $182^x$, composed of the parts $182^x$ and $186^x$, is the same as that above described. Thus the type carrier may be noiselessly arrested in its selected position by either of the toggles 182, 184 and $182^x$, $184^x$; the toggles 170, 184 and $170^x$, $184^x$ being effective to noiselessly arrest the type carrier upon its return to its normal position.

It will be understood that the motions received by the fulcrum bar 65 from the linkages 63 and $63^x$ are equal and always the same but in opposite directions and that these motions are converted to impart smaller or greater movements to the type bar carrier in accordance with the angular distance of the selected type bar from the printing point.

Fulcrum varying means for type carrier actuating lever

These variable movements imparted by the lever 65 to the type carrier are effected by fulcrum varying means for the lever 65, which means includes the set of fulcrum pins 66 which are normally ineffective and may be set individually to engage in holes 190 of the actuating lever 65, the corner at the lower end of each pin 66 and the upper corner of each hole 190 being slightly rounded or bevelled so that the pins may readily enter the holes. Said pins 66 are guided in a plate 191, Figs. 3, 6 and 11, and a plate 191ª inserted in the floor 192 of a depression 193 formed in the top plate 76, the guide plate 191 being secured at its rear end to the top plate 76 by screws 194, Figs. 5 and 32, and at its forward end by screws 195 to a bracket 196 extending upwardly from and suitably secured to the floor 192; the plate 191ª being secured to the floor 192 in any convenient manner. The pins 66 are selectable, in a manner hereinafter described, and are subsequently settable into cooperative relation with the lever 65.

The fulcrum pins 66 are arranged successively along the actuating lever 65 and they are spaced different distances from each other the space between them being smaller as the series progresses towards the front of the machine. For a considerable distance the pins are arranged in a straight line, but because of the closeness of the pins at the forward end of the series they are staggered with reference to each other.

As previously stated the type bars 52 on the type carrier 50 are divided into two groups A and B and the key levers are divided into two corresponding groups A' and B'. It will further be understood that although there are shown forty-two type bars and the same number of key levers, there are only half as many, (twenty-one) fulcrum pins 66, each fulcrum pin representing two key levers and the two corresponding type bars. This construction not only simplifies the machine and therefor increases its efficiency, but it is also a factor of economy in its manufacture.

*Fulcrum pin selecting means*

The pin selecting means includes a set of transversely extending slide bars 200, Figs. 3, 5, 26 and 32, twenty-one in number, one for each fulcrum pin 66. These are actuable some to the righthand side of the machine and some to the lefthand side of the machine, in a manner described later, against the action of return springs 201, Fig. 26, said springs being connected to ears 202 on said bars and to fixed angle plates 203 one at each side of the machine. The selecting slides 200 extend through a common aperture 204 in each wall 107 of the top plate 76 and are guided in individual slots of guide plates 205 secured to the outer sides of the walls 107 by screws 205ª. The slides 200 are further guided by slotted angle plates 206 secured to the top plate 76 by screws 206ª. The slides 200 are arrested in their normal positions by stops or lugs 207 engaging the inner faces of the walls 107.

To actuate the selecting slide bars 200 there is provided a series of actuating elements or slides 210 extending fore-and-aft of the machine over said selecting bars. Each key lever has one of these elements 210 associated therewith and consequently they are also divided into two groups one for each group of key levers. The slides 210 are supported by a slotted guide plate 211 at the front thereof and a slotted guide plate 212, Figs. 3 and 5, at the rear thereof, said guide plates 211 and 212 being secured at opposite ends to the walls 107 of the top plate 76.

To actuate the slides 210 by their associated key levers the latter have each pivotally supported thereon, by a stud 215, Figs. 28 and 29, a bell crank 216. The forward ends of the bell cranks bear against ledges 217, formed on the lower edge of the plate which guides the key levers 67. Upon the depression of a key lever the bell crank 216 thereon is caused, by the ledge 217, to swing about its pivot 215 in a clockwise direction from the position in Fig. 3, to the position in Fig. 28, the lower end of the bell crank engaging a projection of pin 218 on the slide 216 to pull the latter forwardly against the action of a return spring 219.

Each slide 210 is provided with a cam 220, Figs. 28 to 31, on its lower edge which cam, as the slide moves forwardly of the machine, engages a lug 221 on the upper edge of the associated selecting bar 200 to move the latter longitudinally of itself against its spring 201 from the position in Fig. 30 to the position in Fig. 31.

Each selecting slide 200 has associated therewith an interponent or connecting element 225, Figs. 26 and 32, which normally occupies an ineffective position but which may be actuated about a pivot 225ª by a pin 227 on the selecting slide 200 to connect the upper end of said interponent with a universal bar 228, the interponent being provided with a slot 226 in which the universal bar 228 engages.

After the interponent is connected, as in Fig. 14, the universal bar is actuated downwardly, in a manner hereinafter described, to actuate a lever 229 pivotally supported on a shaft 230 to set the fulcrum pin 66 (Fig. 15) with which said lever is connected, to thus establish a pivot about which the actuating lever 65 may be subsequently operated by means and in a manner previously described. A spring 231 is connected between the lever 229 and the interponent 225 to disconnect the latter from the universal bar 228 after it has returned to normal, Fig. 26. The interponent normally engages, at its upper end, the guide plate 191, and the spring pressed action of the interponent against said plate is such that it holds the lever 229 and the connected fulcrum pin 66 in a raised position, it being necessary for the interponent 225 to swing slightly against the action of the return spring 231, so as to clear the plate 191, in order that the fulcrum pin may move freely downward.

*Arrangement of setting levers for fulcrum pins*

Each fulcrum pin 66 is provided with one of the setting levers 229, the latter having a headed end 233, Figs. 14 and 15, engaging in a slot 234 in the pin 66. The pin setting levers 229 are arranged in two groups, one group at each side of the series of pins 66 so that said levers 229 may extend alternately from opposite sides of the series of pins, each to its respective pin, and so that each lever 229 may clear the next adjacent pin 66 where the pins are close to each other at the forward part of the series of pins. The levers 229 of each group are supported to swing freely about the shaft 230, the shafts 230 being supported by individual brackets 235, Figs. 11 and 32, at their rear ends and by the bracket 196 at their forward ends, collars 236, Fig. 32, being provided to hold the shafts against longitudinal movement. The pin setting levers 229 are held against movement lengthwise of their supporting shafts 230, so as to prevent accidental disconnection thereof from their associated fulcrum pins, by angle plates 237 secured to the floor 192 and provided with vertical slots 239, Fig. 32, into which extend tails 238, one from each lever 224.

Each selecting slide 200 is provided with two projections 221, Figs. 26, 28, 29 and 46, so that each selecting slide may be actuated by two key levers to connect the associated interponent 225 with the universal bar 228 preparatory to setting the corresponding fulcrum pin 66 about which, it will be remembered, the fulcrum bar 65 may be swung from a normal position, in opposite directions to locate the types corresponding to the characters represented by the key levers in register with the printing point. It will be observed that the interponents 225 carried by the pin setting levers 229 are arranged at opposite sides of the series of fulcrum pins, that each set of interponents has associated therewith a universal bar 228, and that said interponents of one set are adapted to swing in a direction opposite to those of the other set to connect them with their respective universal bars 228. Accordingly the cams 220 on the slides 210 extend in opposite directions, some rightwardly and some leftwardly from said selecting slides, to actuate some rightwardly and some leftwardly of the machine, as indicated by the arrows at the left of Fig. 46.

*Relative arrangement of types on carrier and cams on actuating slides with respect to the arrangement of character keys*

To permit types which are used most frequently to be located in positions on the type carrier close to the printing point, irrespective of the positions of the corresponding keys 105 in the key board, and at opposite sides of the printing point, so as to reduce the work required to position these types to a minimum and thus expedite the operation of the machine, the cams 220 of the slides 210 may be arranged in the order illustrated in Fig. 46 where the cams corresponding to the letters "E" and "I" cooperate with the selecting bar 200 associated with the rearmost fulcrum pin 66 by which pin the smallest movements of the fulcrum bar are effected. Thus the type bars representing the characters "E" and "I" may be located at the middle of the set of types, or in other words, at the inner ends of the groups A and B while their respective keys in the key board may be located in their regular positions near one end of the standard typewriter key board. The arrangement of types and key levers is shown more clearly in the diagram of Fig. 51, where the non-letter types such as numbers, punctuation marks and signs are divided into two groups D and E, one group at each side of an intermediate group C of letter types. The corresponding characters on the key levers, however, are arranged in the order of a standard board.

Figure 47:
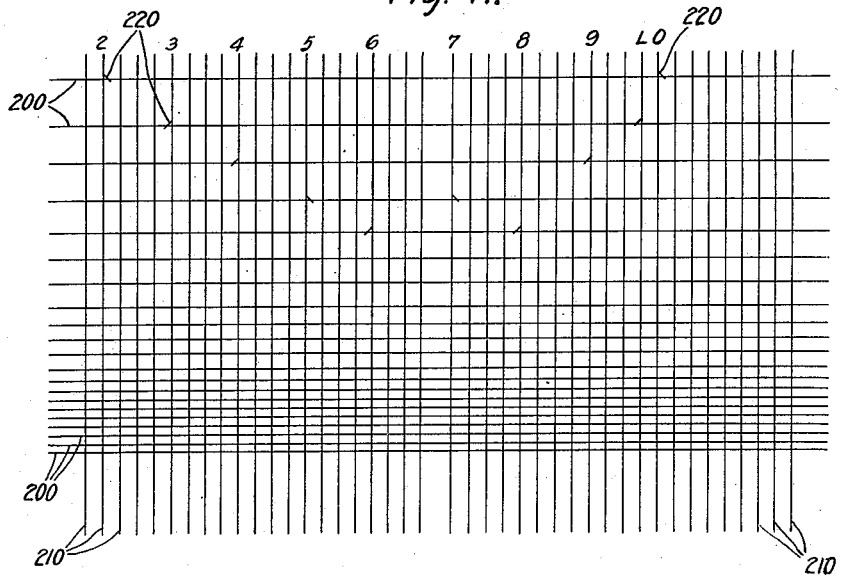

In a machine in which the numerals are more frequently used than the other characters the cams 220 may be arranged with respect to the selecting slides 200 as indicated in Fig. 47, so that the numeral type bars may be located at the middle of the type set, or in other words, nearest the printing point. From the foregoing it will be understood that the slides 200 and 210 form transposition mechanism under the control of the key levers 67 which permits of a lateral arrangement of types which is different than the lateral arrangement of the keys.

Figure 48:
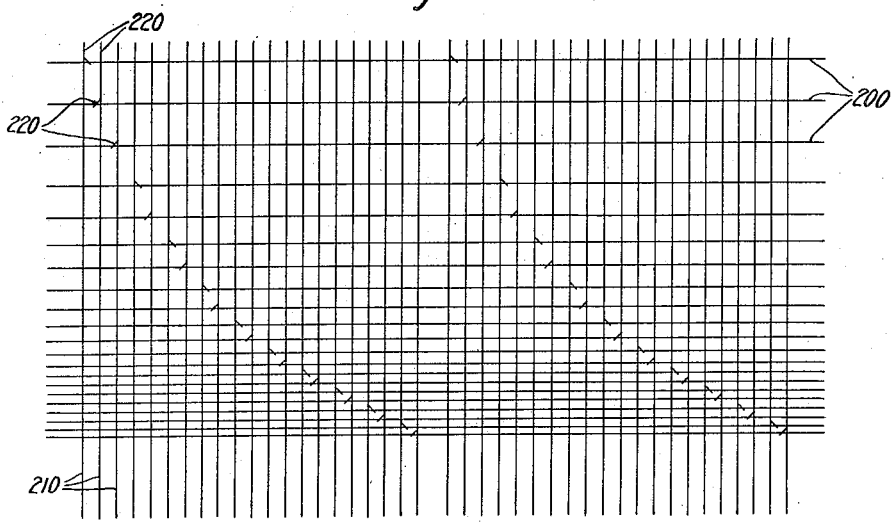

Fig. 48 shows another arrangement of the cams 220 in which they are arranged in a progressive uniform order. In Figs. 49 and 50 the cams 220 of each set are arranged in a progressive uniform order and the two sets are symmetrically arranged with respect to each other.

*Power operated pin setting means*

The pin setting universal bars 228 are each supported by two arms 245, Figs. 14 and 32, one at each end thereof, the arms of the universal bars being secured to rock shafts 246 and 246$^x$ supported in the brackets 196 and 235.

To actuate the universal bar 228 at the righthand side of the machine the rock shaft 185, of the type carrier actuating linkage 63, has secured to it a cam 250, Fig. 7, which engages a two armed follower 251 secured to a shaft 252 to rock the latter in a clockwise direction. The shaft 252 has secured thereto at its upper end, a rearwardly extending arm 253, Figs. 6, 26 and 32, which, when the rock shaft is actuated, pulls rightwardly a link 254 connected to an arm 255 secured to the rock shaft 246 to rotate the latter in a counter-clockwise direction, Fig. 26, and thus move the universal bar 228 therewith to actuate the connected pin setting lever 229, through the medium of the connected interponent 225, to set the fulcrum pin 66 connected to the lever 229.

By an inspection of Figs. 6 and 7 it will be seen that the universal bar actuating cam 250 is designed to actuate the follower 251 and its connected parts during the initial part of the rotation of the shaft 158. It will be understood that the toggle, comprising the parts 170 and 184, transmits, during the early part of its actuation, practically no movement to the actuating lever 65, and it is during this part of the actuation of the toggle that the selected indexing pin is set to its effective position, before the movement of the lever 65 starts.

The type carrier actuating linkage 63$^x$ at the lefthand side of the machine has connected therewith parts similar to those of the linkage 63 at the righthand side of the machine, to actuate the universal bar 228 at the lefthand side of the series of fulcrum pins 66. These parts bear the same reference characters as the similar parts connected with the linkage 63, with the superscript $x$ added thereto. The cam 250$^x$, however, is mounted on a shaft 250$^a$, independently of the shaft 185$^x$, these shafts rotating in opposite directions and being connected to each other by means including an arm 250$^b$ secured to the shaft 185$^x$, a link 250$^c$ and an arm 250$^d$ secured to the shaft 250$^a$.

The universal bar shafts 246 and 246$^x$ are connected to each other by two arms 256 and 256$^x$, Figs. 32 and 33, secured to the forward ends thereof, the free ends of said arms being connected to each other, in any convenient manner, as for example by gear teeth 257 and 257$^x$, so that both rock shafts and their universal bars 228 are actuated each time any one of the rock shafts is operated through its associated linkage 63 or 63$^x$. The links 254 and 254$^x$ are provided with slots 258 and 258$^x$ to permit either one of them to move idly in a reverse direction while the other one is being operated to actuate its associated universal bar.

*Key lever lock*

Due to the fact that the universal bars 228 are connected, by the arms 256 and 257, they move together, upon the actuation of either one of them, and move out of register with the slots 226 of all of the interponents at rest as in Fig. 15 thus locking the selecting bars 200 against actuation. Consequently it is impossible to actuate another key lever, or in other words all of the unactuated key levers are locked, until the actuated fulcrum bar or lever 65 returns to normal. In this manner injury to the machine, which may otherwise result from an actuation of another key lever before the return of the active one, is prevented.

*Locks for fulcrum bar*

The fulcrum bar 65 which forms part of the actuating mechanism for the type bar carrier is held or locked in its normal position to prevent accidental displacement thereof which may otherwise result from an accidental rotation of the type bar carrier. For this purpose there is provided a locking pin 259, Figs. 3, 6, 11, 12 and 32, which is normally in its depressed position, Figs. 3 and 11, engaging in a depression 259$^f$ in the fulcrum bar or lever 65. This locking pin is raised, in a manner and by means now to be described, to the position in Figs. 4 and 12 during the setting operation of any one of the fulcrum pins 66.

To actuate the locking pin 259 there is secured to the rock shaft 246$^x$, which carries the pin setting universal bar 288, an arm 259$^a$ which, as the shaft is actuated in a clockwise direction in Fig. 11, actuates a lever 259$^b$ in a counter-clockwise direction by means of a pin-and-slot connection 259ᶜ about the axis of the shaft 230 upon which said lever 259ᵇ is loosely supported. The inner end of the lever 259ᵇ is provided with a head 259ᵈ which engages in a slot 259ᵉ in the side of the locking pin 259 to carry said pin upwardly to unlock the lever 65 and to lower it again to lock said lever while the active fulcrum pin is being returned to normal, the withdrawing of the fulcrum pin 66 and the setting of the locking pin 259 taking place after the fulcrum bar 65 has been returned to normal.

The forward end of the fulcrum bar 65 is normally locked against accidental displacement by the toggle comprising the parts 170 and 184 and the toggle comprising the parts 170ˣ and 184ˣ due to the fact that the toggles are normally on dead center as previously mentioned. It will be understood that each toggle is a lock, and consequently each one is effective to cause the intermediate lever 64 to swing, about its point of connection with the toggle at rest, while said intermediate lever is being actuated by the other toggle.

*Operating linkages for type bar actuator*

The linkage 67, Fig. 6, at the righthand side of the machine, for operating the type bar actuator 54 includes an arm 260, Figs. 6 and 10, secured to the upper end of the shaft 183 so that as the latter is rocked upon the actuation of the connecting rod 180, said arm pushes forwardly a link 261 connected thereto by a stud 262. The link 261 is connected by a stud 263 to the lower end of a lever 264 pivotally supported on the rock shaft 68 so that as the lever 264 is swung forwardly it engages, through the medium of a projection or pin 265 thereon, an arm 266 secured to the shaft 68 to rock the latter in a clockwise direction, Fig. 3, thus carrying rearwardly the upper end of the arm 68ᵃ, adjustably secured to the shaft 68 in a manner and for a purpose hereinafter described. While the arm 68ᵃ is being operated it moves the plunger 54, which is connected to said arm by a stud 267, rearwardly to actuate the selected one of the type bars 52 to print against the platen 55. A spring 268, Fig. 20, connected, by means hereinafter described, to the arm 68ᵃ returns the actuator and its connected parts to normal and holds them against accidental displacement from normal. The linkage 67ˣ at the lefthand side of the machine is operated upon the actuation of any one of the key levers in group B' and it is like the linkage 67, the parts which are similar to those of the linkage 67 bearing the same reference characters with the superscript *x*.

By the arrangement of arms 266 and 266ˣ and their levers 264 and 264ˣ, respectively, either one of said levers may actuate the rock shaft 68 independently of the other, the arms 266 and 266ˣ being adapted, for this purpose, to move away from their pins 265 and 265ˣ.

The rock shaft 68 may be supported by two brackets 270 and 270ˣ, Figs. 6 and 10, secured to the front plate 71 of the machine frame, and the levers 264 and 264ˣ are held against sidewise movement of said rock shaft by the brackets 270 and 270ˣ, and the arms 266 and 266ˣ, Figs. 6 and 10, secured to said shaft 68.

It will be observed that the point of connection 262 of the link 261 with the arm 260, moves in an arc in a horizontal plane, and about the axis of the shaft 183, and that the point of connection 263 of the lever 264 with the link 261 also moves in an arc, but about the axis of the shaft 68 and in a vertical plane. To permit these arcuate movements of the points of connection without binding of the link on the arm 260 or on the lever 264, the link 261 is composed of two end members 280 and 281, Fig. 6, connected to a central member 282 by universal joints 283 and 284 respectively. It will be understood that although the members 280, 281 and 282 composing the link 261 have slight pivotal movements with respect to each other, they interfit at their ends so as to prevent buckling of said link. The construction of the link 261ˣ at the opposite side of the machine is similar to the link 261, and the parts similar to those of the link 261 are identified by the same reference characters with the addition of a superscript *x*.

Due to the action of the driving devices 62 and 62ˣ which produce harmonic motion, as hereinafter described, to decelerate the movement of the type bar actuator 54, there is produced great pressure of the actuator on the type bar while printing. To counteract this pressure effected by the actuator 54 against the platen there is provided a brace 290, Figs. 1 and 3, located in alignment with said actuator and engaging the rod 85 of the carriage 82, said brace being secured to a forward extension 291 of the cross bar or bridge 72 of the machine frame.

*Adjustment of type bar actuator to vary its pressure*

The type bar actuator 54 is provided with a micrometer adjustment to compensate for different thicknesses of work sheets or pack of work sheets which may be introduced around the platen. The micrometer adjustment includes a screw 300, Figs. 20 and 21, secured to a shaft 301 supported in bearings 302 of a bracket 303 secured to the front plate 71 by screws 304. The shaft 301 has secured to its forward end a finger piece 305 by which the screw or worm 300 may be rotated, at will, to thereby rotate a worm wheel 306 about the axis of the shaft 68 upon which said worm wheel is rotatably supported. The worm wheel 306 has an eccentric 307, on its side, which engages in a hole 308 in the lower end of the arm 68ᵃ and while rotating swings the lower end of said arm forwardly or rearwardly of the machine in accordance with the adjustment desired of the plunger 54. While the lever is being actuated by the eccentric it swings about the axis of a stud 309 which projects laterally from said lever into a slot 310 of an arm 311 secured to the rock shaft 65. Thus the upper end of the arm 68ᵃ is moved in a direction opposite to that of the end engaged by the eccentric to adjust the plunger 54 in accordance with the thickness of the work sheets. The spring 268 is connected to the arm 311 which is connected to the arm 68ᵃ through the medium of the pin 309, the arm being held in its normal position against a suitable stop, not shown, by the spring 268.

To assist in making the micrometer adjustments of the type bar actuator 54 there may be secured to the worm shaft 301 a disc 315, Figs. 10 and 20, provided with a series of graduation marks 316 with which cooperates a fixed pointer 317 secured to the front plate 71.

The plunger part of type bar actuator 54 is caused to move in a straight line by a cylindrical guide 320 of a frame 320ᵃ supported by the front wall 71. The stud 267, however, which connects the type bar actuator to the arm 68ᵃ moves in an arc about the axis of the shaft 68. Consequently the plunger part of the actuator is connected to the arm 68ª by means which may include one or more links 321, Figs. 1 and 20, by a shouldered screw or stud 322 so as to avoid binding of the plunger 54 in its guide which would otherwise be produced by the arm 68ª if said arm were connected directly to the plunger part of said actuator.

Another advantage of the link 321 is that it permits the plunger 54 to be swung upwardly unhindered in case the axis of the pivot stud 267 is out of register with the axes of the pivot studs 325 of the guide frame 320ª.

Movable bracket for type bar actuator

To move the type bar actuator 54 to an abnormal position so as to provide clearance for the type carrier while detaching the latter from the machine, the guide frame 320ª is pivotally supported by stub shafts 325, Fig. 1, in brackets 326 secured to the front plate 71 and about which it may be swung upwardly to the dotted line position in Fig. 3. The guide frame 320ª is provided with a lug 327, Fig. 20, extending forwardly through an aperture 328 and having a slot 329 therein in which engages a locking disc 330 of a finger piece 331 rotatably supported on the front plate 71 in any suitable manner. The disc 330 normally locks the guide frame in its effective position. By rotating the finger piece 331, the disc 330, which is eccentric, moves out of the slot 329 of the lug 327 to permit the frame 320ª to be swung about its pivot (shafts 325) to carry the type bar actuator 54 out of the path of the type bar carrier so that the latter may be removed from the machine.

Power drive

The motor 60 of the power drive is connected by two conductors 332 and 332ª, Fig. 41, to two main conductors 333 and 333ª, the main conductors being connectable at will to a source of power by a double blade switch 334 which may be closed or opened at will to start or stop the motor. The motor is supported by the bridge 72 to which it is secured by screws 335, Fig. 3, and runs continually while the switch 334 is closed. The motor includes a shaft 336 which, through the medium of a friction clutch 337, drives a shaft 338 having secured thereto a worm 339 meshing with a worm wheel 340 secured to the shaft 61 to rotate the latter, the lower end of the shaft 338 having a bearing in a bracket 341 secured to the rear wall 75.

The motor driven shaft 61 extends transversely of and is located at the rear of the machine and near the lower part thereof, Figs. 3, 6 and 7. It is supported in bearing portions 342 and 342ˣ in the rear walls 343 and 343ˣ of casings 344 and 344ˣ for the driving devices 62 and 62ˣ respectively, each casing having legs 345, Fig. 34, extending downwardly from the floor 346 of said casing to the floor 69 of the machine frame, screws 347 being threaded into the bottom of the legs to hold the casing in place.

Driving devices 62 and 62ˣ

The driving devices 62 and 62ˣ include spiral gears 350 and 350ˣ respectively, which are driven by pinions 351 and 351ˣ, Fig. 7, secured to the opposite ends of the power shaft 61. The gear 350, Figs. 34 and 35, is secured to a crank shaft 352 to rotate the latter in bearings 353 and 354 at its lower and upper ends respectively, in the bottom wall 346 and top wall 355 of the casing 343. The crank shaft 352 may include one or more cranks 356, three being shown in the present form of the invention, each crank having a crank pin 357 to which is attached a connecting rod 358. The connecting rods have connected to their forward ends, by studs 359, clutch elements 360 loosely supported on a vertical shaft 361, Figs. 35 and 36, the latter being rotatably supported at its upper and lower ends in the top and bottom walls 355 and 346 respectively. It will be understood that the clutch elements 360 are thus continually reciprocated by the continually rotating crank shaft 352 through the medium of the connecting rods 358. The crank pins are spaced from each other equal angular distances about the axis of the crank shaft 352 and consequently the three clutch elements arrive at their foremost and rearmost positions successively in equally timed relation. It will also be understood that each clutch element 360 is momentarily at rest while the corresponding crank pin 357 passes over the dead center.

Clutch

The shaft 361 is connectable with any one of the clutch elements 360 of the clutch 362, in a manner presently described, to cause said shaft to make one complete reciprocation to thus reciprocate the rod 180 of the actuating linkage 63, the rod 180 being connected at its rear end, Figs. 7, 34 and 36, by a stud 365 to an arm 366, said arm being secured to the lower end of the shaft 361 and being located below the floor 346 of the casing 343.

Each clutch element 360 has associated therewith a cooperative clutch element 367 secured to the rock shaft 361 and arranged above the element 360. These clutch elements 367 are always in alignment with each other and are normally in their forward positions as in Figs. 34 and 35.

Any one of the clutch elements 360 is connectable with its cooperative element 367 to drive the latter and thus actuate the shaft 361. To this end there is provided a pawl or connecting member 370, Fig. 36, pivoted at 371 on a bracket 372 secured to the clutch element 360. Each pawl 370 is normally held, by a spring 373, with its free end in the bottom of a slot 374 extending downwardly from the upper edge of an upwardly extending lip 375 of the clutch element 360. While the pawls 370 are in their lower positions the driving clutch elements may reciprocate idly back and forth.

Any one of the pawls or coupling members 370 may be swung upwardly, as in Fig. 37, by means hereinafter described, to engage in a slot 376 of a downwardly extending lip 377 of the driven clutch element 367. The pawl 370 does not move entirely out of the slot 374 of the driving element 360, and consequently when thus connected with the driven clutch element 367 the latter is caused to move with the driving element 360. The connecting movement of the pawl 370 occurs while the driving element 360 is in its foremost position where, it will be remembered, it is momentarily at rest due to its reversal of motion. Only one of the pawls 370 is operable at a time and the active one is locked or held in its connected position, while the coupled clutch elements are functioning, by a segmental ledge or locking plate 378, Figs. 35 and 37ª, over which the free end of the active pawl 370 rides, the free ends of the idle pawls 370 moving under their respective locking plates 378.

The locking plates 378 are curved to conform with an arc struck about the axis of the shaft 361, and they are secured to two posts 379 which are secured to and extend upwardly from the bottom 346 of the casing 343. The locking plates are of a length such that the pawls remain thereon when the clutch elements reach their rearmost position. Upon the return of the active clutch elements to their original positions the active one of the pawls 370 is drawn out of engagement with the driven clutch element 367, by its spring 373, to disconnect the linkage 63 from its driving device 62. The clutch mechanism and the driving device 62$^x$ associated with the linkage 63$^x$ is similar to that above described and the parts thereof bear the same reference characters with the addition of the superscript $x$.

It should be understood that each clutch may have a single pair of clutch elements 360 and 367, and that preferably a plurality of sets are employed to expedite the operation of the machine since connection between the driving device 62 and the corresponding linkage 63 may be made in a shorter period of time than is possible with a single pair of clutch elements.

Harmonic motion produced by driving devices 62 and 62$^x$

It should be understood that the cranks 356 and 356$^x$, Figs. 7, 34 and 35, of the driving devices 62 and 62$^x$ form toggles with their links 358 and 358$^x$, that the rotation of the crank shafts 352 and 352$^x$ produce harmonic motions of the clutch elements 360 and 360$^x$ through the medium of the connecting links 358 and 358$^x$, and that these harmonic motions are imparted to the actuating linkages 63 and 63$^x$ to decelerate the action of the type bar actuator 54 to thus produce the desired pressure of said actuator while printing.

It should further be understood that the deceleration of movement of the type bar carrier to its printing position, caused by the toggles composed of the parts 182, 186 and 182$^x$, 186$^x$, is accentuated by the harmonic motions produced by the driving devices 62 and 62$^x$. Thus by this highly decelerated movement of the type bar carrier 50 as compared with the movement of the type bar actuator 54 the positioning of the selected type bar in the path of the actuator 54 is assured before the type bar is engaged by said actuator. The type bar carrier is located with precision, before printing, in any one of its various positions by suitable indexing means 385, Figs. 24 and 25, the structure and operation of which is described hereinafter.

From the foregoing it will be understood that by means of the fulcrum pins the lever 65 is caused to have variable motion, and that by means of the toggle 170, 184 and the toggle 182, 186 there is imparted to the lever 65 harmonic motion. From this it follows that the lever has variable harmonic motion, illustrated in Fig. 27$^a$, which is transferred to the type carrier to selectively position any one of the type bars at the printing point, and that irrespective of the angular distances of motion of the type carrier to its printing positions each is a harmonic motion. The curve A in Fig. 27$^a$ shows the extreme movement of the lever 65 corresponding to that of Fig. 8 and the curve A' shows the movement of the lever corresponding to Fig. 9.

Still further it will be understood that the mechanism including the driving device 62 and the linkage 63 is effective to actuate the type carrier with accelerated movement during the initial part of its rotation, and is also effective to counteract the rotation of the type carrier during the latter part of its movement, to gradually overcome the kinetic energy of the type carrier. A similar action takes place during the return movement of the type carrier. The mechanism including the device 62$^x$ and linkage 63$^x$ functions like that above described.

Selecting devices of clutch

Adjacent to the free end of each connecting pawl 370 of the clutch 362 is arranged the free end of an actuating pawl 390, Figs. 35 and 36. These pawls 390 have hubs 391 by which they are pivotally supported for individual movement on a vertical shaft 392. The pawls are held against axial movement on the shaft by a head 393 at the upper end of the shaft 392 and a headed collar 394 secured to the lower end of said shaft. The shaft 392 is held in place by brackets 395 and 396 secured to the inside of the casing 343, each bracket embracing one of the hubs 391.

Each pawl 390 has a block 397 secured thereto which forms the armature of an electro-magnet 398 to be attracted thereby when the latter is energized in a manner hereinafter described, thus swinging the pawl under the free end of the associated connecting pawl 370, against the action of a return spring 399, and while the pawl 370 is momentarily at rest in its foremost position. The operation thus far described deals merely with the selecting of one of the connecting pawls 370. Subsequently to this operation the shaft 391 is moved axially upward, by means described later, thus causing the active pawl 390 to swing its associated connecting pawl 370 upwardly and thus connect the driving clutch element 360 with the driven clutch element 367. The latter is then actuated, as previously described, to set the selected fulcrum pin 60, to subsequently operate the type bar carrier 50 and the type bar actuator 54.

Pawl actuating means of clutch

The shaft 391 which carries the selecting pawls 390 is continually vibrated up and down so that upon the actuation of any one of said pawls, by its electro-magnet 398, the corresponding connecting pawl 370 of the clutch is actuated.

To thus vibrate the shaft 391 there is provided a shaft 400, Fig. 35, rotatably supported by a bracket 401 on the floor 346 of the casing 343. A spiral gear 402 secured to the rear end of the shaft 400 meshes with the gear 350 to rotate said shaft and an eccentric or cam 403 secured to the forward end thereof. The cam 403 engages a head 404 on the collar 394 secured to the lower end of the shaft 392, to move the shaft upwardly against the action of a return spring 405 connected to the shaft 392. The similar parts of the pawl selecting means and pawl actuating means at the left-hand side of the machine are identified by the same reference characters with the superscript $x$ added thereto.

Casing for driving devices 62 and 62$^x$

The casings 343 and 343$^x$ include side plates 410 and 410$^x$ respectively, which may be detachably secured thereto in any convenient manner to give access to the mechanism contained within said casings. Each casing may also contain a quantity of any suitable lubricant in which the parts may operate to reduce wear, friction and noise to a minimum. Stuffing boxes 411 and 411$^x$, Fig. 7, including packing nuts 412 and 412$^x$ may be provided in the casings 343 and 343$^x$ to prevent leakage of the lubricant therefrom where the power shaft 61 enters said casings. Similar stuffing boxes including packing nuts 413, Fig. 34, are provided where the shafts 360 and 360ˣ extend through the floors of said casings.

Switch for clutch magnets

The clutch magnets 398 are connected in multiple, Fig. 41, by conductors 415 with a conductor 416 connected to the main conductor 333. The magnets 398 are also connected, by conductors 418, with contact springs 419, which engage the lower portion of the cylindrical surface of a commutator 420 secured to the upper end of the crank shaft 352 to rotate therewith.

The commutator 420 includes a body part 421, Figs. 34, 38 and 39, composed of any suitable insulating material, an upper conductor ring 422 of metal, and a lower split ring 423 also of metal which serves not as a conductor but merely to prevent wear of the contact springs on the commutator. The commutator also includes a metal core 424 by which it may be secured to the crank shaft.

The contact springs 419, of which there are three, are equally spaced around the commutator as in Fig. 39 and they are suitably secured to a block 425 of insulating material, Figs. 34, 38 and 39, by which they are insulated from each other.

The conductor ring 422 of the commutator 420 is electrically connected with the main conductor 333ᵃ, Fig. 41, by a conductor 427, resistance 428, conductor 429 and switch 430 when the latter is closed, in a manner hereinafter described, conductor 431 and contact spring 432 which bears against the ring 422; the contact spring 432 being secured to an extension 433 of the insulating block 425 which supports the other contact springs 419, see Figs. 34 and 39.

The conductor ring 422, Figs. 34 and 42, is provided with a downward extension 435 which is flush with the surface of the split ring 423 and is located between the ends of said split ring so that as the commutator rotates said extension engages the contacts 419 successively to energize the connected electro-magnets 398 in the same order so as to effect the selection of clutch connecting pawls 370, one at a time as previously described, through the selecting pawls 390. The commutator 420 and the contact springs 419 and 432 may be concealed within a cap 436 secured to the casing 343. The commutator and its associated parts at the lefthand side of the machine bear the same reference character as the similar parts at the righthand side with the addition of the superscript x.

Key lever operated switches

It will be understood that the switches 430 and 430ˣ are normally open and consequently the electro-magnets 398 and 398ˣ are not energized as the commutators 420 and 420ˣ rotate. These switches are located at the outer sides of their associated sets A', B' of key levers, as in Fig. 5, the one at the righthand side of the machine including two contact springs 440 and 441 supported by a block 442, Figs. 16, 17, 18 and 41, of insulating material, suitably secured to wall 107 of the top plate 76, which block insulates the contact springs from each other and from the machine frame.

To close the switch 430 the rock shaft 114, which it will be remembered is operable by any one of the key levers through the medium of the universal bar 112, has secured thereto two arms 445 which extend downwardly and forwardly therefrom, said arms carrying a rock shaft 446 by pivot screws 447. A hook-like arm 446ᵃ extends upwardly and forwardly from the rock shaft 446 to engage the tail 448ᵃ of a lever 448 to actuate the latter about a pivot 449, against the action of a spring 450, to push the contact spring 440 into engagement with the contact spring 441 to thus close the switch 430, the arm 446ᵃ being held in engagement with the tail 448ᵃ by a spring 451 connected to a rearwardly extending arm 452 of the rock shaft 446 and an ear 453 of the outer one of the arms 445 on the rock shaft 114. To prevent the current from passing to the machine frame through the switch lever 448 it is provided with a member 454 of insulating material, suitably secured to said lever 448, and which engages the contact spring 440. A condenser 454 may be bridged across the contact springs 440 and 441 to prevent sparking of the switch 430.

It will be remembered that each time the contact member 435 of the contact ring 422 engages one of the contact springs 419 the connected electro-magnet 398 is energized to operate the associated selecting pawl 390. It should be understood that the timing of the shaft 400 which actuates the shaft 392 is such with respect to the commutator 421 and with respect to the operations of the driving clutch elements 360 that the shaft 391 is raised each time the contact member 435 engages one of the contact springs 419 and that this occurs while the driving clutch element 360 associated with the energized electro-magnet is in its extreme forward position where, as heretofore stated, said clutch element is momentarily at rest.

The electro-magnet remains energized until the connecting pawl 370 of the active clutch element rides onto the shelf 378 whereby said pawl is held in its effective position until the clutch element returns to its original or foremost position. Before the projection 433 reaches the next contact spring 419 the switch 430 is automatically opened, by rendering the switch closing lever 448 ineffective in a manner hereinafter described, thus assisting in preventing the operation of another connecting pawl 370 to establish a connection of a pair of clutch elements while the one pair is functioning. It will be remembered that another key lever cannot be actuated due to the locking of said key levers produced by the action of universal bars 228 on the interponents 225, previously described under "Key lever lock". Consequently the switch 430, after it has been automatically opened, remains open until a cycle of operations is completed and cannot be closed again until the active pair of clutch elements is returned to restore the universal bars 228 to their normal positions, thereby unlocking the key levers.

Means to render switch closing lever 448 ineffective

To render the switch closing lever 448 ineffective and thereby effect the opening of the switch 430 there is secured to the upper end of the shaft 183 a cam disc 455, Fig. 5. The shaft 183 is rotated in a counter-clockwise direction, Fig. 19, during the effective stroke of the actuating linkage 63 or in other words while the active pair of clutch elements 360 and 361 are moving rearwardly in the machine. After the pawl 370 connecting said clutch elements has been deposited on the shelf or locking plate 378 a cam 456 on the disc 455, see Fig. 16 also, engages an arm 457 secured to the inner end of the shaft 446 to rock the latter in a clockwise direction, Fig. 18, to swing the actuating arm 446ᵃ free of the tail 448ᵃ against the action of the spring 451, whereupon the spring 450 returns the switch operating lever 448 to normal thus effecting the opening of the switch 430 which switch, it will be understood, cannot be closed again until after the machine has made a complete cycle. The cam 455ˣ at the other side of the machine functions in the same manner as the cam 455 but rotates in a reverse direction, and the parts operated by the cam 455ˣ are similar to those operated by the cam 455 and have the same reference characters applied thereto with the addition of the superscript $x$.

Interchangeable type sets

Instead of the single type bar carrier 50 shown in Fig. 27, there may be supported in the machine two or more type bar carriers, each having a style of types differing from those of the other type bar carriers, any one of which type carriers may be readily and quickly attached to the drive shaft. For this purpose each type bar carrier 50 is supported on a rotatable plate, bracket or turntable 460, Figs. 3, 20 and 24, by means of a stub shaft 461 bearing in a sleeve 462 permanently secured to the plate 460, and which stub shaft is rotatable by the drive shaft 53 in a manner described later. In this form of the invention the thumb screw 132 is threaded into a reduced portion 463 of the shaft 461 to hold the type carrier on the shaft 461 axially thereof. To cause the type bar carrier to rotate with the shaft 461 to move therewith when the latter is rotated, the pins 137, of the coupling 135, which engage in the holes 138 of flange 137, are secured to a flange 464 having a collar 465 by which it is secured to the stub shaft 461.

Each stub shaft 461, Figs. 20 and 24, upon which the type bar carrier 50 is detachably mounted, is detachably connected with the drive shaft 53 by means of teeth 466 on a flange 467 formed on the lower end of the stub shaft 461, said teeth extending into slots 468 of a flange 469 secured to the drive shaft 53. Thus it will be understood that the drive shaft when rotated moves the type bar carrier 50 with it to locate the selected type bar in the path of the type bar actuator 54.

Shiftable support for type bar carriers

The support for the type bar carriers or in other words the turntable 460 is supported on the bridge 73 by means of a shaft 470 which is secured to the bridge 73 by means of a flange 471 on said shaft and by a nut 472, said flange and said nut binding on opposite faces of a boss 473 on the bridge 73. The turntable 460 has secured to the middle thereof a bearing member 473 to which is secured a finger piece 474 for manipulating said turntable in a manner now to be described, the finger piece being provided with an enlargement 475 which is threaded on to a threaded head 476 of the bearing member 473.

The turntable 460 is normally locked against accidental displacement from any one of its set positions. For this purpose there may be provided one or more teeth 480, Figs. 20 and 22, on the fixed flange 471 and each extending into a slot 481 formed in the lower end of the bearing member 473. Preparatory to a shifting operation of the turntable 460 to change the type unit, the turntable is released from the locking members or teeth 480 by pulling upwardly on the finger piece 474, against the action of a spring 483, until the lower end of the bearing member 473 is clear of said teeth, the type bar actuator having previously been swung up to the dotted line position in Fig. 3. During this operation of the finger piece 474 the teeth 466 are also drawn out of the slots 468 of the flange 469 on the drive shaft 53, thus disconnecting the upper type carrier 50 from said drive shaft.

After thus disconnecting the support 460 of the type bar carriers, it is rotated about the axis of the shaft 470 to carry the other type bar carrier or unit 50 into register with the drive shaft 53 while the previously active type unit 50 is being carried to an ineffective position. A spring 483, located in an aperture 484, and acting at one end against the floor of said aperture and at the opposite end against a washer 485 secured to the upper end of the shaft 470, is then permitted to press the table 460 downwardly on the shaft 470 to cause the teeth 480 to re-enter the slots 481 of the bearing portion 473 to thus lock the table 467 in its changed position. During this lowering operation of the table 460 the teeth 466 of the flange 467 associated with type unit being rendered effective, enter the slots 468 of the flange 469 on the drive shaft to thus establish the connection between said drive shaft 53 and the selected type unit 50. It will be understood that, although only two type units are shown on the table 460, said table may readily be designed to carry more that two type units.

Indexing mechanism for type bar carrier

As previously described the type bar carrier 50 is located to present the various type bars, one at a time, to the type bar actuator 54 by varying the motion at the driving end of the actuating lever 65 by means of the fulcrum pins 66. To further aid in positioning the type bar carrier so as to locate the selected type bar accurately at the printing point there is provided the indexing means 385 previously referred to.

The indexing means 385 includes an index wheel 482 which may be secured to the flange 467 as in Fig. 20 or to a flange 483 on the sleeve 129, Fig. 27. Said wheel is provided at its edge with slots 484, one for each type bar, into any one of which a pawl 485 is moved during the latter part of the rotation of the type carrier, or in other words after the wide part of the slot comes into the path of a pointed end 486 of the pawl 485. The indexing pawl 485 is pivotally supported by a stud 487 on the cross-bar 73 and is actuable, in a manner now to be described, to engage in any one of the slots 484.

Indexing pawl actuating mechanism

To actuate the indexing pawl 485 there is secured to one end of the rock shaft 68, Figs. 3 and 6, an arm 490 having a stud 492 to draw forwardly a link 491 each time any one of the linkages 63 and 63ˣ functions to rock the shaft 68. The rear end of the link 491 is connected by a stud 493, Figs. 24 and 25, with a lever 494 to swing the latter downwardly about a stud 495 fixed on the cross-bar 73, the free end of the lever 494 having a pin and slot connection 496 with an arm 497 of the pawl 485 to actuate said pawl in a clockwise direction in Fig. 24 when the actuating lever 494 is moved in a counter-clockwise direction. It will be seen by an inspection of Fig. 3 that the forward end of the link 491 has a slot 498 and that the connecting stud 492 engages therein. This provides lost motion connection between the arm 490 and the link 491 to permit the arm 490 to move idly, with respect to the link 491, for the greater part of its actuation and to operate the link only during the latter part of its actuation, or in other words, after the slot 484, corresponding to the selected type bar, is in a position to be entered by the tooth 486 of the pawl 485.

Escapement

The letter feed movements of the carriage are effected by escapement mechanism indicated generally by the numeral 490e, Fig. 3, which is operable by any one of the key levers 67 in a manner presently to be described. The carriage may be urged in a letter feed direction by a spring drum, not shown, and tends to rotate an escapement wheel 491e through the medium of a rack 492e on said carriage which rack meshes with a pinion 493e secured to the escapement wheel 491e to rotate the latter about a pivot 494e secured to the shift frame 99a. A dog rocker 495e is pivoted by studs 496e in lugs 496a on the shift frame 90, said dog rocker having dogs 497e and 498e which cooperate with the teeth of the escapement wheel, as the dog rocker is oscillated back and forth about the pivot studs 496e, to thus effect the feed of the carriage.

To actuate the dog rocker 495e there are secured to the rock shafts 114 and 114x of the universal bars 112 and 112x, arms 499 and 499x from the upper ends of which links 500 and 500x extend rearwardly, Figs. 3 and 5. As the universal bar 112x is depressed the arm 500x pulls forwardly on an arm 501x connected to its rear end, said arms extending upwardly from a shaft 502 and the latter being actuated in a counter-clockwise direction. Another upwardly extending arm 503 is secured to the rock shaft, the upper end of which engages an arm 504 of the dog rocker to actuate the latter in a clockwise direction to carry the dog 498e into engagement with the escapement wheel while the dog 497e is being disengaged therefrom, to thus initiate the letter feed movement of the carriage. The dog rocker is returned to its normal position by means of a spring, not shown, to complete the feeding movement of the carriage. The link 500x is provided with a slot 505x in which the connecting stud 506x may move forwardly idly, while the rock shaft 502 is being actuated by the other link 500. For a similar purpose the link 500 is provided with a slot, not shown. Thus it will be understood that either of the universal bars 112 and 112x may be operated without disturbing the other.

A space bar 510, Fig. 5, is provided, having at each end thereof a rearwardly extending arm 511, both arms being pivoted at their rear ends on the key lever fulcrum rod 106 and the one at the righthand side of the machine extending to the universal bar 112 while the one at the lefthand side may extend over the universal bar 112x. Since it is necessary to actuate only one of the universal bars 112 and 112x, to effect the actuation of the escapement, one of the arms 511 may be cut out to clear the universal bar over which it extends so as not to disturb it while the space bar is being depressed.

Ribbon vibrating mechanism

The ribbon 56, through which the type bars print, is supported by a ribbon vibrator 515, Figs. 3 and 13, which is guided by two studs 516 extending through slots 517 and secured to the carriage supporting rail 91. The ribbon vibrator is H shaped and has connected to each one of its vertical arms, at its lower end, an arm 518 of an actuating frame 519, the arms being rigidly connected to each other by a rock shaft 520 which is pivotally supported in the lugs 496a of the shift frame 99a.

The ribbon is normally below the printing line and is vibrated into the path of the active type at each actuation of a key lever. For this purpose one of the arms 518 has a downward extension 526, Fig. 3, with a slot 527 therein into which extends a stud 528 of an arm 529 secured to the rock shaft 502 so that upon the actuation of said rock shaft in a counter-clockwise direction the arm 529 rocks the shaft 520 through the medium of the arm 526 to lift the ribbon vibrator 515 by means of the arms 518 to carry the ribbon 56 into the path of the active type on the type bar.

It will be understood that as the platen 55 is lowered, or in other words shifted to its upper case position, as previously described, the ribbon is also lowered with said platen to keep the printing line exposed. During this shifting movement of the platen the arms 504 and 526 move freely downward relatively to the arm 503 and the stud 528.

The ribbon 55 extends from two spools 530, Fig. 1, to the ribbon vibrator 515 and passes through depressions 530a, in a top plate or cover section 530c, where it may be guided by rollers 530b.

Case shift

By an inspection of Fig. 20 it will be seen that the upper case type 58 of each type bar is nearest the fulcrum 116. The platen 55 is therefore normally in its raised position, as in Fig. 20, so that the lower case types 57 may print and it is shiftable downwardly to the upper case types 58. The advantage of this arrangement of types on the type bars is that greater pressure is exerted by the upper case type against the platen than that of the lower case type to thus compensate for the greater area of the upper case type over that of the lower case type and thus produce uniform shade of typing. It will also be seen that the type bars are bent so that the type faces of each bar when printing may be in a plane parallel to the direction of shift of the platen.

The case shifting of the platen to its upper case position is accomplished by a shift key 531a, Figs. 43, 44 and 45, which while being depressed swings a lever 531 of the first order about a pivot stud 532. Said lever has a pin-and-slot connection 533 with another lever 534 of the first order to swing the latter about the axis of a shaft 535, in a clockwise direction, the shaft being pivotally supported at its ends in the sides 70 of the machine frame. The upper end of the lever 534 has connected thereto a link 536, by a stud 537, the rear end of the link 536 being connected to the bell crank 94, at the lefthand side of the machine, by a stud 538, thus rocking the shaft 94 in a counter-clockwise direction in Fig. 43 to lower the platen, which, it will be remembered, is supported on the frame comprising the rail 91 and the arms 93, said frame being guided by the bell cranks 94 and links 96. A spring 539 is connected to one of the bell cranks 94 to hold the platen in its raised position as in Fig. 43. Suitable stops, not shown, may be provided to limit the platen in the two positions to which it may be shifted.

To prevent accidental downward shifting of the platen 55 there is provided a pawl 540 pivoted by a stud 541 on the machine frame and normally engaging under a projection 542 secured to the arm 93 of the frame upon which the carriage is supported. Said pawl 540 is connected by a link 543 with the upper end of the lever 534 so as to withdraw the pawl 540 from engagement with said projection 542 during the initial part of the depression of the shift key 530 so as to unlock the platen and thus permit it to move freely downward. It will be understood that upon the removal of the pressure caused by the operator on the shift key 530, the parts controlled by the key lever 531 are restored to normal by the spring 539, and the pawl 540 swings back under the lug 542.

To lock the platen, to retain it indefinitely in its upper case position, there is provided a shift lock key 545, Figs. 43, 44 and 45, which upon depression swings a lever 546 about the rock shaft 535 upon which it is loosely mounted. The shift lock key lever 546 has thereon a pin 547 which engages a locking lever 548 to swing the latter about a pivot stud 549 and against the action of a return spring 550. As the lock lever 548 swings downwardly a shoulder 551 thereon engages a projection or pin 552 on the shift lever 531 to actuate the latter and thereby shift the platen as previously described.

It will be observed in Fig. 44, that the pin 552 has passed considerably beyond a line drawn through the axis of the pivot studs 532 and 549: thus the upward action of the stud 552, produced by the return spring 539 against the locking lever 548, locks the shift key lever 531 in its depressed position to hold the parts operated by the shift key lever, including the platen 55, in upper case position indefinitely.

To assist in holding the platen in its upper case position there is provided a locking lever 555 normally in the position shown in Figs. 43 and 45, and which may be swung about the stud 541 to the position in Fig. 44 to swing over the projection 542 of the pawl 540 on the arm 93 of the shift frame, said pawl being actuated by a link 556 connected to the upper end of the shift key lever 546.

To release the shift key lever 531 so that the platen may resume its normal or lower case position, said shift key lever is depressed slightly. This releases the pressure of the pin 552 against the locking lever 548 and the latter is then free to be returned to its normal position by the return spring 550, said locking lever being also effective through engagement with the pin 547 to restore the other shift key lever 546 to normal.

*Brief description of the principal operation of the machine*

The main switch 334, Fig. 41, is actuated to close it and thus start the motor 60 to drive the crank shafts 352 and 352ˣ to continually reciprocate the driving clutch elements 360, Figs. 7, 34 and 35. While the crank shaft 352 is rotating, the extension 435, of the contact ring 422, engages successively the contact springs 419 but without effect. One of the key levers 67 may then be operated thus causing the associated universal bar 112 to close the switch 430, Fig. 16, through the medium of the arm 446ª and the switch lever 448. The closing of the switch 430 partially closes the circuit so that when the extension 435 engages the next contact spring 419, the connected electro-magnet 398 is operated to draw the associated pawl 390, Figs. 35 and 36, under the connecting element 370. This occurs while the driving element 360 of the clutch is momentarily at rest, in its forward position, due to a reversal of motion thereof.

While the selecting pawl 390 is under the connecting pawl 370 the vertical shaft 391 is moved upwardly by means of the eccentric 403, Fig. 36, on the constantly rotating shaft 400 which is connected by gears 350 and 402 with the crank shaft 352, Fig. 35. As the shaft 391 is moved upwardly it actuates the connecting pawl 370, through the medium of the active pawl 390, to connect the driven element 367 of the clutch with the associated driving element 360 so that as the latter swings rearwardly the element 367 is caused to move with it to rock the shaft 361 to which all of the driven elements are rigidly secured, the connecting pawl 370 being held in its connecting position by the shelf 378 until it returns to its forward position when pawl 370 is rendered ineffective to disconnect the shaft 361 from the crank shaft 352.

While the key lever is being depressed the slide 210 connected thereto by the bell crank 216, Fig. 3, is actuated to operate the associated transverse slide 200 by the cam 220, Fig. 29, to connect the interponent 225 with the universal bar 228. This operation takes place during the closing of the switch 430, Figs. 16 to 18.

As soon as the shaft 361 starts operating, (counter-clockwise direction, Fig. 7) the linkage 63 which is now connected thereto by the clutch 362, is operated to actuate the rock shaft 185. During the early part of the rotation of the rock shaft 185 the cam 250, secured thereto, actuates the follower 251 to rock the shaft 252 in a clockwise direction, Fig. 32. The arm 253 on said rock shaft 252 pulls the link 254 rightwardly to rock the shaft 246 in a counter-clockwise direction, Fig. 26, to swing the universal bar 228 with the connected interponent 225 downwardly. Said interponent swings the lever 229, upon which it is supported, downwardly to set the connected fulcrum pin 66 into engagement with the fulcrum lever 65. This setting of the fulcrum pin occurs before the actuation of said fulcrum lever starts.

While the fulcrum pin 66 is being set the locking pin 259 is being raised, and it is operated by the rock shaft 246ˣ through the medium of the arm 259ª and the lever 259ᵇ, to unlock the fulcrum bar 65, the rock shafts 246 and 246ˣ being connected to each other by the arms 256 and 256ˣ secured to their forward ends, Figs. 32 and 33.

After the fulcrum pin 66 has been set and the actuating lever 65 is unlocked the toggle, including the link 170 and arm 184, operates the lever 65 to rotate the shaft and the connected type carrier 50 to set the type bar, corresponding to the depressed key lever, into the path of the type bar actuator 54. The type bar carrier is then indexed, by the pawl 485 which cooperates with the wheel 482, to accurately position the selected type bar at the printing point. While the indexing pawl is in its effective position the type bar is caused to print through the ribbon 56 upon a work sheet, not shown, around the platen 55, the plunger or type bar actuator 54 being operated by the upwardly extending arm 68ª, Figs. 3 and 6, on the rock shaft 68, which rock shaft is operated by the downwardly extending arm 264 thereon connected by the link 67 to the arm 260 secured to the shaft 183.

During the latter part of the active stroke of the linkage 63 the cam 456 on the shaft 183, Figs. 6 and 16, actuates the rock shaft 446 through the medium of the arm 457 to disengage the arm 446ª from the switch lever 448 to release the latter and thus permit the switch 430 to open to break the circuit. The movement of the linkage 63 then continues and the parts operated thereby are restored by it to normal. As soon as the active connecting member 370 of the clutch reaches its forward position it drops from the shelf 378, assisted by the spring 373, to disconnect the linkage 63 from the power device 62. Upon the return of all of the parts, including the universal bars 228, to normal the key levers are unlocked and are ready for subsequent actuation.

While certain preferred embodiments of the invention have been shown and described, it will be understood that changes in the form, arrangements, proportions, sizes and details thereof may be made without departing from the scope of the invention as defined in the appended claims.

I claim:—

1. In a typewriting machine, the combination of a carrier having types thereon, means to support said type carrier for rotative movement in opposite directions from a normal position to register any one of the types at the printing point, means including an element to cooperate with the registered type to print, means including a lever of the first order operable only in opposite directions from a normal position to actuate said type carrier to its printing position, a device connected to said lever to actuate it in either direction from its normal position and to return it to normal, means connected to said device to actuate it in opposite directions, variable fulcrum means for the actuating lever, key levers one for each type on said carrier, means operable by the key levers to effect the operation of the actuating lever, means operable by the key levers to effect a setting of the fulcrum means to vary the leverage of the actuating lever to accordingly vary its throw in accordance with the extent of rotation required of the type carrier to register the selected type at the printing point, and means to effect the actuation of the cooperative element.

2. In a typewriting machine, the combination of a curved carrier having types thereon, two groups of types thereon, one group at each side of an intermediate portion of said carrier, means to support said type carrier for rotative movement in opposite directions from a normal position to register any one of the types at the printing point, means including an element to cooperate with the registered type to print, means including a lever operable in opposite directions from a normal position to actuate said type carrier to its printing position, a prime mover, means for selectively connecting said lever with said prime mover so the latter may actuate said lever in either direction from its normal position and be returned to normal, fulcrum pins for the actuating lever, the number of fulcrum pins being equal to half the number of types, key levers one for each type on said carrier, means operable by the key levers to effect the operation of the actuating lever, means operable by the active key lever to select one of said pins, means operable by the active key lever to effect the setting of the selected fulcrum pin to vary the throw of the actuating lever in accordance with the extent of rotation required of the type carrier to register the selected type at the printing point, and means to effect the actuation of the cooperative element, each fulcrum pin serving for two types one of each group, both types being equi-distant from the intermediate portion of the carrier and at opposite sides of said intermediate portion.

3. In a typewriting machine, the combination of a carrier having types thereon, means to support said type carrier for rotative movement in opposite directions from a normal position to register any one of the types at the printing point, means including an element to cooperate with the registered type to print, means including a lever operable in opposite directions from a normal position to actuate said type carrier to its printing position, a single power device, means for selectively actuating said lever by said power device in either one of two opposite directions from a normal position and for returning said lever to normal, devices to vary the throw of the actuating lever, each device being effective for two equal extents of movement of the actuating lever but in opposite directions from a normal position, key levers one for each type on said carrier, means operable by the key levers to effect the operation of the actuating lever, means operable by the key levers to effect a setting of the throw varying devices in accordance with the extent of rotation required of the type carrier to register the selected type at the printing point, and means to effect the actuation of the cooperative element.

4. In a typewriting machine, the combintion of a carrier having angularly spaced types thereon, means to support said carrier for rotative movement to register the types at the printing point, means including an element to cooperate with the registered type to print, means including a lever to actuate the type carrier, key levers one for each type, a series of fulcrum devices for the actuating lever, there being half as many fulcrum devices as there are key levers, selecting devices one for each of the fulcrum devices, two intermediate device for each selecting device, the actuation of said selecting devices being effected by the key levers through the medium of the intermediate devices to select the corresponding fulcrum device, and means operable by the key levers to effect an actuation of the selected fulcrum device.

5. In a typewriting machine, the combination of a carrier having types thereon, means to support said carrier for rotative movement to register the types at the printing point, means including an element to cooperate with the registered type to print, means including a lever to actuate the type carrier, key levers, the key levers being arranged in two groups one to each side of the middle of the machine, a series of fulcrum devices for said actuating lever and corresponding in number to the number of key levers in one of said groups, a series of selecting devices one for each fulcrum device, each selecting device having two key levers associated therewith by either one of which the associated selecting device may be operated to render it effective for subsequent actuation, and means operable by the key levers to effect the actuation of the selected fulcrum device to set it relatively to said actuating lever.

6. In a typewriting machine, the combination of a carrier having types thereon, means to support said carrier for rotative movement to register the types at the printing point, means including an element to cooperate with the registered type to print, means including a lever to actuate the type carrier, a series of fulcrum devices for the actuating lever, key levers, selecting devices one for each of the fulcrum devices, intermediate devices actuable by the key levers to actuate the selecting devices to thus select the corresponding fulcrum device, and means operable by the key levers to effect an actuation of the selected fulcrum device.

7. In a typewriting machine, the combination of a carrier having types thereon, means to support said carrier for rotative movement to register the types at the printing point, means including an element to cooperate with the registered type to print, means including a lever to actuate the type carrier, a series of fulcrum devices for the actuating lever, key levers, the key levers being arranged in two groups one to each side of the middle of the machine, two groups of intermediate devices, one intermediate device for each key lever, the fulcrum devices corresponding in number to the number of key levers in one of said groups, a series of selecting devices one for each fulcrum device, each selecting device being operable by two of the intermediate devices of each group to actuate the associated selecting device, and means operable by the key levers to effect an actuation of the selected fulcrum device.

8. In a typewriting machine, the combination of printing instrumentalities including a rotatable type carrier, means including an actuating lever to rotate said type carrier to set the desired type at the printing point, a series of fulcrum pins for and normally out of engagement with said actuating lever, key levers, selecting devices for the fulcrum pins, slides operable by the key levers to actuate the associated selecting devices, power means to actuate the selected pin to set it into cooperative relation with the actuating lever, and means operable by the key levers to effect the operation of the actuating lever about the active fulcrum pin.

9. In a typewriting machine, the combination of printing instrumentalities including a rotatable type carrier, means including an actuating lever extending fore-and-aft of the machine to rotate said type carrier to set the desired type at the printing point, a series of fulcrum pins for and arranged lengthwise of the actuating lever, said pins being normally out of engagement with said actuating lever, key levers, selecting devices for the fulcrum pins and extending transversely of the key levers, slides extending parallel to and one for each key lever to be operated thereby to actuate the associated selecting device, power means to actuate the selected pin to set it into cooperative relation with the actuating lever, and means operable by the key levers to effect the operation of the actuating lever about the active fulcrum pin.

10. In a typewriting machine, the combination of printing instrumentalities including a rotatable type carrier, means including an actuating lever to rotate said type carrier to set the desired type at the printing point, a series of fulcrum pins for and arranged lengthwise of the actuating lever, said pins being normally out of engagement with said actuating lever, key levers, selecting devices for the fulcrum pins and extending transversely of the key levers, intermediate devices between the key levers and the selecting devices, said intermediate devices being operable by the key levers to actuate the associated selecting device, power means to actuate the selected pin to set it into cooperative relation with the actuating lever, and means operable by the key levers to effect the operation of the actuating lever about the active fulcrum pin.

11. In a typewriting machine, the combination of printing instrumentalities including a rotatable type carrier, means including an actuating lever extending fore-and-aft of the machine to rotate said type carrier to set the desired type at the printing point, a series of fulcrum pins for and arranged lengthwise of the actuating lever, said pins being normally out of engagement with said actuating lever, key levers, the key levers extending fore-and-aft of the machine and being arranged in two groups, one group at each side of the middle of the machine, selecting devices one for each fulcrum pin, each selecting device including an actuating bar, intermediate bars one for each key lever and actuable thereby, the intermediate bars being also arranged in two groups, the actuating bars extending transversely of said intermediate bars and each actuating bar being operable by two of the intermediate bars one of each group to actuate the associated selecting device to select one of the fulcrum pins, means to effect the setting of the selected pin, and means to effect the actuation of the actuating lever about the set fulcrum pin.

12. In a typewriting machine, the combination of printing instrumentalities including a rotatable type carrier, means including an actuating lever extending fore-and-aft of the machine to rotate said type carrier to set the desired type at the printing point, a series of fulcrum pins for and arranged lengthwise of the actuating lever, said pins being normally out of engagement with said actuating lever, key levers, the key levers extending fore-and-aft of the machine and being arranged in two groups, one group at each side of the middle of the machine, selecting devices one for each fulcrum pin, each selecting device including an actuating bar, intermediate bars one for each key lever and actuable thereby, the intermediate bars being also arranged in two groups, the actuating bars extending transversely of said intermediate bars and each actuating bar being operable by two of the intermediate bars one of each group to actuate the associated selecting device to select one of the fulcrum pins, power means, means operable by the key levers to render effective the power means to set the selected pin, and means operable by the power means to effect the actuation of the actuating lever about the set fulcrum pin.

13. In a typewriting machine, the combination of printing instrumentalities including a type carrier, means including an actuating lever to rotate said type carrier to present any one of the types to the printing point, locking means for said lever to prevent accidental displacement thereof, means actuable by the key levers to effect the actuation of the locking means to render it ineffective, and means to operate said actuating lever.

14. In a typewriting machine, the combination of printing instrumentalities including a type carrier, means including an actuating lever to rotate said type carrier to present any one o the types to the printing point, locking means at one end of said lever to prevent accidental displacement of said end of the lever, two devices connected to the opposite end of said lever whereby it may be actuated in opposite directions to rotate the type carrier correspondingly, said devices serving to lock said opposite end of the lever in its normal position against accidental displacement, and means to render said locking means ineffective prior to each operation of the actuating lever.

15. In a typewriting machine, the combination of printing instrumentalities including a type carrier, means including an actuating lever to rotate said type carrier to present any one of the types to the printing point, variable fulcrum means for the actuating lever, means to set the fulcrum means, locking means for said lever to prevent accidental displacement thereof relatively to the fulcrum means, means actuable by the key levers to effect the actuation of the locking means to render it ineffective, and means to operate said actuating lever.

16. In a typewriting machine, the combination of printing instrumentalities including a type carrier, means including an actuating lever to rotate said type carrier to present any one of the types to the printing point, a plurality of fulcrum devices to cooperate with said actuable lever one at a time to vary the throw of said lever, said fulcrum devices being normally out of cooperation with the actuable lever, means to lock said actuating lever against accidental displacement, means to set any one of said pins into cooperative relation with said actuating lever, and means to render the locking device ineffective.

17. In a typewriting machine, the combinaion of printing instrumentalities including a type carrier, means including an actuating lever to rotate said type carrier to present any one of the types to the printing point, a plurality of fulcrum devices to cooperate with said actuable lever one at a time to vary the throw of said lever, said fulcrum devices being normally out of cooperation with the actuable lever, a pin to normally lock said actuating lever against accidental displacement, means to set any one of said fulcrum devices into cooperative relation with said actuating lever, and means operable by the setting means to withdraw the locking pin from the actuating lever to unlock it.

18. In a typewriting machine, the combination of printing instrumentalities including a type carrier, means including an actuating lever to rotate the type carrier in opposite directions from a normal position to register any one of the types at the printing point, fulcrum means for said lever and normally out of engagement therewith, means at one end of said lever connecting it with the type carrier to drive the latter, driving means connected to the other end of said lever to actuate it in opposite directions, the extent of movement at the driven end of said lever being constant, means to set the fulcrum means into engagement with said lever, means at the driving end of said lever to lock the latter, and means to actuate said locking means to unlock said lever, said driving means including two actuating devices to drive the actuating lever in opposite directions, said devices assisting to lock said lever in its normal position.

19. In a typewriting machine, the combination of printing instrumentalities including a type carrier, means including a lever to actuate said type carrier, fulcrum means for said lever, fulcrum selecting means, power means, means operable by the power means to set the fulcrum means, means operable by the power means to operate the actuating lever, means to lock said actuating lever in its normal position, and means operable by said power means to actuate said locking means to unlock said lever.

20. In a typewriting machine, the combination of printing instrumentalities including a type carrier, means including a lever to actuate said type carrier, fulcrum means for said lever, fulcrum selecting means, power means, means including a toggle operable by the power means to operate the actuating lever, the initial part of the movement of the toggle having practically no effect on the actuating lever, said toggle being connected to one end of the actuating lever to lock the latter in its normal position, locking means to engage the other end of the actuating lever to lock it in its normal position, and means operable by the power means during said initial part of the movement of said toggle to set the fulcrum and to actuate the locking means to release the actuating lever.

21. In a typewriting machine, the combination of printing instrumentalities including a rotatable type carrier, means including an actuating lever to rotate said carrier to set the desired type at the printing point, a plurality of fulcrum pins for said actuating lever, setting levers one for each pin, a universal bar common to the setting levers, connecting devices one pivotally supported on each setting lever, selecting devices whereby the connecting devices may be operated to connect them one at a time with the universal bar, and key operated means to effect the actuation of the universal bar to set one of the fulcrum pins through the medium of the setting lever connected to said universal bar.

22. In a typewriting machine, the combination of printing instrumentalities including a type carrier, means including an actuating lever to rotate the type carrier in opposite directions from a normal position to register any one of the types at the printing point, a fulcrum for said lever, means at one end of said lever connecting it with the type carrier to drive the latter, two sets of mechanism connected to the other end of the lever to actuate it in opposite directions from a normal position and always the same extent, each set of mechanism being also effective to return said lever to normal, and fulcrum varying means to vary the throw of the actuating lever at its driving end, each one of the sets of mechanism including means to silently arrest the actuating lever in its operated positions.

23. In a typewriting machine, the combination of printing instrumentalities including a type carrier, means including an actuating lever to rotate the type carrier in opposite directions from a normal position to register any one of the types at the printing point, a fulcrum for said lever, means at one end of said lever connecting it with the type carrier to drive the latter, two sets of mechanism connected to the other end of the lever to actuate it in opposite directions from a normal position and always the same extent, each set of mechanism being also effective to return said lever to normal, and fulcrum varying means to vary the throw of the actuating lever at its driving end, each one of the sets of mechanism including means to gradually arrest the actuating lever in its operated positions, and means to silently arrest the actuating lever in its normal position.

24. In a typewriting machine, the combination of printing instrumentalities including a type carrier, means including an actuating lever to rotate the type carrier in opposite directions from a normal position to register any one of the types at the printing point, a fulcrum for said lever, means at one end of said lever connecting it with the type carrier to drive the latter, two sets of mechanism connected to the other end of the lever to actuate it in opposite directions and always the same extent, and fulcrum varying means to vary the throw of the actuating lever at its driving end, each one of the sets of mechanism including a toggle to silently arrest the actuating lever in its operated positions, and a toggle to arrest the actuating lever in its normal position.

25. In a typewriting machine, the combination of printing instrumentalities including a type carrier, means including an actuating lever to rotate the type carrier in opposite directions from a normal position to register any one of the types at the printing point, a fulcrum for said lever, means at one end of said lever connecting it with the type carrier to drive the latter, two sets of mechanism connected to the other end of the lever to actuate it in opposite directions and always the same extent, fulcrum varying means to vary the throw of the actuating lever at its driving end, each set of mechanism including a toggle to gradually overcome the inertia of rest of the type carrier, and a toggle to gradually overcome the inertia of motion of the type carrier.

26. In a typewriting machine, the combination of printing instrumentalities including a type carrier, means including an actuating lever to operate said carrier in opposite directions to position the type carrier with any one of the types at the printing point, an intermediate lever connected to said actuating lever to operate it in opposite directions, and two devices associated with the intermediate lever and operable in opposite directions from their normal positions to operate said actuating lever and to gradually overcome the inertia of rest of said type carrier, each of said devices being also effective to return the intermediate lever to normal.

27. In a typewriting machine, the combination of printing instrumentalities including a type carrier, means including an actuating lever to operate said carrier in opposite directions to position the type carrier with any one of the types at the printing point, an intermediate lever connected to said actuating lever to operate it in opposite directions, two devices connected to the intermediate lever and operable individually in opposite directions with respect to each other, each of said devices including a toggle to gradually over come the inertia of rest of said type carrier, and a toggle to gradually overcome the inertia of motion of said type carrier.

28. In a typewriting machine, the combination of printing instrumentalities including a type carrier, means including an actuating lever to operate the type carrier in opposite directions from a normal position to register any one of the types at the printing point, fulcrum means for said lever, and driving means connected to said lever to actuate it in opposite directions, said driving means including two actuating devices, an intermediate lever connected to said devices and operable thereby one at a time and in opposite directions, and an element connecting the intermediate lever with the actuating lever, said driving means being also effective to drive said actuating lever and the type carrier back to normal.

29. In a typewriting machine, the combination of printing instrumentalities including a type carrier, means including an actuating lever to operate said carrier in opposite directions to position the type carrier with any one of the types at the printing point, an intermediate lever connected to said lever to actuate it in opposite directions, and two devices connected to the intermediate lever and operable to drive the actuating lever in opposite directions from a normal position to its printing position and to drive said actuating lever back to normal.

30. In a typewriting machine, the combination of printing instrumentalities including a type carrier, means including a lever to actuate said type carrier, fulcrum means for said lever, fulcrum selecting means operable without disturbing the fulcrum means, continually reciprocating power means, means operable by the power means to set the fulcrum means, and means operable by the power means to operate the actuating lever to drive the type carrier to its printing position and to drive it back to normal.

31. In a typewriting machine, the combination of printing instrumentalities including a type carrier, means including a lever to actuate said type carrier, fulcrum means for said lever, key levers, fulcrum selecting means operable by the key levers without disturbing the fulcrum means, power means, continually reciprocating means operable by the power means to set the fulcrum means after the selecting means has been operated, and means operable by the power means after the fulcrum means has been set to operate the actuating lever to drive the type carrier to its printing position and to drive it back to normal.

32. In a typewriting machine, the combination of printing instrumentalities including a type carrier, means including a lever to actuate said type carrier, fulcrum means for said lever, a plurality of fulcrum pins, selecting means for said fulcrum pins, means to operate said selecting means without disturbing the fulcrum means, continually reciprocating power means, means operable by the power means to set the selected fulcrum pin, and means operable by the power means to operate the actuating lever to drive the type carrier to its printing position and to drive it back to normal.

33. In a typewriting machine, the combination of printing instrumentalities including a type carrier, means including a lever to actuate said type carrier, fulcrum means for said lever, fulcrum selecting means, power means, means operable by the power means to operate the actuating lever in a manner such that the initial part of the movement of the operable means has no effect on the actuating lever, and means operable by the power means during said initial part of the movement of the operable means to set the fulcrum means.

34. In a typewriting machine, the combination of printing instrumentalities including a rotatable type carrier, means including an actuating lever operable in opposite directions to rotate the type carrier accordingly, means including two power driven devices which reciprocate continually, a train of devices to operate the actuating lever in one direction from its normal position, a train of devices to operate the actuating lever in the opposite direction from its normal position, two groups of key levers, one group for each power driven device, and means associated with each power driven device whereby the latter may be connected with one of the trains of actuating devices by the actuation of any one of the associated group of key levers to cause the power device to drive the type carrier to its printing position and to drive it back to normal.

35. In a typewriting machine, the combination of printing instrumentalities including a rotatable type carrier, means including an actuating lever to rotate the type carrier, means including a power power driven device which reciprocates continually, a train of devices to operate the actuating lever, a group of key levers, and means associated with the power driven device whereby the latter may be connected with the train of actuating devices by the actuation of any one of the key levers to cause the power driven device to drive the type carrier to its printing position and to drive it back to normal.

36. In a typewriting machine, the combination of printing instrumentalities including a rotatable type carrier, means including an actuating lever to rotate the type carrier, means including a power driven device which reciprocates continually, a train of devices to operate the actuating lever and to return it to its normal position, a group of key levers, means associated with the power driven device whereby the latter may be connected with the train of actuating devices by the actuation of any one of the key levers so that said train of devices may drive the type carrier to its printing position and drive it back to normal, and means whereby the train of devices becomes disconnected from the power driven device after the actuating lever has been returned to normal.

37. In a typewriting machine, the combination of printing instrumentalities including a type carrier, an actuating lever therefor, a power driven continually reciprocating device whereby the actuating lever may be driven to its printing position and be driven back to normal, key levers, and means operable by any one of the key levers to effect a connection of the actuating lever with the reciprocating device.

38. In a typewriting machine, the combination of printing instrumentalities including a type carrier, an actuating lever therefor, a power driven continually rotating device, a continually reciprocating element operable by the rotating device whereby the actuating lever may be driven to its printing position and be driven back to normal, key levers, and means operable by any one of the key levers to effect a connection of the actuating lever with the reciprocating device.

39. In a typewriting machine, the combination of printing instrumentalities including a type carrier, an actuating lever therefor, a power driven continually reciprocating element, a train of operating mechanism extending from the actuating lever, said mechanism including a driven element, key levers, and means operable by any one of the key levers to effect a connection of the reciprocating element with the driven element so that the type carrier may be actuated by the power driven device to its printing position and back to normal.

40. In a typewriting machine, the combination of printing instrumentalities including a type carrier, an actuating lever therefor, a power driven continually rotating device, a reciprocating element operable by the rotating device, key levers, a train of operating mechanism extending from the actuating lever, said mechanism including a driven element, a coupling member to connect the driving element with the reciprocating element so that the type carrier may be driven by the power device to its printing position and back to normal, means whereby the coupling member may be rendered effective by the operation of any one of the key levers, and means to render the coupling member ineffective upon the return of the type carrier.

41. In a typewriting machine, the combination of printing instrumentalities including a type carrier, an actuating lever therefor, a power driven continually rotating device, a reciprocating element operable by the rotating device, key levers, a train of operating mechanism extending from the actuating lever, said mechanism including a driven element, a coupling member on one of said elements, an interponent, means operable by any one of the key levers to effect the actuation of the interponent to set it with respect to the coupling member, and means to subsequently actuate the interponent to thereby actuate the coupling member to connect the driving element with the driven element.

42. In a typewriting machine, the combination of printing instrumentalities including a type carrier, an actuating lever therefor, a power driven continually rotating device, a reciprocating element operable by the rotating device, key levers, a train of operating mechanism extending from the actuating lever, said mechanism including a driven element, a coupling member to connect the reciprocating element with the driven element, means whereby the actuation of the coupling member may be effected by the operation of any one of the key levers, means to engage the coupling member to hold it in its effective position until the reciprocating element has completed one reciprocation, and means to render the coupling member ineffective when a reciprocation of the driving element has been completed so as to permit the reciprocating element to continue its reciprocatory movement while the driven element remains at rest.

43. In a typewriting machine, the combination of printing instrumentalities including a type carrier, an actuating lever therefor, a power driven continually rotating device, a reciprocating element operable by the rotating device, key levers, a train of operating mechanism extending from the actuating lever, said mechanism including a driven element, a coupling member on one of said elements, an interponent, means operable by any one of the key levers to effect the actuation of the interponent to set it with respect to the coupling member, and means operable by said rotating device to actuate said interponent after it has been set to thus actuate the coupling member to connect the driven element with the driving element.

44. In a typewriting machine, the combination of printing instrumentalities including a type carrier, an actuating lever therefor, a power driven continually running crank shaft, a link connected to said crank shaft, an element reciprocable continually by the connecting link, and means to connect the actuating lever with the continually reciprocatory element while the latter is momentarily at rest due to the point of connection of the connecting rod with the crank shaft passing through the dead center.

45. In a typewriting machine, the combination of printing instrumentalities including a type carrier, an actuating lever therefor, a power driven continually running crank shaft, a link connected to said crank shaft, an element reciprocable continually by the connecting link, means to connect the actuating lever with the continually reciprocating element while the latter is momentarily at rest due to the point of connection of the connecting rod with the crank shaft passing through dead center, and means to disconnect the actuating lever from the reciprocating element when the latter is again momentarily at rest and after the actuating lever has been returned to normal by the reciprocating element.

46. In a typewriting machine, the combination of printing instrumentalities including a type carrier, an actuating lever therefor, a power driven continually running crank shaft, a connecting link operable by said crank shaft, an element reciprocable continually by the connecting link, means to connect the actuating lever with the reciprocable element, means to disconnect the actuating lever from the reciprocable element, and means to permit the connection to be made and broken only while the reciprocable device is momentarily at rest due to the reversal of its actuation.

47. In a typewriting machine, the combination of printing instrumentalities including a type carrier, continually running power means to actuate said type carrier to the printing position and return it to normal, the latter being normally disconnected from said power means, a clutch to connect the type carrier with the power means, key levers, means operable by the key levers to render the clutch effective, and means operable by the power means to render the clutch ineffective after the restoration of the type carrier and while the active key lever is still in its operated position so as to prevent another actuation of the type carrier until the key lever is returned to normal.

48. In a typewriting machine, the combination of printing instrumentalities including a type carrier, continually running power means to actuate said type carrier, the latter being normally disconnected from said power means, a clutch to connect the type carrier with the power means, means including an electric device to effect the actuation of the clutch, key levers, means including a switch operable by the key levers to effect the actuation of the electric device, and means operable by the power means to open said switch to render the clutch ineffective after the actuation of the type carrier and while the active key lever is still in its operated position.

49. In a typewriting machine, the combination of printing instrumentalities including a type carrier, continually running power means to actuate said type carrier, the latter being normally disconnected from said power means, a clutch to connect the type carrier with the power means, means including an electric device to effect the actuation of the clutch, key levers, a universal bar operable by the key levers, an actuator on said universal bar, a lever operable by said actuator, a switch operable by said lever to close it, to effect the actuation of the electric device, and means operable by the power means to release the actuator from the switch lever to render the clutch ineffective after the actuation of the type carrier.

50. In a typewriting machine, the combination of printing instrumentalities including a type carrier, continually running power means to actuate said type carrier, the latter being normally disconnected from said power means, a clutch to connect the type carrier with the power means, means including an electric device to effect the actuation of the clutch, key levers, a universal bar operable by the key levers, an actuator on said universal bar, a lever operable by said actuator, a switch operable by said lever to close it to effect the actuation of the electric device, said actuator being pivotally supported on said universal bar, a cam operable by the power means to swing said actuator about its pivot to thus release the switch lever to effect the opening of said switch to effect the deenergization of the electric device and thus render the clutch ineffective.

51. In a typewriting machine, the combination of type carrier actuating means, continually rotating power means, a clutch whereby the actuating means may be connected with the power means, said clutch including two elements, namely a continually reciprocating element driven by the power means, and a cooperative element connected to the actuating means, and means whereby the cooperative element may be connected to the reciprocating element only while the latter is momentarily at rest due to the reversal of said reciprocating element.

52. In a typewriting machine, the combination of type carrier actuating means, continually rotating power means, a clutch whereby the actuating means may be connected with the power means, said clutch including a continually reciprocating element driven by the power means, a cooperative clutch element connected to the actuating means, an interponent on one of said elements, and means to actuate said interponent to connect the cooperative element to the reciprocating element while the latter is momentarily at rest due to the reversal of movement of said reciprocating element.

53. In a typewriting machine, the combination of type carrier actuating means, continually rotating power means, a clutch whereby the actuating means may be connected with the power means, said clutch including a continually reciprocating element driven by the power means, and a cooperative clutch element connected to the actuating means, and means whereby the cooperative element may be connected to the reciprocating element while the latter is momentarily at rest due to the reversal of movement of the reciprocating element, and means to retain the connection of the cooperative element with the reciprocating element until the latter has made a complete cycle.

54. In a typewriting machine, the combination of type carrier actuating means, continually rotating power means, a clutch whereby the actuating means may be connected with the power means, said clutch including a continually reciprocating element driven by the power means, a cooperative clutch element connected to the actuating means, and an interponent on one of said elements, means to actuate said interponent to connect the cooperative element to the reciprocating element while the latter is momentarily at rest due to the reversal of movement of said reciprocating element, and means cooperating directly with said interponent to hold the latter in its effective position until the reciprocating element has made one complete cycle.

55. In a typewriting machine, the combination of type carrier actuating mechanism, continually rotating power means, a clutch whereby the actuating means may be connected with the power means, said clutch including a continually reciprocating element driven by the power means, a cooperative clutch element connected to the actuating means, and an interponent whereby the cooperative element may be connected to the reciprocating element, a settable element, means to move the latter into cooperative relation with said interponent, means to subsequently actuate the settable element to thereby actuate the interponent to its effective position, means to effect the actuation of the last mentioned means while the reciprocating element is momentarily at rest due to the reversal of movement of said reciprocating element, a locking plate extending along the path of travel of the interponent to engage the latter and hold it in its effective position until it is returned to its starting position, and means to render said interponent ineffective.

56. In a typewriting machine, the combination of type carrier actuating mechanism, continually rotating power means, a clutch whereby the actuating means may be connected with the power means, said clutch including a constantly reciprocating element driven by the power means, a cooperative clutch element connected to the actuating means, and an interponent whereby the cooperative element may be connected to the reciprocating element, a selecting device, an electromagnet to actuate said selecting device to set the latter into cooperative relation with said interponent, a switch in circuit with the electro-magnet, said switch being operable by the power means to close it, means operable by the power means to actuate the selecting device while the reciprocating element is momentarily at rest due to a reversal of the latter to thereby actuate the interponent and thus connect the reciprocating element with said cooperative element, a locking plate extending along the path of travel of the interponent to engage the latter and hold it in its effective position until it is returned to its starting position, and means to render said interponent ineffective.

57. In a typewriting machine, the combination of type carrier actuating mechanism, continually rotating power means, a clutch wherely the actuating means may be connected with the power means, said clutch including a constantly reciprocating element driven by the power means, a cooperative clutch element connected to the actuating means, and an interponent whereby the cooperative element may be connected to the reciprocating element, a settable element, means to move the latter into cooperative relation with said interponent, means to subsequently actuate the settable element to thereby actuate the interponent to its effective position, and means to effect the actuation of the last mentioned means while the reciprocating element is momentarily at rest due to the reversal of movement of said reciprocating element.

58. In a typewriting machine, the combination of type carrier actuating means, continually rotating power means, a clutch whereby the actuating means may be connected with the power means, said clutch including a constantly reciprocating element driven by the power means, a cooperative clutch element connected to the actuating means, and an interponent whereby the cooperative element may be connected to the reciprocating element, a selecting device, an electromagnet to actuate said selecting device to set the latter into cooperative relation with said interponent, a switch in circuit with the electro-magnet, said switch being operable by the power means to close it, a second switch, the latter being in circuit with the first mentioned switch and a source of power, key operated devices to close the second mentioned switch and means operable by the power means to actuate the selecting device while the reciprocating element is momentarily at rest due to a reversal of the latter to thereby actuate said interponent and thus connect the reciprocating device with said cooperative element.

59. In a typewriting machine, the combination of type carrier actuating means, continually rotating power means, a clutch whereby the actuating means may be connected with the power means, said clutch including two elements, namely a constantly reciprocating element driven by the power means, and a cooperative element connected to the actuating means, means including an electric device whereby the cooperative element may be connected to the reciprocating element, a switch connected in circuit with the electric device, a second switch, the latter being in circuit with the first mentioned switch and a source of power, key operated devices to close the second mentioned switch; and means operable by the power means to close said first mentioned switch to effect the actuation of the electric means while the reciprocating element is momentarily at rest due to the reversal of said reciprocating element.

60. In a typewriting machine, the combination of type carrier actuating means, continually rotating power means, a clutch whereby the actuating means may be connected with the power means, said clutch including two elements, namely a constantly reciprocating element driven by the power means, and a cooperative element connected to the actuating means, a clutch connecting element, an actuating element for the clutch connecting element, an intermediate element, and means to set the intermediate element so that the latter may be operated by the actuating element to actuate the clutch connecting element to thereby connect the cooperative element with the reciprocating element.

61. In a typewriting machine, the combination of type carrier actuating means, continually rotating power means, a clutch whereby the actuating means may be connected with the power means, said clutch including two elements, namely a continually reciprocating element driven by the power means, and a cooperative element connected to the actuating means, a clutch connecting element on one of the clutch elements, mechanism to actuate the clutch connecting element, said mechanism including a device to engage the clutch connecting element but normally out of the cooperative relation therewith, and means to set said device into cooperative relation with said clutch connecting element.

62. In a typewriting machine, the combination of type carrier actuating means, continually rotating power means, a clutch whereby the actuating means may be connected with the power means, said clutch including two elements, namely a constantly reciprocating element driven by the power means, and a cooperative element connected to the actuating means, a clutch connecting element on one of the clutch elements, continually reciprocating mechanism operating in a direction at right angles to the plane in which said reciprocating element operates, means whereby the reciprocating mechanism is kept in timed relation with respect to the reciprocating element, said reciprocating mechanism including a settable element, and means to actuate the settable element to set it into cooperative relation with respect to the clutch connecting element so that the latter may be acuated and rendered effective thereby.

63. In a typewriting machine, the combination of a type carrier, actuating mechanism including a lever operable in opposite directions from a normal position, continually running power means including two crank shafts, two clutches one for each crank shaft, each clutch including a driving element, and a cooperative element connected to the actuating means, a connecting rod operable by each crank shaft to continually reciprocate the associated driving element, two groups of key levers one group for each clutch, and means operable by the key levers of the associated clutch whereby its cooperative element may be connected to the reciprocating element.

64. In a typewriting machine, the combination of a type carrier, actuating mechanism including a lever operable in opposite directions from a normal position, continually running power means including two rotating elements, two clutches one driven by each rotating device and whereby the actuating means may be connected with the power means, each clutch including a constantly reciprocating element driven by the power means, a cooperative clutch element connected to the actuating means, and an interponent whereby the cooperative element may be connected to the reciprocating element, two groups of key levers one group for each clutch, a settable element for each interponent, means to move the latter into cooperative relation with respect to said interponent, means operable by the associated group of key levers to effect the actuation of the means which moves the settable element, means to subsequently actuate the settable element to thereby actuate the interponent to its effective position, and means to effect the actuation of the last mentioned means.

65. In a typewriting machine, the combination of a rotatable type carrier, means including a lever operable in opposite directions from a normal position, said lever being located in the middle of the machine, two sets of mechanism to actuate said lever one set at each side of the machine, a continually running power drive including a shaft extending transversely of the machine, two constantly rotating devices driven by said shaft, two reciprocating devices one driven by each rotating device, two sets of key levers one set associated with each set of mechanism, connecting means for each reciprocating device, means operable by any one of the key levers of the associated set to effect the actuation of the connecting means to thereby connect one of the sets of mechanism with the associated reciprocating device, and means to render the connecting means ineffective when the actuating lever has been returned to normal.

66. In a typewriting machine, the combination of a rotatable type carrier, means including a lever operable in opposite directions from a normal position, said lever being located in the middle of the machine, two sets of linkage to actuate said lever in opposite directions one set at each side thereof, a continually running power drive including a shaft extending transversely of the machine, two constantly rotating crank shafts driven by said shaft, two connecting rods one for each crank shaft, two reciprocating devices one driven by each connecting rod, two sets of key levers one set associated with each set of linkage, connecting means for each reciprocating device, means operable by any one of the key levers of a set to effect the actuation of the connecting means to thereby connect one of the sets of linkage with the associated reciprocating device, and means to render the connecting means ineffective only when the actuating lever has been returned to normal.

67. In a typewriting machine, the combination of a platen, a type bar unit including a rack, and type bars thereon, two groups of key levers, two sets of actuating mechanism, each set effective to rotate the type bar rack from a normal position in a direction opposite to that in which it may be rotated by the other set of mechanism each set of key levers being associated with one set of mechanism, a type bar actuator, a rock-shaft, an arm on said rock-shaft to operate said actuator, two driving arms on said rock-shaft each one of the driving arms being connected to one set of mechanism.

68. In a typewriting machine, the combination of a platen, a type bar unit including a rack, and type bars thereon, two groups of key levers, two sets of actuating mechanism, each set being effective to rotate the type bar rack from a normal position to its printing position in a direction opposite to that in which it may be rotated by the other set of mechanism and to restore it to normal, each set of key levers being associated with one set of mechanism, a type bar actuator, means operable by either set of mechanism to operate said actuator to its printing position and to restore it to normal, and micrometer adjusting means to set the type bar actuator without disturbing either set of mechanism to compensate for various thicknesses of work sheets which may be interposed between said actuator and the platen.

69. In a typewriting machine, the combination of a platen, a type bar unit including a rack, and type bars thereon, a type bar actuator, two groups of key levers, means operable by the key levers to effect rotation of the type bar rack to set a selected type bar into cooperative relation with the actuator, a rock shaft, a driven arm on said rock shaft connected to said actuator, two driving arms on said rock shaft, operating means associated with each set of key levers and connected to each actuating arm, means operable by each set of key levers to effect the actuation of the associated operating means, and micrometer adjusting means on said rock shaft to alter the position of the driven arm about the axis of the rock shaft and with respect to the driving arms to vary the position to which the effective end of the type bar actuator may be moved.

70. In a typewriting machine, the combination of a rotatable type carrier having type members thereon, an element to cooperate with said type members to effect the printing thereof, continually running driving means, reciprocable driven means normally at rest and operable by the driving means, means connected with the driven means to rotate the type carrier to set a type member into alignment with the cooperative element and to return it to normal, and means connected with the driven means to actuate said cooperative element to print.

71. In a typewriting machine, the combination of a rotatable type carrier having type members thereon, an element to cooperate with said type members to effect the printing thereof, continually running power means, reciprocable driven means operable by the power means, key levers, means operable by the key levers to effect the actuation of the reciprocable means by the power means through a complete cycle, means connected with the driven means to rotate the type carrier to set a type member into alignment with the cooperative element, and means connected with the driven means to actuate said cooperative element.

72. In a typewriting machine, the combination of a rotatable type carrier having type members thereon, an element to cooperate with said type members to effect the printing thereof, driving means, driven means operable by the driving means, means including a toggle connected with the driven means to rotate the type carrier to set a type member into alignment with the cooperative element and to restore it to normal, and means connected with the driven means to actuate said cooperative element, the toggle being effective to assist in locating the desired type member in the path of the cooperative element.

73. In a typewriting machine, the combination of a rotatable type carrier having type members thereon, an element to cooperate with said type members to effect the printing thereof, driving means including a toggle, driven means operable by the driving means, means including a toggle connected with the driven means to rotate the type carrier to set a type member into alignment with the cooperative element, and means connected with the driven means to actuate said cooperative element, the combined action of both toggles being effective to reduce the movement of the type carrier practically to zero and locate it in the path of the cooperative element before the latter reaches its printing position, the first mentioned toggle being effective to produce great pressure on the cooperative element while printing.

74. In a typewriting machine, the combination of a rotatable type carrier having type members thereon, an element to cooperate with said type members to effect the printing thereof, continually running driving means, driven means normally at rest but operable by the driving means, type carrier rotating means connected with the driven means and the type carrier, means to effect a connection of the driven means with the driving means, selectively settable means selective to determine the extent of rotation of the type carrier required to set the selected type member into the path of the cooperative element, and means connected with the driven means to drive said cooperative element to its printing position.

75. In a typewriting machine, the combination of a rotatable type carrier having type members thereon, an element to cooperate with said type members to effect the printing thereof, driving means, driven means operable by the driving means, type carrier rotating means connected with the driven means and the type carrier, the type carrier rotating means including an actuating lever, fulcrum varying means for said lever to vary the throw thereof in accordance with the distance of the selected type from the printing point, and means connected with the driven means to actuate said cooperative element.

76. In a typewriting machine, the combination of a curved type carrier having type members thereon located side-by-side at its curved face, an element to cooperate with said type members to effect printing, a continually running driving device, a driven device associated with the driving device and operable thereby but normally disconnected therefrom, means including an actuating lever to rotate the type carrier through a complete cycle from a normal position, a connecting device extending from the driven device to the actuating lever to operate it from its normal position and to restore it to normal, and a device operable by the driven device to actuate the cooperating element.

77. In a typewriting machine, the combination of a platen, a circular type bar carrier arranged in a slanting position in front of the platen, type bars arranged side-by-side on said carrier, each type bar having a lower case type on its outer end, and an upper case type farther removed from the outer end, said types being arranged in alignment lengthwise of the type bar, an actuator to engage the outer ends of said type bars, the faces of the two types on each bar being in the same plane, the platen being normally positioned for cooperation with the lower case type, and means to shift the platen downwardly to the upper case type in a plane parallel to the plane in which the type faces of an active type bar lie while in its printing position.

78. In a typewriting machine, the combination of a type carrier, means to rotate said type carrier to locate any one of its types at the printing point, a continually running power device, two driving devices connected to said means to actuate the latter in opposite directions from a normal position, two groups of key levers, two universal bars, one associated with each group of key levers and operable by the key levers of the associated group, one of said devices being associated with each universal bar, means operable by each universal bar to connect the power device with the driving device of the associated universal bar, a ribbon vibrator, and actuating means for the ribbon vibrator, said actuating means including two connecting elements one extending to each universal bar and operable thereby independently of the other universal bar.

79. In a typewriting machine, the combination of a type carrier, means to rotate said type carrier to locate any one of its types at the printing point, a continually running power device, a driving device connected to said means to actuate the latter, key levers, a universal bar operable by the key levers, means operable by the universal bar to connect the power device with the driving device to actuate the latter, a ribbon vibrator, and actuating means for the ribbon vibrator, said actuating means including a connecting element extending to the universal bar and operable thereby.

80. In a typewriting machine, the combination of a type carrier, means to rotate said type carrier to locate any one of its types at the printing point, continually running power means, two driving devices connected to said means to actuate the latter in opposite directions from a normal position, said driving devices being normally at rest but operable by said power means, two groups of key levers, two universal bars one associated with each group of key levers and operable by the key levers of the associated group, one of said devices being associated with each universal bar, means operable by each universal bar to effect a connection of the associated driving device with the power means, a ribbon vibrator, actuating means for the ribbon vibrator, said actuating means including two connecting elements, one extending to each universal bar and operable thereby independently of the other universal bar, and means to disconnect the active driving device from the power means after the driving device has been returned to normal by the power means.

81. In a typewriting machine, the combination of a type carrier, means to rotate said type carrier to locate any one of its types at the printing point, two driving devices physically connected to said means so that each device may actuate said means in opposite directions from a normal position and restore it to normal, two groups of key levers, two universal bars, one associated with each group of key levers and operable by the key levers of the associated group, one of said devices being associated with each universal bar, means operable by each universal bar to effect the actuation of the associated driving device, a carriage, an escapement for said carriage, and actuating means for the escapement, said actuating means including two connecting elements one extending to each universal bar and operable thereby independently of the other universal bar.

82. A type carrier for a typewriting machine, including in combination an annular fulcrum element, a guide element having radial slots therein, type bars pivotally connected to the fulcrum element one located in each slot, radially arranged return springs one connected to each type bar and all of the springs extending in towards the center of the type bar carrier, and an annular element to which the inner ends of the return springs are connected, the pivotal connection of each type bar with the fulcrum element being such as to prevent accidental displacement of the type bar lengthwise thereof but which permits detachment of the type bar from the fulcrum element for substitution, each return spring being also effective to hold its type bar against the fulcrum element to assist in preventing accidental displacement thereof.

83. A type carrier for a typewriting machine, including in combination an annular fulcrum element, a guide element having radial slots therein, type bars pivoted on the fulcrum element one located in each slot, radially arranged return springs one connected to each type bar and all of the springs extending in towards the center of the type bar carrier, and an annular element to which the inner ends of the return springs are connected, each type bar having a slot extending in from the back of the type bar and transversely of the type bar to prevent longitudinal displacement of the type bar on its fulcrum and to permit the removal of any one of the type bars without disturbing the fulcrum element, each return spring assisting to prevent accidental displacement of its associated type bar on the fulcrum element.

84. A type carrier for a typewriting machine, including in combination an annular fulcrum element at one end thereof, a type bar guide element having radial slots therein, type bars pivoted on the fulcrum element one located in each slot and each type bar having types on the front thereof, each type bar engaging the bottom of its slot while in a normal position, each type bar having a slot extending into it from the back thereof and at right angles thereto, and radially arranged return springs one connected to each type bar and all the springs extending in towards the center of the type bar carrier so as to hold the type bars on the fulcrum element and against the bottoms of said slots.

85. In a typewriting machine, the combination of a platen, a type bar carrier including a body part, and type bars pivotally supported on said body part, a type bar actuator at the front of the platen, means to rotatably support said body part in front of the platen, means to rotate said body part to present any one of the type bars to said actuator, operating means for said actuator, aligning means to accurately position the selected type bar at the printing point, and means actuable by the actuator operating means to render the aligning means effective.

86. In a typewriting machine, the combination of a platen, a type carrier, type bars supported on said carrier to print against said platen, means including a type bar actuator, means to rotate said type carrier to position any one of the type bars in alignment with said actuator, means for detachably securing the type carrier to said shaft, and means to permit a movement of said actuator from its normal position to an abnormal position so as to permit the removal of the type carrier from said shaft.

87. In a typewriting machine, the combination of a platen, a type carrier element, type bars supported on said carrier to print against said platen, means including a type bar actuator element, means including a shaft to rotate said type carrier to position any one of the type bars in alignment with said actuator, means for detachably securing the type carrier to said shaft, said type carrier element being movable axially of said shaft to remove it therefrom, the actuator element and the type carrier element being normally positioned with respect to each other to interfere with the removal of the type bar carrier element, and means to permit movement of one of said elements to a position in which it is clear of the other element so as to permit the axial movement of the type bar carrier element.

88. In a typewriting machine, the combination of a platen, a type carrier, type bars supported on said carrier to print against said platen, means including a type bar actuator, means including a shaft to rotate said type carrier to position any one of the type bars in alignment with said actuator, a bracket to support said actuator, means for detachably mounting the type carrier on said shaft, said carrier being movable axially of said shaft to remove it therefrom and being normally obstructed against such removal by said actuator, and means to support said bracket so that it may be actuated to move the type bar actuator out of the path of the type carrier.

89. In a typewriting machine, the combination of a platen, a type carrier, type bars supported on said carrier to print against said platen, type bar actuating means including a thrust rod and an operating lever pivotally connected thereto, means including a shaft to rotate said type carrier to position any one of the type bars in alignment with said thrust rod, means for detachably securing the type carrier to said shaft, said type carrier being movable axially of said shaft to remove it therefrom and being normally obstructed against such removal by the thrust bar, a bracket to support said thrust bar, and a pivot for said bracket about which the latter may be swung to carry said thrust rod therewith about its pivot to clear said type carrier.

90. In a typewriting machine, the combination of a platen, a type carrier, type bars supported on said carrier to print against said platen, means including a type bar actuator, said actuator being located in front of the platen, a guide bracket for said actuator, and means to support said guide bracket so that it may be moved to carry said actuator to an abnormal position to give access to the type bars.

91. In a typewriting machine, the combination of a platen, a type carrier, type bars supported on said carrier to print against said platen, means including a type bar actuator, means including a shaft to rotate said type carrier to position any one of the type bars in alignment with said actuator, a bracket to support said actuator, means for detachably mounting the type carrier on said shaft, said carrier being movable axially of said shaft to remove it therefrom and being normally obstructed by said actuator, means to support said bracket so that it may be moved out of the path of the type carrier, and a lock to hold said bracket in its normal position.

92. In a typewriting machine, the combination of a platen, a type carrier, type bars supported on said carrier to print against said platen, type bar actuating means including a thrust rod and an operating lever pivotally connected thereto, means including a shaft to rotate said type carrier to position any one of the type bars in alignment with said thrust rod, means for detachably securing the type carrier to said shaft, said type carrier being movable axially of said shaft to remove it therefrom and being normally obstructed against such removal by the thrust rod, a bracket to support said thrust rod, and a pivot for said bracket about which the latter may be swung to carry said thrust rod therewith about its pivot to clear said type carrier, and means including a rotatable device to lock said bracket in its normal position.

93. In a typewriting machine, the combination of a platen, a carrier rotatably supported in an inclined position in front of the platen, type bars on said carrier, said type bars extending almost parallel to the axis of said carrier, a horizontally disposed type bar actuator located in front of the platen and extending fore-and-aft of the machine, a shaft to rotate said carrier, said shaft slanting downwardly and rearwardly from said carrier to the lower part of the machine, and means located in the lower part of the machine to cooperate with the lower end of said shaft to rotate it to position any one of the type bars in alignment with said actuator.

94. In a typewriting machine, the combination of a platen, a rotatable carrier, type bars on said carrier, a type bar actuator located in front of the platen and disposed in a horizontal plane and extending fore-and-aft of the machine, the type bar carrier being arranged to rotate in a plane slanting downwardly and forwardly of the machine, a shaft to rotate said carrier, means behind said type carrier to support said shaft in a position such that it slants downwardly and rearwardly from said carrier to the lower part of the machine, means located in the lower part of the machine to engage said shaft near its lower end to rotate it to set the desired type bar to position any one of the type bars in alignment with said actuator, and means to engage the lower end of said shaft to assist in supporting it.

95. In a typewriting machine, the combination of a cylindrical platen, a type bar actuator at the front of the platen, a plurality of type units, each unit having a set of type bars to strike against the front of the platen, and a shiftable support for said type units whereby any one of said units may be moved into cooperative relation with said actuator, said support being located below a horizontal plane extending through the printing point and in front of a transverse vertical plane extending through the printing point.

96. In a typewriting machine, the combination of a platen, a type bar actuator, a plurality of type units, each unit having a set of type bars, a shiftable support for said type units, a pivot for said support and about which the support may be moved to carry any one of said units into cooperative relation with said actuator, and means at said pivot to lock said support against accidental displacement.

97. In a typewriting machine, the combination of a platen, a type bar actuator, a plurality of type units, each unit having a set of type bars, a support for said type units, a pivot for said support, means to hold the support against accidental displacement, means to move said support axially of its pivot to release it from the holding means and to rotate said support; to move any one of said units into cooperative relation with said actuator, and means to move said support axially into engagement with said holding means.

98. In a machine of the character described, the combination of a type wheel carrying individually movable type bars to print at a common printing point, key levers corresponding to the characters of the type on the type bars, and means under control of the key levers to impart variable harmonic motions to the type wheel, to rotate the latter and thus position a selected type bar in alignment with the printing point in juxtaposition to type.

99. In a machine of the character described, the combination of a type wheel carrying individually movable type bars to print at a common printing point, key levers corresponding to the characters of the type on the type bars, and means under control of the key levers to impart variable harmonic motions to the type wheel to rotate it in opposite directions from a normal position to thereby position a selected type bar in alignment with the printing point in juxtaposition to type.

100. In a machine of the character described, the combination of a type wheel, individually movable type bars thereon, variable mechanism including a fulcrum bar to rotate the type wheel through various angular distances, a floating lever, a link connecting the fulcrum bar to the floating lever to actuate the latter, and harmonic motion producing means to actuate said floating lever, to thereby overcome the inertia of rest and of motion with gradual acceleration and deceleration respectively.

101. In a machine of the character described, the combination of a type wheel, individually movable type bars thereon, variable mechanism to impart variable movements to the type wheel in opposite directions from a normal position, actuating devices for the variable mechanism comprising two link mechanisms, one for actuating the variable mechanism in one direction and the other for actuating the variable mechanism in the opposite direction, each link mechanism comprising a double toggle linkage adapted to impart harmonic motion to the variable mechanism to thereby overcome the inertia of rest and of motion by gradual acceleration and deceleration respectively.

102. In a machine of the character described, the combination of a type carrier to be moved to position type thereon at a printing point, actuating mechanism to so move the type carrier, said actuating mechanism including power mechanism, motion modifying mechanism connectable to the power mechanism, variable mechanism to control the variable movements of the type carrier and operable by the actuation of the motion modifying mechanism, a drive mechanism immediately connected to the type carrier and operable by the actuation of the variable mechanism, key levers, and means under control of the key levers to control the variable mechanism and to effect connection of the power mechanism with the motion modifying mechanism.

103. In a machine of the character described, the combination of a type wheel having types arranged thereon adjacent to each other and adapted to be actuated to position any one of the types at a common printing point, actuating mechanism to operate the type wheel, a continuously running motor, a clutch mechanism including a plurality of driving clutch elements connected to the motor to simultaneously receive reciprocatory harmonic motion but with the cycles displaced so that they will start from a dead center or end position successively and at equal intervals, an equal number of driven clutch elements connected to the actuating mechanism for the type wheel and normally at rest, connecting members to connect a driving clutch element with the respective driven clutch element, and means to actuate the connecting members to effect a connection of a driving clutch member with the associated driven clutch member.

104. In a machine of the character described, the combination of a type wheel having types arranged thereon adjacent to each other and adapted to be actuated to position any one of the types at a common printing point, actuating mechanism to operate the type wheel, a continuously running motor, clutch mechanism including a series of driving clutch elements permanently connected to the motor to simultaneously receive reciprocatory harmonic motion therefrom to thus provide two positions of momentary rest, one of said positions being a connecting position, said driving clutch elements being connected with the motor so that they are brought to said connecting position successively at equal time intervals, a series of driven clutch elements connected to the actuating mechanism and normally at rest in the connecting position so that any one of them may be connected with the corresponding driving clutch element at the instant of rest of the latter, connecting members adapted to connect the driving clutch elements with the corresponding driven clutch elements, and means to effect the actuation of one of the connecting members while a driven clutch element and the corresponding driving clutch element are in the connecting position.

105. In a machine of the character described, the combination of a type wheel having a plurality of adjacent types thereon and adapted to be actuated to position any one of the types at a common printing point, variable lever mechanism to move the type wheel and to control the extent of movement of the type wheel, actuating mechanism to operate the lever mechanism to drive the type wheel to and from its printing position, a continuously running motor, continuously actuated driving clutch elements connected to the motor, driven clutch elements connected to the actuating mechanism and normally at rest, connecting devices to connect the driving clutch elements with the driven clutch elements, key levers, and means connected to said key levers to effect a setting of the lever mechanism prior to its actuation and to connect the clutch elements.

106. In a machine of the character described, the combination of a type wheel adapted to be actuated to position a type thereon at the printing point, actuating mechanism to rotate the type wheel, said actuating mechanism including a compound harmonic motion device to thereby provide accentuated gradual accelerated and decelerated movements for the type wheel and whereby the type wheel is driven to and from its printing position, a power mechanism to operate the actuating mechanism, key levers, and means connected to the key levers to operatively connect the power means with the actuating mechanism.

107. In a machine of the character described, the combination of typing devices, a holder therefor adapted to be moved in opposite directions from a normal position to position the typing devices one at a time in typing position, two actuating mechanisms to operate the holder to drive it to and from its printing position, a continuously running motor, keys arranged in two groups, a frame adapted to be operated by the keys of one group to operatively connect the motor with one of the actuating mechanisms, and a frame adapted to be moved by the keys of the other group to operatively connect the other actuating mechanism with the motor.

108. In a machine of the character described, the combination of typing devices, a holder therefor adapted to be moved to position the typing devices one at a time at the printing point, actuating mechanism to move the holder to and from its printing position, a power mechanism adapted to be operatively connected to the actuating mechanism to actuate the same, key operated devices, means connected to said key operated devices to establish operative connection between the power mechanism and the actuating mechanism upon the depression of a key operated device, and means connected to the actuating mechanism to automatically disconnect the actuating mechanism from the power mechanism at the end of a single cycle.

109. In a machine of the character described, the combination of typing devices adapted to be positioned for typing, actuating devices to move the typing devices, a continuously running motor, driving clutch elements connected to the motor and continuously actuated thereby, driven clutch elements connected to the actuating devices and normally at rest, connecting members adapted to be set to effect connection of one of the driving clutch members with one of the driven clutch elements, selecting elements one for each connecting element, a magnet for each selecting element to actuate it, key operated devices, a main switch controlling the current for said magnets, and means under control of the key operated devices to close the main switch to thereby establish a circuit through one of the magnets to actuate the selecting element for the purpose of effecting a connection of one of the driving clutch members with one of the driven clutch members.

110. In a machine of the character described, the combination of a type-carrying element adapted to be moved to a plurality of printing positions, type bars on the type carrying element, a platen, actuating mechanism to rotate the type carrying element to register any one of the type bars at the printing point, continually running power means, a clutch including a plurality of driving elements, a like number of driven elements normally at rest and connected to the actuating mechanism and also positioned adjacent to the driving clutch elements, all of the driven elements being normally disconnected from the clutch, a single type bar operating mechanism connected to said actuating mechanism and adapted to move any one of the type bars against the platen, key operated devices, and means under control of the key operated devices to effect a connection of any one of the driven members with a corresponding one of the driving members and thereby simultaneously effect the actuation of the type carrying element to enable the power means to actuate the type bar operating mechanism through the medium of the actuating mechanism.

111. In a machine of the character described, the combination of a type wheel adapted to be rotated to position type thereon at a printing point, a platen, individual type bars on the type wheel adapted to be moved against the platen to print, a single mechanism to actuate any one of the bars against the platen for typing, and a power driven mechanism including means to impart harmonic motion to said single mechanism to thereby move a type bar against the platen with decelerated velocity and increased pressure, said power mechanism being also effective to return the type bar actuating mechanism to normal.

112. In a machine of the character described, the combination of a type wheel adapted to be rotated to position type thereon at a printing point, a platen, individual type bars on the type when adapted to be moved against the platen to print, actuating mechanism to rotate the type wheel, a single mechanism to actuate any one of the type bars against the platen, a power driven mechanism, and means connected to the power driven mechanism to simultaneously impart to the actuating mechanism and to said single mechanism harmonic motion to thereby gradually overcome the inertia of rest and the inertia of motion of the type wheel and to gradually move the type bar against the platen with decelerated velocity and increased pressure, said power driven mechanism being also effective to restore the type wheel and the type bar actuating mechanism to normal.

113. In a machine of the character described, the combination of a type wheel adapted to be rotated to position type thereon at a printing point, a platen, individual type bars on the type wheel, actuating mechanism adapted to impart variable harmonic motions to the type wheel to rotate the latter, a type bar actuator, means connected to the actuating mechanism to impart harmonic motion to the type bar actuator to thereby move the type bar against the platen with decelerated velocity and increased pressure, key levers, and means under control of the key levers to effect the operation of the actuating mechanism to thereby simultaneously rotate the type wheel and actuate the type bar actuator.

114. In a machine of the character described, the combination of a type wheel having a plurality of adjacent types thereon and adapted to move in opposite directions from a normal position to position any one of the types at the printing point, a variable mechanism to actuate the type wheel and adapted to receive movements of uniform magnitude in opposite directions from a normal position and to impart to the type wheel movements of varying magnitude in opposite directions, reciprocatory means to operate the variable mechanism from its normal position and to return it to normal, key levers, and means under control of the key levers to determine the magnitude of the movement imparted to the type wheel by the variable mechanism so that the type wheel is moved to position the type that corresponds to the operated key lever at the printing point.

115. In a machine of the character described, the combination of a type wheel having types thereon and adapted to have variable extents of movement to position any one of its types at the printing point, variably movable mechanism to actuate the type wheel and adapted to receive movements of uniform magnitude and to deliver to the type wheel movements of varying magnitude, motor driven mechanism, intermediate means interposed between the motor driven mechanism and the variably movable mechanism and adapted to be connected to the motor driven mechanism to transmit motion to the variably movable mechanism in either one of two opposite directions, key levers, means under the control of said key levers to effect a connection of the intermediate means with the motor driven mechanism, and means under control of said key levers to determine the magnitude of the movements delivered by the variably movable mechanism to the type wheel so that the type wheel is moved to position the type that corresponds to the operated key lever at the printing point.

116. In a machine of the character described, the combination of a type wheel having types thereon and adapted to have movements of variable extent in any one of two opposite directions from a normal position to locate any one of said types at the printing point, variable mechanism to actuate the type wheel and adapted to receive movements of uniform magnitude in opposite directions from a normal position and to impart to the type wheel movements of varying magnitude, two actuating mechanisms to actuate the variable mechanism one of said actuating mechanisms to operate it in one direction from the normal position and the other of said actuating mechanisms to operate it in the opposite direction from the normal position, two continually running power mechanisms, key levers divided into two groups, means operable by the key levers of one group to effect a connection of one of the actuating mechanisms with the respective one of the power mechanisms, means operable by the key levers of the other group to effect a connection of the other actuating mechanism with the other power mechanism, both power mechanisms being also effective individually to drive the actuating mechanism back to normal, and means under control of the key levers to determine the magnitude of the movement imparted to the type wheel by the variable mechanism to locate the type that corresponds to the operated key lever at the printing point.

117. In a machine of the character described, the combination of a type wheel having adjacent types thereon and adapted to have reciprocatory rotary motion to position any one of the types at the printing point, actuating mechanism to rotate the type wheel, a continuously running motor, clutch mechanism to connect the motor with the actuating mechanism, said clutch mechanism including a plurality of driving elements having continuous reciprocatory harmonic motion, a corresponding number of driven elements one for each driving element, said driven elements being connected to the actuating mechanism and normally at rest, and connecting elements to be set to connect any one of the driving elements with the associated driven element at the instant that the driving element assumes an end position, and means to effect the setting of a connecting element to connect one of the driving elements with the corresponding driven element, keys, and means under the control of the keys to render the last mentioned means effective.

118. In a machine of the character described, the combination of a type wheel having adjacent types thereon and rotatable to set any one of the types in juxtaposition with the printing point, actuating mechanism, variable mechanism adapted to be operated by the actuating mechanism to move the type wheel, said variable mechanism including a lever to receive movements of uniform magnitude at one end thereof and to impart movements to the type wheel by a connection at the opposite end thereof, a series of fulcrum devices intermediate the two ends of said lever to thereby vary the motion imparted by said lever to the type wheel, keys, selecting means for the fulcrum devices, said selecting means being under control of said keys, and means operable by said actuating means to set the selected fulcrum device into cooperative relation with said lever independently of said key levers.

119. In a machine of the character described, the combination of a type wheel having adjacent types thereon and rotatable in opposite directions from a normal position, two actuating mechanisms, variable mechanism to be operated by either of the two actuating mechanisms to actuate the type wheel to its printing position and to return it to normal, said variable mechanism including a lever to receive movements of uniform magnitude from the actuating mechanisms and being operable in opposite directions from a normal position, such movements being applied at one end of said lever, means connecting the opposite end of said lever with the type wheel to impart movements to the latter, a series of fulcrum devices intermediate the two ends of said lever, any one of said fulcrum devices being subject to selection to thereby vary the motions imparted by said lever to the type wheel, keys, and means under control of said keys to select any one of the fulcrum devices to render it effective so that the pivotal point of the lever may be altered so that the type wheel when actuated is in a position such that the type thereon corresponding to the operated key is juxtaposed at the printing point.

120. In a machine of the character described, the combination of a type wheel having adjacent types thereon and adapted to have rotary motion in opposite directions from a normal position to thereby position any one of the types at the printing point, a continuously running motor having motion of uniform velocity, two actuating mechanisms, one being effective to rotate the type wheel in one direction from a normal position to its printing position and return it to normal and the other mechanism being effective to rotate the type wheel in the opposite direction in a similar manner, each actuating mechanism being adapted to receive motion of uniform velocity from the motor and including means to convert such motion into reciprocatory harmonic motion to thus impart harmonic motion to the type wheel.

121. In a machine of the character described, the combination of a type wheel rotatable in opposite directions from a normal position to thereby position any one of a plurality of adjacent types thereon at the printing point, type wheel driving means to rotate the type wheel in either direction, motion modifying mechanisms to actuate the type wheel and comprising an intermediate lever the opposite ends of which are connected to the motion modifying mechanisms and to the center of which is connected the type wheel driving mechanism to thereby obtain a connection between the type-wheel driving mechanism and the two motion modifying mechanisms, and means to actuate either of the motion modifying mechanisms while the other remains at rest.

122. In a machine of the character described, the combination of a type wheel rotatable to locate any one of a plurality of adjacent types in juxtaposition to the printing point, means to actuate the type wheel, variable fulcrum mechanism for said actuating means to effect variable movement of the type wheel in opposite directions and adapted to be selectively positioned to control the magnitude of movement imparted to the type wheel, keys, means under control of said keys to selectively condition the fulcrum mechanism, means to effect the actuation of the fulcrum means after the selective conditioning thereof, and means under the control of said keys to effect the operation of the actuating means.

123. In a machine of the character described, the combination of a type wheel having adjacent types thereon and adapted to be rotated varying distances to position any one of the types at the printing point, actuating means to rotate the type wheel, a continuously running power means having movement in one direction and of uniform velocity, velocity and motion modifying mechanism connected to the power means and adapted to convert the motion of uniform velocity received from the power means into reciprocatory harmonic motion, and means to impart the reciprocatory harmonic motion to the actuating means to thereby correspondingly rotate the type wheel to and from its printing position for anyone of the types.

124. In a machine of the character described, the combination of a rotatable type wheel having adjacent types thereon, means to impart variable harmonic movements to the type wheel to correspondingly rotate the type wheel to juxtapose any one of the types at the printing point, a continuously running motor, key devices, and means under control of said key devices to operatively connect said motor with said first mentioned means for the purpose of driving the type wheel to its printing position and restoring it to its normal position after printing.

125. In a machine of the character described the combination of a type wheel having adjacent types thereon, said type wheel being rotatable to position any one of the types at the printing point, variable motion mechanism to actuate the type wheel, two actuating devices to operate the variable motion mechanism, a continuously running motor to be operatively connected with either one of the actuating devices, key devices, means connected to said key devices to control the variable motion mechanism, and means under control of said key devices to effect a connection of the motor with either one of the actuating devices for the purpose of actuating the variable motion mechanism.

126. In a typewriting machine, the combination of a type carrying element, variable mechanism adapted to control the movement of the type carrying element and including a fulcrum bar adapted to receive movements of uniform magnitude and to impart to the type carrying element movements of varying magnitude, a double toggle linkage connected to the fulcrum bar to move it with gradual acceleration from normal position and with gradual deceleration as it approaches its effective position, power means, clutch mechanism to be connected to said power means to produce reciprocatory harmonic motion and a constrained connection between the clutch mechanism and the toggle linkage to thereby impart harmonic motion to the toggle linkage and thereby move the fulcrum bar and the type carrying member, with accentuated acceleration and deceleration.

127. In a typewriting machine, the combination of a type carrying element, variable mechanism adapted to control the movement of the type carrying element and including a fulcrum bar adapted to receive movements of uniform magnitude in either one of two opposite directions from normal position and to impart to the type carrying element movement of varying magnitude in opposite directions, two double toggle linkages connected to the fulcrum bar one to move the fulcrum bar in one direction and the other to move the fulcrum bar in the opposite direction, both linkages to move the fulcrum bar with gradual acceleration from normal position and to move it with gradual deceleration as the fulcrum bar approaches its effective position, two power driven devices one for each linkage, two clutch mechanisms one for each linkage to connect to the associated power driven device with its linkage, and a connection between each clutch mechanism and the associated linkage to impart motions to the toggle linkage to actuate the fulcrum bar and the type carrying element.

128. In a typewriting machine, the combination of a type carrier, a variable actuating mechanism therefor including a fulcrum bar, an actuating linkage for the fulcrum bar and including a lever, a link connecting said fulcrum bar with said lever, a toggle linkage connected to the end of said lever to move the type carried from normal position with gradually accelerated motion, and a second toggle linkage connected to the first mentioned toggle linkage to move the latter and said lever and the type carrier with gradually decelerated motion while the type carrier is approaching its printing position.

129. In a typewriting machine, the combination of a type carrier, operating means therefor including a fulcrum bar, an actuating linkage for the fulcrum bar, said linkage including a lever, a link connecting the fulcrum bar with the lever, a toggle linkage connected to the end of said lever to move it from normal position with gradually accelerated motion, a second toggle linkage connected to the first mentioned toggle linkage to move the latter and thereby said lever with gradually decelerated motion while the fulcrum bar is approaching its effective position, power driven means, a clutch mechanism to be connected to the power driven means to receive reciprocatory harmonic motion therefrom, and means connecting the clutch mechanism with the second toggle linkage to impart reciprocatory harmonic motion to the first mentioned linkage.

130. In a typewriting machine, the combination of a continuously rotating power driven crank shaft, a plurality of driving clutch elements operatively connected to the crank shaft and continuously reciprocated thereby, an equal number of driven clutch elements normally stationary, a connecting member mounted on each driving clutch element, and means to set a connecting member in position to connect a driving clutch element with a driven clutch element.

131. In a typewriting machine, the combination of a type carrying element having types thereon and adapted to receive variable motion to position any one of the types thereon in typing position, variable mechanism to actuate the type carrying element and including a fulcrum bar having a plurality of fulcrum holes, a like number of fulcrum pins, means whereby any one of the pins may be moved into the corresponding fulcrum hole in the fulcrum bar, power driven means, clutch mechanism operatively connected to the fulcrum bar and adapted to be connected to the power driven means, key devices, and means under control of said key devices to simultaneously effect the actuation of the fulcrum pin moving means to connect one of the fulcrum pins with the fulcrum bar and the actuation of the clutch mechanism to connect the fulcrum bar with the power driven means.

132. In a typewriting machine, the combination of a type carrier adapted to be moved in opposite directions, actuating mechanism for the type carrier and including a floating lever, a toggle linkage connected to each end of the floating lever, a link connected to the center of the floating lever and to the actuating mechanism for the type carrier, a second toggle linkage connected to said first-mentioned toggle linkage, and means to actuate the said second toggle linkage, the compound motion of both toggle linkages being effective to impart movement of gradual acceleration during the early part of the movement of the type carrier and gradual deceleration during the latter part of the movement of the type carrier in either direction of movement of said type carrier.

133. The combination of power means, a clutch mechanism including a plurality of driving clutch elements adapted to be continuously oscillated by said power means and arranged to successively assume a starting position, a like number of driven clutch elements one for each driving clutch element and each adapted to be operatively connected to the corresponding one of the driving clutch elements, all of the driven elements being normally positioned so that a driving clutch element in starting posiiton can be operatively connected to the corresponding one of the driven clutch elements, a connecting member mounted on each driving clutch element and adapted to be set to connect the driving clutch element with its driven clutch element, and means to set the connecting member of the particular driving clutch element while the latter is in starting position to connect it with the corresponding driven clutch element so that the driven element may be actuated by the driving element, and means operated by the driven element.

134. In a typewriting machine, the combination of a platen, a type wheel, type bars on the type wheel, a pressure element to move any one of the bars against the platen, power mechanism, normally disconnected actuating mechanism adapted to be operatively connected to the power mechanism and to receive reciprocatory harmonic motion from said power mechanism, connecting mechanism extending from the actuating mechanism to the pressure element, key devices, and means under control of said key devices to operatively connect the power mechanism with the actuating mechanism and transmit harmonic motion to the pressure element.

135. In a typewriting machine, the combination of a type carrying element, type bars on said element, a platen, a pressure element to move a type bar against the platen, means to impart harmonic motion to the pressure element to thus actuate the type bar with low velocity and corresponding higher pressure, said means including a lever of the first order to move the pressure element, said lever comprising two arms, a link connecting one of said arms to the pressure element, and an adjusting device to alter the position of the arm connected to the pressure element with respect to the other arm to adjust the position of the pressure element relatively to the platen.

136. In a typewriting machine, the combination of a type carrier, means to actuate said type carrier, clutch mechanism including continuously operated driving clutch elements, driven clutch elements normally stationary and each being adapted to be connected to a corresponding driving clutch element when the two elements are in alignment, connecting members each to connect one of the driving clutch elements with the associated driven clutch element, mechanism to set the connecting elements one at a time to effect a connection of one of the driving clutch elements with one of the driven clutch elements, continuously running power mechanism to operate the driving clutch elements, and controlling means connected to the power mechanism to control the operation of the connecting mechanism so that the connecting mechanism will be effective to connect two clutch elements when a driving clutch element is in alignment with a driven clutch element.

137. In a typewriting machine, the combination of a type carrying element, power driven actuating mechanism for the type carrying element and including a continuously rotating shaft, driving clutch elements connected to said shaft and continuously oscillated thereby, driven clutch elements normally disconnected and stationary, mechanism to connect the driving clutch elements with the driven clutch elements, and means connected to said power driven shaft to control the actuation of the connecting mechanism to function at the instant a driving clutch element reaches a predetermined position relatively to the corresponding driven clutch element.

138. In a machine of the character described, the combination of typing devices adapted to be positioned for typing, actuating devices to move the typing devices, a continuously running motor, driving clutch elements connected to the motor and continuously actuated thereby, driven clutch elements connected to the actuating devices and normally at rest, selecting devices adapted to be set to effect connection of one of the driving clutch elements with one of the driven clutch members, a magnet for each selecting device to render it effective, key operated devices, a main switch to control the current for said magnets, means under control of the key operated devices to close the main switch to assist in establishing a circuit through one of the magnets to actuate it for the purpose of effecting the connection of one of the driving clutch members with one of the driven clutch members, means to complete the circuit, and means connected to the actuating devices to open the main switch upon completion of a single cycle.

139. In a typewriting machine, the combination of a type carrier having a set of types thereon, said set being divided into two groups one group at each side of a printing point, a set of key levers one key lever for each type, the types being arranged side-by-side on the type carrier, means to actuate the type carrier in opposite directions from a normal position to locate any one of the types at the printing point, the last mentioned means including a lever, settable fulcrum devices for said lever, there being half as many fulcrum devices as there are key levers, selecting devices one for each fulcrum device, means operable by the key levers to actuate the selecting devices, there being two key levers effective to actuate each selecting device, and means to set the selected fulcrum device.

140. In a typewriting machine, the combination of a settable type carrier having a plurality of types thereon, means including an actuating lever to operate said type carrier, key levers one for each type, fulcrum devices for said actuating lever, there being half as many fulcrum devices as there are key levers, each fulcrum device having two key levers associated therewith, and means operable by either one of the two key levers to assist in rendering effective the associated fulcrum device.

141. In a typewriting machine, the combination of printing instrumentalities including a type carrier, an actuating lever, fulcrum devices for said lever and normally out of engagement therewith, means to set any one of the fulcrum devices into engagement with said lever, means at one end of said lever connecting it with the type carrier, driving means at the opposite end of said lever to actuate it about the active fulcrum device in opposite directions from a normal position to correspondingly actuate the type carrier, the driving means being effective at one end of said lever to prevent accidental displacement thereof, and means effective on the opposite end of the lever to assist the driving means in keeping said lever in register with the fulcrum devices while the machine is at rest.

142. In a typewriting machine, the combination of printing instrumentalities including a type carrier having a set of types thereon, key levers, means to actuate the type carrier to select any one of the types, said means including a lever located beneath the key levers and extending fore-and-aft of the machine, fulcrum devices located above said lever to vary the throw thereof to accordingly effect a variation in the extent of actuation of the type carrier, said devices being arranged in a row lengthwise of said lever, selecting devices for said fulcrum devices, said selecting devices extending transversely of the machine, elements operable by the key levers to actuate said selecting devices to select one of the fulcrum devices, and means to actuate the selected fulcrum device to set it downwardly into cooperative relation with said lever.

143. In a typewriting machine, the combination of a platen, printing instrumentalities including type bars to print against said platen, means to set any one of the type bars at the printing point, a type bar actuator, driving means, intermediate means connecting said driving means to said actuator, said intermediate means including a rock shaft, two oppositely disposed arms on said rock shaft, one of said arms being connected to said actuator the other arm being connected to said driving means, and means for adjusting one of said arms about said rock shaft and angularly with reference to the other arm to vary the position to which the actuator may be moved in accordance with the thickness of work sheets around the platen.

144. In a typewriting machine, the combination of printing instrumentalities including a type carrier having a set of types thereon, said types being divided into two groups one at each side of the printing point, a group of key levers, said key levers being arranged side-by-side and extending fore-and-aft of the machine, some of the key levers having characters most frequently used located near the outer end of the set, the types of the characters most frequently used being located near the middle of the set of types on the type carrier, means to actuate the type carrier from its normal position to locate any one of the types at the printing point, selecting devices extending transversely of the machine and to determine the extent of actuation of the type carrier, and elements one operable by each key lever to actuate one of said selecting devices, the connections between said elements and said key levers being such that the actuation of one of the elements associated with a key lever at the outer end of the set, may effect the actuation of a selecting device associated with a type near the middle of the set of types.

145. In a typewriting machine, the combination of a carrier having types thereon, means to support said carrier for rotative movement to register the types at the printing point, means including an element to cooperate with the registered type to print, means including a lever to actuate the type carrier, a series of fulcrum devices for the actuating lever, key levers, selecting devices one for each of the fulcrum devices, intermediate devices actuable by the key levers to actuate the selecting devices to thus select the corresponding fulcrum device, means operable by the key levers to effect an actuation of the selected fulcrum device, and means to prevent the depression of another key lever until the machine has made a complete cycle.

146. In a typewriting machine the combination of printing instrumentalities including a type carrier, means including a lever to actuate said type bar carrier, fulcrum devices to vary the throw of said lever and of the connected type carrier, key levers, selecting devices for said fulcrum devices operable by the key levers, means to actuate the selected fulcrum device to set it into effective relation with said lever, and means associated with the actuating means to prevent the actuation of another key lever until the machine has made a complete cycle.

147. In a typewriting machine, the combination of printing instrumentalities including a type carrier, means including an actuating lever to operate said carrier in either of two opposite directions from a normal position to juxtapose any one of the types at the printing point, an intermediate lever connected to said actuating lever to operate the latter in opposite directions and always the same distance at each printing operation, two devices connected to the intermediate lever and operable individually in opposite directions with respect to each other, means to actuate either one of said devices, and means associated with each device to noiselessly arrest the actuating lever.

148. In a typewriting machine, the combination of a type carrier, means to rotate said type carrier to locate any one of its types at the printing point, a reciprocatory driving device physically connected to said means to reciprocate the latter at each cycle of operations of the machine to actuate said means to and from its effective position, key levers, a universal bar operable by the key levers, power means physically connected to said driving device to actuate the latter through a complete cycle, means operable by the universal bar to effect the actuation of the associated driving device by said power means, a carriage, an escapement for said carriage, and actuating means for said escapement, said actuating means including a connecting element extending to the universal bar and operable thereby.

149. In a typewriting machine, the combination of a platen, a type bar carrier including a body part shaped like the frustrum of a cone, and type bar pivotally supported on and at the narrow end of the body part and extending along the outer face of said body part, a horizontally disposed type bar actuator at the front of the platen and extending fore-and-aft of the machine, types on the type bars, the free ends of the type bars extending away from said body part and clear thereof, means to rotatably support said body part in a slanting position in front of the platen so that its axis extends downwardly and rearwardly of the machine, means including a shaft to rotate said body part to present any one of the type bars to said actuator, said shaft extending in the same direction as the axis of said body part and to the lower part of the machine, means in the lower part of the machine to engage said shaft to operate said type bar carrier, and operate said actuator.

150. In a typewriting machine, the combination of platen, a type bar carrier including a circular body part, and midget type bars pivotally supported on the body part and extending along the outer circular bounding of said body part, a type bar actuator in the form of a horizontal thrust bar at the front of the platen, means to rotate said body part to juxtapose any one of the type bars at the printing point and to present them individually to the actuator, types on the type bars, the free ends of the type bars extending away from said body part and clear thereof so as to be substantially vertical when juxtaposed at the printing point, means to rotatably support said body part in a position in front of the platen such that the axis thereof slants downwardly and rearwardly of the machine and so that the type bar is a small angular distance of approximately 10 degrees from the platen when juxtaposed at the printing point, and means to operate said actuator.

151. In a machine of the character described, the combination of a type wheel adapted to have variable rotative movements to position type thereon at the printing point, reciprocable actuating means, variable motion effecting mechanism including a lever adapted to receive movements of uniform magnitude from the reciprocable actuating means to drive the type wheel to and from its printing positions, means whereby these movements of said lever may be converted into movements of varying magnitude which are imparted by said mechanism to the type wheel, key levers, and transposition mechanism under the control of said key levers to effect the conditioning of the converting means.

152. In a machine of the character described, the combination of a type wheel having a plurality of adjacent types thereon and adapted to be moved to position any one of its types at the printing point, variable mechanism to actuate the type wheel and adapted to receive movements of uniform magnitude and to impart to the type wheel movements of varying magnitude, continually running power mechanism, intermediate actuating mechanism between the power mechanism and the variable mechanism and adapted to be connected to the power mechanism and to be driven thereby to actuate said variable mechanism, keys, means connected to said keys to effect a connection of said intermediate mechanism with the power means, and fulcrum means under the control of the keys and cooperating with the variable mechanism to control the magnitude of the movement imparted to the type wheel by said variable mechanism so that the type wheel is moved by the power means to position the type at the printing point that corresponds to the operated key.

153. In a machine of the character described, the combination of a type wheel having adjacent types thereon, said type wheel being normally at rest and adapted to be moved in opposite directions from a normal position to locate any one of the types at the printing point, actuating mechanism operable in opposite directions from a normal position and adapted to impart variable harmonic movements to the type wheel to correspondingly rotate the type wheel to locate any one of the types at the printing point and to subsequently restore the type wheel to its normal position, keys, and means under control of said keys to effect the operation of the actuating mechanism.

154. In a typewriting machine, the combination of a type carrier, said type carrier having types thereon, means for demountably supporting the type carrier so that it may be substituted by another one, an element to cooperate with any one of the types to cause it to print on a work sheet, said element normally obstructing the type carrier against demounting it, and means to permit movement of the cooperative element to an abnormal position so as to permit demounting of the type carrier.

155. In a typewriting machine, the combination of printing instrumentalities including a type carrier, reciprocatory means to actuate said type carrier to its printing position and to return it to normal, a continually reciprocating power driven device to reciprocate the actuating means, the power driven device being normally disconnected from the actuating means, means to connect the actuating means with the power means, locking means to prevent disconnection of the power device from the actuating mechanism during a cycle of operations, and means to effect a disconnection of the power device from the actuating means only upon the completion of a cycle of operations.

156. In a typewriting machine, the combination of a platen, type bars to print against the front of said platen, a circular support for said type bars, said support including a circular pivot member common to all of the type bars, said support and said type bars forming a printing unit, the type bars being arranged side by side about the circular support and extending upwardly from the pivot member and flaring outwardly at their upper ends, means located beneath the type bar carrier to support it in an inclined position in front of a vertical plane tangent to the platen and below a horizontal plane extending through the printing point, a type bar actuator located above the printing unit and in front of the platen and adapted to be actuated into a ring-like formation of the upper ends of the type bars to press any one of the type bars outwardly with respect to the printing unit and against the platen to print, and means to rotate the printing unit to locate any one of the type bars in the path of operation of the actuator.

157. In a typewriting machine, the combination of a cylindrical platen, a type bar actuator located at the front of said platen, a plurality of type bar carriers each having a set of pivoted type bars thereon, a support for said type bar carriers, said support being located in front of a vertical plane tangent to the platen and below a horizontal plane extending through the printing point, stub shafts on said support one for each type bar carrier and whereby the type bar carriers are mounted for rotation on said support, locking means for said support, a drive shaft, means to shift said support to release it from the locking means, the shifting means being also effective to shift the support in another direction to carry any one of the type carriers into cooperative relation with said type bar actuator and the associated stub shaft into axial alignment with said drive shaft, and means to connect the aligned stud shaft with the drive shaft.

158. In a typewriting machine, the combination of a platen, a type bar carrier, type bars pivotally supported on said carrier, means to actuate said carrier to selectively position any one of the type bars at the printing point, a type bar actuator to press the selected type bar against the platen, each type bar being readily detachable from the carrier for substitution without disturbing the other type bars on said carrier, means to support the actuating means, one end of the actuating means extending beyond the supporting means, and means for detachably connecting said type bar carrier with the extending end of the actuating means so that said type bar carrier may readily be substituted by another type bar carrier without disturbing the supporting means.

159. In a typewriting machine, the combination of a rotatable platen, a turn table inclined forwardly and downwardly of the machine, means independent of the platen to support the turntable, printing instrumentalities including a plurality of type carriers on said table, the rotation of the platen and the turn table supporting means being such as to permit the feeding of a work sheet of unlimited length by the platen without interference by said support, rotating means for the type carriers to set any one of the types into register with the printing point, means on the supporting means to actuate the turntable to carry any one of the type carriers into cooperative relation with said rotating means, said type carriers being located on the upper face of the turntable, and means for demountably attaching each type carrier to the upper face of said turntable so that any one of them may readily be replaced without interference by said turntable.

160. In a typewriting machine, the combination of a platen, a plurality of rotatable type bar carriers any one of which may be rendered effective, each type bar carrier including a body part which is circular as viewed from one end thereof, and midget type bars pivotally supported on the body part, a shaft for each type bar carrier, the type bars of each carrier being arranged on the circular boundary of said body part and adapted to swing away from the axis of the shaft, a type bar actuator at the front of said platen, each type bar extending substantially vertical when juxtaposed at the printing point, a shiftable support for all of the type bar carriers, means to rotatably support each shaft on said shiftable support so that the axis of the effective type bar carrier slants downwardly and rearwardly of the machine and so that any one of the type bars when juxtaposed at the printing point is a small angular distance of approximately 10 degrees from the platen, means to actuate said shiftable support to carry any one of the type bar carriers into cooperative relation with the body rotating means, means under said support and to engage any one of said shafts to rotate its type carrier to juxtapose any one of the type bars at the printing point to present the type bars individually to said actuator, and means to operate said type bar actuator.

161. In a typewriting machine, the combination of printing instrumentalities including type bars, a type bar actuator, a guide for said actuator, a pivot to support said guide so that it may be swung to carry the actuator to an ineffective position, operating means including an upright lever, and a link pivotally connected at one end to said actuator, and a pivot to connect the other end of said link to said upper end of said upright lever, said last mentioned pivot being substantially in alignment with the axis of the pivot for said guide.

162. In a typewriting machine, the combination of printing instrumentalities including a type carrier, actuating means therefor, said means including a lever, a power driven continually rotating device, a reciprocating element operable by the rotating device, key levers, a train of mechanism to operate said lever, said mechanism including a driven element, a coupling member to connect the reciprocating element with the driven element, means whereby the actuation of the coupling member may be effected by the operation of any one of the key levers, means to engage the coupling member to hold it in its effective position until the reciprocating element has completed one reciprocation, means to render the coupling member ineffective when a reciprocation of the driving element has been completed so as to permit the reciprocating element to continue its reciprocatory movement while the driven element remains at rest, said type carrier having type bars thereon, a type bar actuator, and means connecting said actuator to said driven element.

163. In a typewriting machine, the combination of a shuttle having types arranged side-by-side thereon, key levers arranged side-by-side and having keys, the characters on said keys being arranged in a lateral order differing from the lateral order of the corresponding types on the type shuttle, means including a lever to actuate said shuttle, fulcrum pins for said lever, transposition means responsive to the actuation of said key levers to effect the setting of any one of said fulcrum pins, and means responsive to the actuation of said key levers to effect the actuation of said lever about the set fulcrum pin to juxtapose the type corresponding to the active key lever at the printing point.

164. In a typewriting machine, the combination of a carrier having types thereon, means to support said type carrier for rotative movement in opposite directions from a normal position to register any one of the types at the printing point, means including an element to cooperate with the registered type to print, a pinion connected to said type carrier, a sector to rotate said pinion, a fixed pivot for said sector, a lever to actuate said sector in opposite directions from a normal position to actuate said type carrier to its printing position through the medium of said pinion, driving means at one end of said lever to actuate it always through a constant distance, means to vary the extents of movement imparted by the other end of the actuating lever to said sector, key levers one for each type on said carrier, means operable by the key levers to effect the operation of the actuating lever, means operable by the key levers to effect a setting of the movement varying means in accordance with the extent of rotation required of the type carrier to register the selected type at the printing point, and means to effect the actuation of the cooperative element.

165. In a typewriting machine, the combination of a carrier having types thereon, means to support said type carrier for rotative movement in opposite directions from a normal position to register any one of the types at the printing point, means including an element to cooperate with the registered type to print, means operable in opposite directions from a normal position to actuate the type carrier to its printing position, a lever to actuate the operable means, driving means at one end of said lever to actuate it through a constant distance from its normal position, said driving means being also effective to return said lever to its normal position, the extent of movement imparted by the other end of the actuating lever to the operable means being variable, key levers one for each type on said carrier, means under the control of the key levers to determine the extent of movement of said other end of the actuating lever in accordance with the extent of rotation required of the type carrier to register the selected type at the printing point, power driving means, means operable by the key levers to effect an actuation of the actuating lever by the power driving means, and means to effect the actuation of the cooperative element.

166. In a typewriting machine, the combination of printing instrumentalities including a type carrier, means including an actuating lever to rotate the type carrier in opposite directions from a normal position to register any one of the types at the printing point, fulcrum means for said lever, means at one end of said lever connecting it with the type carrier to drive the latter, driving means connectable to the other end of said lever to actuate it in opposite directions from a normal position and to restore it to normal, the extent of movement at the driven end of said lever being constant, means to vary the fulcrum means to vary the throw of the driving end of said lever in accordance with the extent of rotation required of the type carrier to register the desired type at the printing point, two groups of key levers, two normally disconnected connecting devices one for each group of key levers and whereby the actuating lever may be connected to the driving means to be actuated thereby in either one of two opposite directions from a normal position, and means operable by each set of key levers to effect the actuation of the associated connecting device to render it effective.

167. In a typewriting machine, the combination of a platen, a type bar actuator, a plurality of type units, each unit having a set of type bars, a shiftable support for said type units whereby any one of said units may be moved into cooperative relation with said actuator, a shaft by which said support is pivotally mounted, a single lock to hold said support against accidental displacement in any one of its effective positions, said lock being located at the pivot of said support and including two cooperating members, one of said members being stationary, the other member being carried by said support and movable with said support out of engagement with the stationary member, and a spring acting on said support to hold the movable member against the stationary member in any position of the support.

168. In a typewriting machine, the combination of a cylindrical platen, a type bar actuator located at the front of said platen, a plurality of type units, each unit having a set of pivoted type bars to strike against the front of said platen, a support for said type units, a pivot for said support about which the latter may be rotated so as to move any one of said units into cooperative relation with said actuator, said support being located in front of a vertical plane tangent to the front of the platen and beneath a horizontal plane extending through the printing point, a lock to hold the support against accidental displacement, and means whereby said support may be actuated axially of its pivot to release said support from said lock, said means being also effective to rotate said support after it has been released from the locking means.

169. In a machine of the character described, the combination of a type carrier having types thereon and rotatable in either of two opposite directions from a normal position, variably movable mechanism operable in either of two opposite directions from a normal position to impart variable movements thereof to the type carrier to correspondingly rotate the latter in either direction from its normal position, character key devices corresponding to the characters of the types on the type carrier, means under control of the key devices to control the extents of various movements of the variably movable mechanism in accordance with the selected type, and means under control of the key devices to effect the actuation of the variably movable mechanism from its normal position and subsequently return it to its normal position to accordingly drive the type wheel to its printing position and to restore it to its normal position.

170. In a machine of the character described, the combination of a type wheel having a plurality of adjacent types thereon and adapted to be reciprocably rotated in opposite directions from a normal position, key levers, variably movable mechanism to rotate the type wheel, a set of fulcrum devices for said variably movable mechanism to control the extents of movements which the latter imparts to the type wheel, there being half as many fulcrum devices as there are adjacent types, means to impart reciprocatory movements of uniform magnitude in opposite directions from a normal position to said variably movable mechanism to accordingly actuate the type wheel in either of two opposite directions from its normal position and to return the type wheel to its normal position, said variably movable mechanism being effective to impart reciprocatory movements of varying magnitudes to the type wheel, and means under control of the key levers to selectively set any one of said fulcrum devices, said set of fulcrum devices being effective for both directions of movement of the variably movable mechanism from normal position.

171. In a machine of the character described, the combination of a type wheel having adjacent types thereon and rotatable to position any one of the types at the printing point, variably movable mechanism including a lever of the first order to move the type wheel in opposite directions from a normal position and whereby movements of uniform magnitude imparted to one end of said lever are converted into movements of varying magnitude at the other end thereof to accordingly rotate the type wheel, actuating mechanism to actuate the variable mechanism in opposite directions from a normal position, keys, means under the control of said keys to control the extents of motions which are to be imparted by said variably movable mechanism to the type wheel, reciprocatory means under the control of said keys to effect the actuation of said lever, and power means to actuate said reciprocatory means.

172. In a machine of the character described, the combination of a type wheel having adjacent types thereon, said type wheel being rotatable to position any one of its types at the printing point, variably movable mechanism to transmit various extents of movements to the type wheel to drive it in either one of two opposite directions from a normal position to the printing point and to drive the type wheel back to its normal position from the printing point, means to actuate the variably movable mechanism, keys, and means independent of the actuating means and under the control of the keys to control the extents of movements of the variably movable mechanism.

173. In a typewriting machine, a type carrying element, variable leverage mechanism adapted to control the movements of the type carrying element and including a fulcrum bar adapted to receive movements of uniform magnitude in opposite directions from a normal position, means to effect actuation of the fulcrum bar in opposite directions from a normal position, said means including two clutch mechanisms, an intermediate lever, means connecting one end of the intermediate lever to one clutch mechanism, means connecting the other end of the intermediate lever to the other clutch mechanism, and a link connected to the fulcrum bar and to the intermediate lever at a point between the ends of the latter to thus enable the intermediate lever to actuate the fulcrum bar by moving one end of the intermediate lever by the connected clutch mechanism while the opposite end of the intermediate lever remains stationary and serves as a fulcrum for said intermediate lever, power means, and means to connect the first mentioned means with the power means through either clutch mechanism.

174. In a typewriting machine, the combination of a type carrier having a set of types thereon, the types being arranged in two rows on said carrier, the set of types being divided into two groups one group at each side of a printing point, a set of key levers one key lever for each of the types in one of said rows of types, said key levers having keys arranged in four banks, the types in each row being arranged side-by-side, and the key levers being also arranged side-by-side, some of the key levers having characters most frequently used being located near the outer end of the set, the types corresponding to the last mentioned key levers being located near the middle of the set of types on the type carrier, means to actuate the type carrier in opposite directions from a normal position to locate any one of the types at the printing point, means to actuate the type carrier to locate the types one at a time at the printing point, and means under the control of the key levers to control the extents of motions of the type carrier and whereby one of the key levers near the outer end of the set effects the positioning of the type carrier so that the corresponding type near the middle of the set is positioned at the printing point.

175. In a typewriting machine, the combination of a type carrier having a set of types thereon, said types being arranged in two rows, said types being divided into two adjacent groups one group at each side of a printing point, a set of key levers, there being one key lever for each type in one of the rows of the type carrier, said key levers having keys, said keys being arranged in four banks, the types being arranged various distances from the printing point which distances vary as the frequency of use of each type irrespective of the order of arrangement of the corresponding key levers with respect to each other, means to actuate the type carrier in opposite directions from a normal position to locate any one of the types at the printing point, and means whereby a key lever near the outer end of the set effects the positioning of the type carrier so that the corresponding type near the middle of the set or in other words near the printing point is located at the printing point.

176. In a typewriting machine, the combination of a platen, a shaft extending downwardly of the machine from a position near the front of the platen, means to support said shaft in a stationary position, a type bar carrier located in front of the platen and in axial alignment with the said shaft and also in a position not obstructing the line of vision from the operator to the printing point, type bars on said carrier and extending from said type bar carrier in directions opposite to that in which said shaft extends from the type bar carrier, an actuator located in a vertical plane extending through the printing point fore-and-aft of the machine to operate any one of said type bars, the upper end of said shaft being free and unobstructed, means for demountably attaching the type bar carrier to the unobstructed upper end of said shaft so that it may readily be replaced by another type carrier having a different style of types to permit printing on the same work sheet with similar characters of a different style of types, and means located in the lower part of the machine and connected to the lower end of said shaft to actuate the type bar carrier to locate any one of the type bars in the vertical plane for printing.

177. In a single shift typewriting machine, the combination of a set of keys arranged in four rows, a set of types arranged in two rows, namely an upper case row, and a lower case row, there being as many types in one of said rows as there are keys, the set of types comprising two end groups of non-letter types, and an intermediate group of letter types located between the two end groups, the types being arranged in a different lateral order than that of the keys, and means including transposition mechanism under the control of said keys whereby the printing of any one of the types may be effected by the actuation of its corresponding key.

178. In a single shift typewriting machine, the combination of a set of keys, a set of types arranged in two rows, namely an upper case row, and a lower case row, the set of types comprising two end groups of non-letter types, and an intermediate group of letter types located between the two end groups, the types being arranged in a different lateral order than that of the keys, and means including transposition mechanism under the control of said keys whereby the printing of any one of the types may be effected by the actuation of the corresponding key.

179. In a typewriting machine, the combination of a set of keys, a set of types arranged in a plurality of rows extending transversely of the machine, said types being arranged from the middle of the machine substantially in the character frequency order, the order of arrangement of the keys being different than that of the types, and means including transposition mechanism under the control of said keys whereby the printing of any one of the types may be effected by the actuation of the corresponding key.

180. In a machine of the character described, the combination of a type wheel having a plurality of adjacent types thereon and adapted to be rotated to position any one of the types at a common printing point, key levers, mechanism to impart motions of varying extents to the type wheel, reciprocatory means to impart reciprocatory movements of uniform magnitude to said mechanism from and to a normal position, leverage changing means to vary the extents of movements imparted by said mechanism, and means including transposition means controlled by the key levers to effect the setting of the leverage changing means to thereby condition the machine in accordance with the extents of movements which said mechanism is to impart to the type wheel to position the type corresponding to the key operated at the printing point.

181. In a typewriting machine, the combination with a rotary type carrier having types arranged side by side in a row extending around said type carrier and various angular distances from a printing position, of means to impart to said type carrier a rotative torque of varying intensity as the type carrier turns, said means including mechanism to produce the varying torque action and deliver always the same extent of movement, and variable mechanism operable by the torque producing mechanism to cause the type carrier to be rotated through the various angular distances corresponding to the angular distances of the types from the printing position.

182. In a typewriting machine, the combination of a rotatable type carrier, key levers corresponding to the types on said carrier, and means under the control of said key levers to impart harmonic motion to the type carrier to rotate the latter and thus register any one of the types selectively at the printing point.

RICHARD v REPPERT.